(12) United States Patent
Busey et al.

(10) Patent No.: US 9,558,244 B2
(45) Date of Patent: Jan. 31, 2017

(54) SYSTEMS AND METHODS FOR SOCIAL RECOMMENDATIONS

(71) Applicant: LEGIT CORPORATION, Austin, TX (US)

(72) Inventors: Andrew Thomas Busey, Austin, TX (US); Anthony Dan Chen, Austin, TX (US); Isao Uchida Jonas, Austin, TX (US); Douglas James Daniels, Jr., Austin, TX (US); Benjamin Edward Lamm, Austin, TX (US)

(73) Assignee: CONVERSABLE, INC., Austin, TX (US)

( * ) Notice: Subject to any disclaimer, the term of this patent is extended or adjusted under 35 U.S.C. 154(b) by 0 days.

(21) Appl. No.: 14/919,336

(22) Filed: Oct. 21, 2015

(65) Prior Publication Data

US 2016/0117329 A1 Apr. 28, 2016

Related U.S. Application Data

(60) Provisional application No. 62/108,953, filed on Jan. 28, 2015, provisional application No. 62/067,355, filed on Oct. 22, 2014.

(51) Int. Cl.
*G06F 7/00* (2006.01)
*G06F 17/30* (2006.01)
*G06Q 50/00* (2012.01)

(52) U.S. Cl.
CPC ..... *G06F 17/3053* (2013.01); *G06F 17/30528* (2013.01); *G06F 17/30601* (2013.01); *G06F 17/30867* (2013.01); *G06Q 50/01* (2013.01)

(58) Field of Classification Search
CPC ............... G06F 17/30386; G06F 17/30091; G06F 17/30011; G06F 17/30864; G06Q 10/06
USPC ....................................................... 707/705
See application file for complete search history.

(56) References Cited

U.S. PATENT DOCUMENTS

| | | | | |
|---|---|---|---|---|
| 6,323,852 B1 * | 11/2001 | Blower, Jr. | ............. | G06F 3/033 715/804 |
| 6,789,252 B1 * | 9/2004 | Burke | ....................... | G06F 8/10 717/100 |
| 7,308,451 B1 * | 12/2007 | Lamping | ........... | G06F 17/30705 707/737 |
| 7,536,413 B1 * | 5/2009 | Mohan | ................ | G06F 17/3071 |

(Continued)

*Primary Examiner* — Hosain Alam
*Assistant Examiner* — Nicholas Allen
(74) *Attorney, Agent, or Firm* — Wilson, Sonsini, Goodrich & Rosati

(57) ABSTRACT

Computer-implemented systems, methods, and media for making a recommendation or a non-recommendation to a user comprising: a software module configured to calculate a social distance between a first and a second user; a software module configured to allow the first and the second user to rate a plurality of items using a gamified rating model; a software module configured to analyze a degree of similarity between the first and the second user based on the ratings of the plurality of items by the first and the second user; a software module configured to make a recommendation or a non-recommendation to the first user based on the social distance and the degree of similarity between the first and the second user, and the ratings of the plurality of items; and a software module configured to present the recommendation or non-recommendation in a manner that comprises a ranked list.

30 Claims, 41 Drawing Sheets

(56) References Cited

U.S. PATENT DOCUMENTS

| | | | | |
|---|---|---|---|---|
| 7,689,585 B2* | 3/2010 | Zeng | G06F 17/30864 | 707/999.104 |
| 7,840,903 B1* | 11/2010 | Amidon | G06F 3/04815 | 715/733 |
| 7,849,420 B1* | 12/2010 | Amidon | H04L 67/1095 | 715/700 |
| 7,899,832 B2* | 3/2011 | Abhyankar | G06F 17/30643 | 707/752 |
| 7,949,659 B2* | 5/2011 | Chakrabarti | G06F 17/30699 | 707/732 |
| 8,005,841 B1* | 8/2011 | Walsh | G06F 17/30817 | 707/739 |
| 8,913,797 B1* | 12/2014 | Siddavanahalli | G06K 9/00677 | 382/118 |
| 8,930,204 B1* | 1/2015 | Igoe | G06F 9/00 | 705/2 |
| 9,037,531 B2* | 5/2015 | Pinckney | | 706/62 |
| 2003/0110055 A1* | 6/2003 | Chau | G06F 17/30595 | 705/29 |
| 2003/0120651 A1* | 6/2003 | Bernstein | G06F 17/30569 | |
| 2003/0145002 A1* | 7/2003 | Kleinberger | G06F 17/30873 | |
| 2006/0200432 A1* | 9/2006 | Flinn | G06N 5/048 | 706/12 |
| 2006/0200434 A1* | 9/2006 | Flinn | G06N 99/005 | 706/12 |
| 2007/0130112 A1* | 6/2007 | Lin | G06F 17/3002 | |
| 2007/0203872 A1* | 8/2007 | Flinn | G06N 5/048 | 706/62 |
| 2007/0271291 A1* | 11/2007 | Acharya | G06F 17/30598 | |
| 2008/0065471 A1* | 3/2008 | Reynolds | G06Q 10/06 | 705/7.32 |
| 2008/0243638 A1* | 10/2008 | Chan | G06F 17/30522 | 705/14.51 |
| 2008/0243815 A1* | 10/2008 | Chan | G06F 17/30867 | |
| 2009/0006382 A1* | 1/2009 | Tunkelang | G06F 17/30424 | |
| 2009/0018996 A1* | 1/2009 | Hunt | G06Q 30/02 | |
| 2010/0010968 A1* | 1/2010 | Redlich | G06F 17/30672 | 707/E17.014 |
| 2010/0094875 A1* | 4/2010 | Harrison | G06F 17/30734 | 707/741 |
| 2010/0125599 A1* | 5/2010 | Cheng | G06Q 30/02 | 707/771 |
| 2010/0153324 A1* | 6/2010 | Downs | G06F 17/2745 | 706/21 |
| 2010/0169361 A1* | 7/2010 | Chen | G06F 17/30598 | 707/769 |
| 2010/0217770 A1* | 8/2010 | Ernst | G06F 17/30696 | 707/758 |
| 2010/0281025 A1* | 11/2010 | Tsatsou | G06Q 30/02 | 707/733 |
| 2010/0332475 A1* | 12/2010 | Birdwell | G06F 17/30333 | 707/737 |
| 2011/0035379 A1* | 2/2011 | Chen | G06F 17/30536 | 707/740 |
| 2011/0085697 A1* | 4/2011 | Clippard | G06K 9/4652 | 382/100 |
| 2011/0246409 A1* | 10/2011 | Mitra | G06F 17/18 | 706/52 |
| 2011/0320454 A1* | 12/2011 | Hill | G06F 17/30265 | 707/739 |
| 2012/0096352 A1* | 4/2012 | Maor | H04L 51/32 | 715/706 |
| 2012/0106798 A1* | 5/2012 | Monden | G06K 9/00523 | 382/103 |
| 2012/0123987 A1* | 5/2012 | Deshpande | G06Q 10/0633 | 706/46 |
| 2012/0137367 A1* | 5/2012 | Dupont | G06F 21/00 | 726/25 |
| 2012/0166371 A1* | 6/2012 | Sweeney | G06F 17/30914 | 706/14 |
| 2013/0031475 A1* | 1/2013 | Maor | A63F 13/12 | 715/706 |
| 2013/0117265 A1* | 5/2013 | Mizuguchi | G06Q 30/02 | 707/736 |
| 2013/0304691 A1* | 11/2013 | Pinckney | G06N 99/005 | 706/52 |
| 2014/0245382 A1* | 8/2014 | Pannu | H04L 63/20 | 726/1 |
| 2015/0135261 A1* | 5/2015 | Park | H04L 63/102 | 726/1 |

* cited by examiner

SYSTEMS AND METHODS FOR SOCIAL RECOMMENDATIONS

CROSS-REFERENCE TO RELATED APPLICATIONS

The present application is a non-provisional of, and claims the benefit of, U.S. Provisional Application Nos. 62/067,355 filed on Oct. 22, 2014 and 62/108,953 filed on Jan. 28, 2015, the entire contents of which are incorporated herein by reference.

BACKGROUND OF THE INVENTION

Existing social networking websites or applications are investing efforts in making recommendations to their users in many aspects of our daily life. Some recommendations are results from a combination of marketing strategies, website operation strategies, and a universal collection of opinions or comments from a wide variety of users. A proper recommendation or non-recommendation can be informative and helpful, while a less proper recommendation or non-recommendation on the contrary, can be misleading and sometimes destructive.

SUMMARY OF THE INVENTION

Undeniably, variations exist in making a recommendation regarding an item. A highly recommended item by a large number of strangers doesn't necessarily ensure that the item is going to be a good fit for a specific user, whereas going through each individual recommendation in detail is a time-consuming and inefficient way of finding out the result. A less popular item may very possibly be a good fit to a specific user, if it is recommended by someone reliable or known to the user. There is an obvious need for an easy-to-use and efficient system to fill these existing gaps in making accurate and reliable recommendation.

Described herein are systems, methods, and media for making social recommendations. The present invention focuses not only on the recommendation but also the recommender and the relationship and similarity between the recommender and the user receiving a recommendation in order to ensure the accuracy and reliability in the recommendation. The present invention takes into account a degree of similarity between the recommender and the user receiving the recommendation. Such degree of similarity is analyzed within a full spectrum or any selected partial range of interests of the recommender and the user. The present invention further allows rating of an item via a gamified rating model. With this gamified model, the rating can be performed conveniently within a social recommendation application using one or more games. Only simple interactions with an input device are needed from a user, e.g. a touch screen, in order to complete a rating. A rating of an item that has not been directly experienced by a user is also collected by pre-checking the impression regarding these items. Such aforementioned ratings are used in generating a recommendation or a non-recommendation by the social recommendation application. Further, the present invention makes recommendation to a group of users based on their mutual similarity in interests and their average social distance to the recommender. The present invention also enables the user or the group of users to solicit advices with simple-to-use and structured message. The user or the group of users can directly select or modify predetermined questions in the structured message to their friends or friends of friends. The replies can also be directly selected or modified from predetermined common answers. The present invention provides systems, methods and media that allow making or receiving a recommendation to be easy, efficient, accurate, and reliable.

In one aspect, disclosed herein are computer-implemented systems for making a recommendation for a user based on the user's social relationship and interests comprising: a digital processing device comprising an operating system configured to perform executable instructions and a memory; a computer program including instructions executable by the digital processing device to create a social recommendation application comprising: a software module configured to calculate a social distance between a first user and a second user, wherein the social distance is defined as friend, friend of friend, or nth degree contact, the n being an integer greater than 2 and less than 10; a software module configured to allow the first user and the second user to rate a plurality of items using a gamified rating model; a software module configured to analyze a degree of similarity between the first user and the second user based on the first rating of the plurality of items by the first user and the second rating of the plurality of items by the second user; a software module configured to make a recommendation or a non-recommendation to the first user based on: the social distance between the first user and the second user, the degree of similarity between the first user and the second user, the first rating of the plurality of items by the first user, and the second rating of the plurality of items by the second user; and a software module configured to present the recommendation or non-recommendation to the first user in a manner that comprises a ranked list of items with each item of the ranked list being selected from the plurality of items.

In another aspect, disclosed herein are computer-implemented systems for making a recommendation for a group of users based on the group of users' social relationship and interests comprising: a digital processing device comprising an operating system configured to perform executable instructions and a memory; a computer program including instructions executable by the digital processing device to create a social recommendation application comprising: a software module configured to calculate an average social distance between each member of the group of users and a non-group user, wherein the average social distance is defined as nth degree contact, the n being a finite number no less than 1 and less than 10, and the non-group user being different from each member of the group of users; a software module configured to allow each member of the group of users and the non-group user to rate, using a gamified rating model, a plurality of items by each member of the group of users and the non-group user; a software module configured to analyze a degree of similarity between each member of the group of users and the non-group user based on two or more rating of the plurality of items, wherein each rating of the plurality of items are by each member of the group of user, and a non-group rating of the plurality of items by the non-group user; and a software module configured to make a recommendation or a non-recommendation to the group of users based on the average social distance between the group of users and the user, the degree of similarity between the group of users and the user, and the two or more ratings of the plurality of items, wherein each rating of the plurality of items are by each member of the group of users, and the non-group rating of the plurality of items by the non-group users, wherein the recommendation or non-recommendation comprises a ranked list of items with each item of the ranked list being selected from the plurality of items.

In another aspect, disclosed herein are non-transitory computer-readable storage media encoded with a computer program including instructions executable by a processor to create a social recommendation application comprising: a software module configured to calculate a social distance between a first user and a second user, wherein the social distance is defined as friend, friend of friend, or nth degree contact, the n being an integer greater than 2 and less than 10; a software module configured to allow the first user and the second user to rate a plurality of items using a gamified rating model; a software module configured to analyze a degree of similarity between the first user and the second user based on the first rating of the plurality of items by the first user and the second rating of the plurality of items by the second user; and a software module configured to make a recommendation or a non-recommendation to the first user based on the social distance between the first user and the second user, the degree of similarity between the first user and the second user, the first rating of the plurality of items by the first user, and the second rating of the plurality of items by the second user, wherein the recommendation or non-recommendation comprises a ranked list of items with each item of the ranked list being selected from the plurality of items.

In another aspect, disclosed herein are non-transitory computer-readable storage media encoded with a computer program including instructions executable by a processor to create a social recommendation application comprising: a software module configured to calculate an average social distance between each member of the group of users and a non-group user, wherein the average social distance is defined as nth degree contact, the n being a finite number no less than 1 and less than 10, and the non-group user being different from each member of the group of users; a software module configured to allow each member of the group of users and the non-group user to rate, using a gamified rating model, a plurality of items by each member of the group of users and the non-group user; a software module configured to analyze a degree of similarity between each member of the group of users and the non-group user based on two or more rating of the plurality of items, wherein each rating of the plurality of items are by each member of the group of user, and a non-group rating of the plurality of items by the non-group user; and a software module configured to make a recommendation or a non-recommendation to the group of users based on the average social distance between the group of users and the user, the degree of similarity between the group of users and the user, and the two or more ratings of the plurality of items, wherein each rating of the plurality of items are by each member of the group of users, and the non-group rating of the plurality of items by the non-group user, wherein the recommendation or non-recommendation comprises a ranked list of items with each item of the ranked list being selected from the plurality of items.

In another aspect, disclosed herein are computer-implemented methods of making a social recommendation to a user comprising: calculating, by a computer, a social distance between a first user and a second user, wherein the social distance is defined as friend, friend of friend, or nth degree contact, the n being an integer greater than 2 and less than 10; allowing, by the computer, the first user and the second user to rate a plurality of items using a gamified rating model; analyzing, by the computer, a degree of similarity between the first user and the second user based on the first rating of the plurality of items by the first user and the second rating of the plurality of items by the second user; and making a recommendation or a non-recommendation, by the computer, to the first user based on the social distance between the first user and the second user, the degree of similarity between the first user and the second user, the first rating of the plurality of items by the first user, and the second rating of the plurality of items by the second user, wherein the recommendation or non-recommendation comprises a ranked list of items with each item of the ranked list being selected from the plurality of items.

In another aspect, disclosed herein are computer-implemented methods of making a social recommendation to a group of users comprising: calculating, by a computer, an average social distance between each member of the group of users and a non-group user, wherein the average social distance is defined as nth degree contact, the n being a finite number no less than 1 and less than 10, and the non-group user being different from each member of the group of users; allowing, by the computer, each member of the group of users and the non-group user to rate, using a gamified rating model, a plurality of items by each member of the group of users and the non-group user; analyzing, by the computer, a degree of similarity between each member of the group of users and the non-group user based on two or more rating of the plurality of items, wherein each rating of the plurality of items are by each member of the group of user, and a non-group rating of the plurality of items by the non-group user; and making a recommendation or a non-recommendation, by the computer, to the group of users based on the average social distance between the group of users and the user, the degree of similarity between the group of users and the user, and the two or more ratings of the plurality of items, wherein each rating of the plurality of items are by each member of the group of users, and the non-group rating of the plurality of items by the non-group users wherein the recommendation or non-recommendation comprises a ranked list of items with each item of the ranked list being selected from the plurality of items.

DETAILED DESCRIPTION OF THE INVENTION

Figure 1:
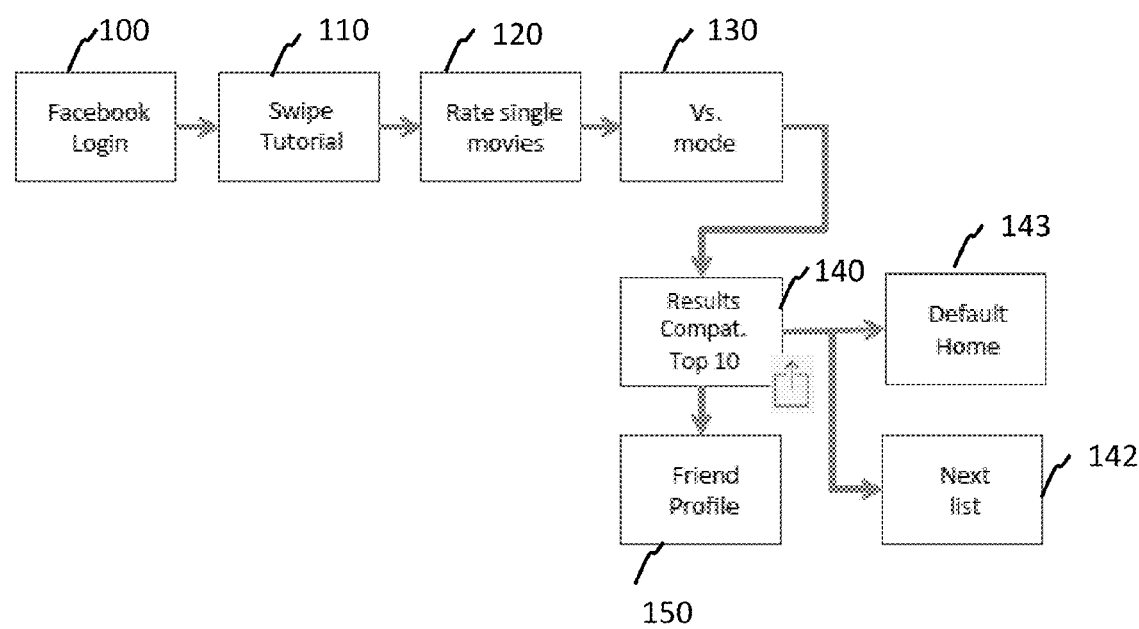
FIG. 1 shows a non-limiting exemplary diagram of a process flow; in this case, a diagram depicting a process for a new user of a social recommendation application to login and participate in the social recommendation described herein.

Undeniably, variations exist in making a recommendation regarding an item. A highly recommended item by a large number of strangers doesn't necessarily ensure that the item is going to be a good fit for a specific user, whereas going through each individual recommendation in detail is a time-consuming and inefficient way of finding out the result. A less popular item may very possibly be a good fit to the specific user, if it is recommended by someone reliable or known to the user. There is an obvious need for an easy-to-use and efficient system to fill these existing gaps in making accurate and reliable recommendations.

Described herein are systems, methods, and media for making social recommendations. The present invention focuses not only on the recommendation but also the recommender and the relationship and similarity between the recommender and the user receiving a recommendation in order to ensure the accuracy and reliability in the recommendation. The present invention takes into account a degree of similarity between the recommender and the user receiving the recommendation. Such degree of similarity is analyzed within a full spectrum or any selected partial range of interests of the recommender and the user. The present invention further allows rating of an item via a gamified rating model. With this gamified model, the rating can be performed conveniently within a social recommendation application using one or more games. Only simple interactions with an input device are needed from a user, e.g. a touch screen, in order to complete a rating. A rating of an item that has not been directly experienced by a user is also collected by pre-checking the impression regarding these items. Such aforementioned ratings are used in generating a recommendation or a non-recommendation by the social recommendation application. Further, the present invention makes recommendation to a group of users based on their mutual similarity in interests and their average social distance to the recommender. The present invention also enables the user or the group of users to solicit advices with simple-to-use and structured message. The user or the group of users can directly select or modify predetermined questions in the structured message to their friends or friends of friends. The replies can also be directly selected or modified from predetermined common answers. The present invention provides systems, methods and media that allow making or receiving a recommendation to be easy, efficient, accurate, and reliable.

Described herein, in certain embodiments, are computer-implemented systems for making a recommendation for a user based on the user's social relationship and interests comprising: a digital processing device comprising an operating system configured to perform executable instructions and a memory; a computer program including instructions executable by the digital processing device to create a social recommendation application comprising: a software module configured to calculate a social distance between a first user and a second user, wherein the social distance is defined as friend, friend of friend, or nth degree contact, the n being an integer greater than 2 and less than 10; a software module configured to allow the first user and the second user to rate a plurality of items using a gamified rating model; a software module configured to analyze a degree of similarity between the first user and the second user based on the first rating of the plurality of items by the first user and the second rating of the plurality of items by the second user; a software module configured to make a recommendation or a non-recommendation to the first user based on: the social distance between the first user and the second user, the degree of similarity between the first user and the second user, the first rating of the plurality of items by the first user, and the second rating of the plurality of items by the second user; and a software module configured to present the recommendation or non-recommendation to the first user in a manner that comprises a ranked list of items with each item of the ranked list being selected from the plurality of items. In some embodiments, the social distance is obtained from an external social network, an external social graph, a mobile phone contact list, an email contact list, a selection by the first user or the second user, or a rating by the first user or the second user. In some embodiments, the social distance is obtained from an internal social network, internal social graph, or internal contact list of a social recommendation application. In some embodiments, the social distance is a finite number that is monotonically non-decreasing with the increase of the number of degree of contact. In some embodiments, the first rating or the second rating of the plurality of items further comprises a pre-check of impression regarding an item from the plurality of items, the item being not directly experienced by the first user or the second user, wherein the impression comprises one selected from: have not tried but definitely want to, have not tried but want to, have not tried and not sure, have not tried because never heard of it, and have not tried because of a negative predisposition. In some embodiments, the first rating or the second rating of the plurality of items further comprises one or more selected from: a text review, a review video, and a review audio. In further embodiments, the text review is less than 140 characters. In further embodiments, the review video or review audio is less than 30 seconds, 40 seconds, 50 seconds, or 60 seconds. In some embodiments, the gamified rating model uses one or more games selected from: an A/B test, wherein two different items from the plurality of items are shown, and the user is asked to select one item over the other item; an up, down, or pass vote, wherein an item from the plurality of item is shown together with a question, and the users is asked to select yes or no to the question regarding the item; an hate, like, or love vote, wherein an item from the plurality of item is shown together with a question, and the users is asked to select hate, don't like, like, love, or haven't watched to the question regarding the item. a sort and edit of a rated list, wherein a subset or a full set of the plurality of items are shown in the rated list, and the user sorts and/or removes one or more items in the rated list, the rated list being generated using one or more selected from: a statistical algorithm, a mathematical algorithm, a numerical algorithm, or an empirical algorithm; and a direct sourcing from one or more non-self users, wherein a direct recommendation regarding an item from the plurality of items is solicited from one or more non-self users. In some embodiments, the plurality of items is related to the interests of the first user or the second user. In some embodiments, each item of the plurality of items is associated with one or more categories, wherein the one or more categories are selected from: movies, TV shows, sport teams, musics, clubs, music bands, restaurants, bars, mobile applications, books, online videos, images, articles, games, sports, electronics, people, and dating. In some embodiments, the claimed device further comprises a software module to allow the first user to filter out one or more ratings of an item in the plurality of items by one or more non-self users using one or more predetermined criteria. In some embodiments, the degree of similarity is one selected from: aligned, slightly aligned, neutral, slightly opposed, or opposed. In some embodiments, the degree of similarity is calculated using one or more selected from: a statistical algorithm, a mathematical algorithm, a numerical algorithm, or an empirical algorithm. In some embodiments, the degree of similarity is calculated with an independent weighting or a dependent weighting for the rating of each item from the plurality of items. In some embodiments, the degree of similarity is further analyzed based on a subset of the plurality of items. In some embodiments, the degree of similarity is further analyzed based on one or more items from the plurality of items within a same category, wherein the same category is selected from: movies, TV shows, sport teams, musics, clubs, music bands, restaurants, bars, mobile applications, books, online videos, images, articles, games, sports, electronics, people, and dating. In some embodiments, the degree of similarity is indicated by one or more colors, wherein green indicates aligned, grey indicate neutral, and red indicate opposed. In some embodiments, the social recommendation application further comprises a software module configured to allow the first user to select and send one or more questions to the second user regarding the recommendation or the non-recommendation. In some embodiments, the social recommendation application further comprises a software module configured to receive one or more predetermined responses from the second user to one or more questions regarding the recommendation or the non-recommendation. In some embodiments, the recommendation or non-recommendation is further based on one or more ratings selected from Rotten Tomatos, Yelp, Facebook, LinkedIn, Google, Orbitz, and Yahoo. In some embodiments, the recommendation application further comprises a software module configured to solicit a second recommendation or non-recommendation from one or more non-self users. In some embodiments, the claimed method further comprises making a second recommendation or non-recommendation to the first user, wherein the second recommendation or non-recommendation comprises a second ranked list of items based on the rating of the plurality of items of items by one or more users that are friend or friend of friend with the first user. In some embodiments, the claimed system further comprises a software module to prorogate the recommendation or the non-recommendation to a third user, wherein the degree of similarity of the first and the third user is above a first predetermined threshold and the social distance between the first and the third user is above a second predetermined threshold. In some embodiments, the claimed system further comprises a software module to allow the first user or the second user to incorporate user generated content regarding an item from the plurality of items. In further embodiments, the user generated content comprises a URL, an image, a video, a text, an audio regarding an item from the plurality of items. In some embodiments, the software module configured to make the recommendation or the non-recommendation to the first user further based on one or more item descriptive tags selected from: genre, price, director, cast, location, release data, language, film duration, and movie classification. In some embodiments, the claimed system further comprises a software module to allow the first user to search for recommendations or non-recommendations regarding an item, wherein the search results are from users that are within a predetermined social distance to the first user. In some embodiments, the claimed system further comprises a software module to allow a user to add or edit a profile, wherein the profile comprises one or more selected from: one or more categories of interests, one or more recommendations or non-recommendations by a non-self user, information of one or more followers; information of one or more following users, a link to each follower's profile, and a link to each following user's profile.

Also described herein, in certain embodiments, are computer-implemented systems for making a recommendation for a group of users based on the group of users' social relationship and interests comprising: a digital processing device comprising an operating system configured to perform executable instructions and a memory; a computer program including instructions executable by the digital processing device to create a social recommendation application comprising: a software module configured to calculate an average social distance between each member of the group of users and a non-group user, wherein the average social distance is defined as nth degree contact, the n being a finite number no less than 1 and less than 10, and the non-group user being different from each member of the group of users; a software module configured to allow each member of the group of users and the non-group user to rate, using a gamified rating model, a plurality of items by each member of the group of users and the non-group user; a software module configured to analyze a degree of similarity between each member of the group of users and the non-group user based on two or more rating of the plurality of items, wherein each rating of the plurality of items are by each member of the group of user, and a non-group rating of the plurality of items by the non-group user; and a software module configured to make a recommendation or a non-recommendation to the group of users based on the average social distance between the group of users and the user, the degree of similarity between the group of users and the user, and the two or more ratings of the plurality of items, wherein each rating of the plurality of items are by each member of the group of users, and the non-group rating of the plurality of items by the non-group users, wherein the recommendation or non-recommendation comprises a ranked list of items with each item of the ranked list being selected from the plurality of items. In certain embodiments, the social distance is obtained from an external social network, an external social graph, a mobile phone contact list, an email contact list, a selection by the non-group of user or each member of the group of users, or a rating by the non-group of user or each member of the group of users. In certain embodiments, the social distance is obtained from an internal social network, internal social graph, or internal contact list of a social recommendation application. In certain embodiments, the social distance is a finite number that is monotonically non-decreasing with the increase of the number of degree of contact. In certain embodiments, the first rating or the second rating of the plurality of items further comprises a pre-check of impression regarding an item from the plurality of items, the item being not directly experienced by the non-group user or each member the group of users, wherein the impression comprises one selected from: have not tried but definitely want to, have not tried but want to, have not tried and not sure, have not tried because never heard of it, and have not tried because of a negative predisposition. In certain embodiments, the first rating or the second rating of the plurality of items further comprises one or more selected from: a text review, a review video, and a review audio. In further embodiments, the text review is less than 140 characters. In further embodiments, the review video or review audio is less than 30 seconds, 40 seconds, 50 seconds, or 60 seconds. In certain embodiments, the gamified rating model uses one or more games selected from: an A/B test, wherein two different items from the plurality of items are shown, and the user is asked to select one item over the other item; an up, down, or pass vote, wherein an item from the plurality of item is shown together with a question, and the users is asked to select yes or no to the question regarding the item; an hate, like, or love vote, wherein an item from the plurality of item is shown together with a question, and the users is asked to select hate, don't like, like, love, or haven't watched to the question regarding the item, a sort and edit of a rated list, wherein a subset or a full set of the plurality of items are shown in the rated list, and the user sorts and/or removes one or more items in the rated list, the rated list being generated using one or more selected from: a statistical algorithm, a mathematical algorithm, a numerical algorithm, or an empirical algorithm; and a direct sourcing from one or more non-self users, wherein a direct recommendation regarding an item from the plurality of items is solicited from one or more non-self users. In certain embodiments, the plurality of items is related to the interests of the non-group of user or each member of the group of users. In certain embodiments, each item of the plurality of items is associated with one or more categories, wherein the one or more categories are selected from: movies, TV shows, sport teams, musics, clubs, music bands, restaurants, bars, mobile applications, books, online videos, images, articles, games, sports, electronics, people, and dating. In some embodiments, the claimed system further comprises a software module to allow each member of the group of users to filter out one or more ratings of an item in the plurality of items by one or more non-group users using one or more predetermined criteria. In certain embodiments, the degree of similarity is one selected from: aligned, slightly aligned, neutral, slightly opposed, or opposed. In certain embodiments, the degree of similarity is calculated using one or more selected from: a statistical algorithm, a mathematical algorithm, a numerical algorithm, or an empirical algorithm. In certain embodiments, the degree of similarity is calculated with an independent weighting or a dependent weighting for the rating of each item from the plurality of items. In certain embodiments, the degree of similarity is further analyzed based on a subset of the plurality of items. In certain embodiments, the degree of similarity is further analyzed based on one or more items from the plurality of items within a same category, wherein the same category is selected from: movies, TV shows, sport teams, musics, clubs, music bands, restaurants, bars, mobile applications, books, online videos, images, articles, games, sports, electronics, people, and dating. In certain embodiments, the degree of similarity is indicated by one or more colors, wherein green indicates aligned, grey indicate neutral, and red indicate opposed. In certain embodiments, the social recommendation application further comprises a software module configured to allow each member of the group of users to select and send one or more questions to the non-group user regarding the recommendation or the non-recommendation. In certain embodiments, the social recommendation application further comprises a software module configured to receive one or more predetermined responses from the non-group user to one or more questions regarding the recommendation or the non-recommendation. In certain embodiments, the recommendation or non-recommendation is further based on one or more ratings selected from Rotten Tomatos, Yelp, Facebook, LinkedIn, Google, Orbitz, and Yahoo. In certain embodiments, the recommendation application further comprises a software module configured to solicit a second recommendation or non-recommendation from one or more non-self users. In some embodiments, the claimed system further comprises a software module to make a second recommendation or non-recommendation to the group of users, wherein the second recommendation or non-recommendation comprises a second ranked list of items based on the rating of the plurality of items of items by one or more users that are friend or friend of friend with each member of the group of users. In some embodiments, the claimed system further comprises a software module to prorogate the recommendation or the non-recommendation to a third user, wherein the degree of similarity of the group of users and another non-group user is above a first predetermined threshold and the social distance between the group of users and another non-group user is above a second predetermined threshold. In some embodiments, the claimed system further comprises a software module to allow the group of users and the non-group user to incorporate user generated content regarding an item from the plurality of items. In further embodiments, the user generated content comprises a URL, an image, a video, a text, an audio regarding an item from the plurality of items. In certain embodiments, the software module configured to make the recommendation or the non-recommendation to the group of users further based on one or more item descriptive tags selected from: a genre, a price, a director, a cast, a location, a release data, a language, a film duration, and a movie classification. In some embodiments, the claimed system further comprises a software module to allow each member the group of users to search for recommendations or non-recommendations regarding an item, wherein the search results are from users that are within a predetermined average social distance to the group of users. In some embodiments, the claimed system further comprises a software module to allow a user to add or edit a profile, wherein the profile comprises one or more selected from: one or more categories of interests, one or more recommendations or non-recommendations by a non-self user, information of one or more followers; information of one or more following users, a link to each follower's profile, and a link to each following user's profile.

Also described herein, in certain embodiments, are non-transitory computer-readable storage media encoded with a computer program including instructions executable by a processor to create a social recommendation application comprising: a software module configured to calculate a social distance between a first user and a second user, wherein the social distance is defined as friend, friend of friend, or nth degree contact, the n being an integer greater than 2 and less than 10; a software module configured to allow the first user and the second user to rate a plurality of items using a gamified rating model; a software module configured to analyze a degree of similarity between the first user and the second user based on the first rating of the plurality of items by the first user and the second rating of the plurality of items by the second user; and a software module configured to make a recommendation or a non-recommendation to the first user based on the social distance between the first user and the second user, the degree of similarity between the first user and the second user, the first rating of the plurality of items by the first user, and the second rating of the plurality of items by the second user, wherein the recommendation or non-recommendation comprises a ranked list of items with each item of the ranked list being selected from the plurality of items. In some embodiments, the social distance is obtained from an external social network, an external social graph, a mobile phone contact list, an email contact list, a selection by the first user or the second user, or a rating by the first user or the second user. In some embodiments, the social distance is obtained from an internal social network, internal social graph, or internal contact list of a social recommendation application. In some embodiments, the social distance is a finite number that is monotonically non-decreasing with the increase of the number of degree of contact. In some embodiments, the first rating or the second rating of the plurality of items further comprises a pre-check of impression regarding an item from the plurality of items, the item being not directly experienced by the first user or the second user, wherein the impression comprises one selected from: have not tried but definitely want to, have not tried but want to, have not tried and not sure, have not tried because never heard of it, and have not tried because of a negative predisposition. In some embodiments, the first rating or the second rating of the plurality of items further comprises one or more selected from: a text review, a review video, and a review audio. In further embodiments, the text review is less than 140 characters. In further embodiments, the review video or review audio is less than 30 seconds, 40 seconds, 50 seconds, or 60 seconds. In some embodiments, the gamified rating model uses one or more games selected from: an A/B test, wherein two different items from the plurality of items are shown, and the user is asked to select one item over the other item; an up, down, or pass vote, wherein an item from the plurality of item is shown together with a question, and the users is asked to select yes or no to the question regarding the item; an hate, like, or love vote, wherein an item from the plurality of item is shown together with a question, and the users is asked to select hate, don't like, like, love, or haven't watched to the question regarding the item. a sort and edit of a rated list, wherein a subset or a full set of the plurality of items are shown in the rated list, and the user sorts and/or removes one or more items in the rated list, the rated list being generated using one or more selected from: a statistical algorithm, a mathematical algorithm, a numerical algorithm, or an empirical algorithm; and a direct sourcing from one or more non-self users, wherein a direct recommendation regarding an item from the plurality of items is solicited from one or more non-self users. In some embodiments, the plurality of items is related to the interests of the first user or the second user. In some embodiments, each item of the plurality of items is associated with one or more categories, wherein the one or more categories are selected from: movies, TV shows, sport teams, musics, clubs, music bands, restaurants, bars, mobile applications, books, online videos, images, articles, games, sports, electronics, people, and dating. In some embodiments, the claimed device further comprises a software module to allow the first user to filter out one or more ratings of an item in the plurality of items by one or more non-self users using one or more predetermined criteria. In some embodiments, the degree of similarity is one selected from: aligned, slightly aligned, neutral, slightly opposed, or opposed. In some embodiments, the degree of similarity is calculated using one or more selected from: a statistical algorithm, a mathematical algorithm, a numerical algorithm, or an empirical algorithm. In some embodiments, the degree of similarity is calculated with an independent weighting or a dependent weighting for the rating of each item from the plurality of items. In some embodiments, the degree of similarity is further analyzed based on a subset of the plurality of items. In some embodiments, the degree of similarity is further analyzed based on one or more items from the plurality of items within a same category, wherein the same category is selected from: movies, TV shows, sport teams, musics, clubs, music bands, restaurants, bars, mobile applications, books, online videos, images, articles, games, sports, electronics, people, and dating. In some embodiments, the degree of similarity is indicated by one or more colors, wherein green indicates aligned, grey indicate neutral, and red indicate opposed. In some embodiments, the social recommendation application further comprises a software module configured to allow the first user to select and send one or more questions to the second user regarding the recommendation or the non-recommendation. In some embodiments, the social recommendation application further comprises a software module configured to receive one or more predetermined responses from the second user to one or more questions regarding the recommendation or the non-recommendation. In some embodiments, the recommendation or non-recommendation is further based on one or more ratings selected from Rotten Tomatos, Yelp, Facebook, LinkedIn, Google, Orbitz, and Yahoo. In some embodiments, the recommendation application further comprises a software module configured to solicit a second recommendation or non-recommendation from one or more non-self users. In some embodiments, the claimed media further comprises a software module to make a second recommendation or non-recommendation to the first user, wherein the second recommendation or non-recommendation comprises a second ranked list of items based on the rating of the plurality of items of items by one or more users that are friend or friend of friend with the first user. In some embodiments, the claimed media further comprises a software module to prorogate the recommendation or the non-recommendation to a third user, wherein the degree of similarity of the first and the third user is above a first predetermined threshold and the social distance between the first and the third user is above a second predetermined threshold. In some embodiments, the claimed media further comprises a software module to allow the first user or the second user to incorporate user generated content regarding an item from the plurality of items. In further embodiments, the user generated content comprises a URL, an image, a video, a text, an audio regarding an item from the plurality of items. In some embodiments, the software module configured to make the recommendation or the non-recommendation to the first user further based on one or more item descriptive tags selected from: a genre, a price, a director, a cast, a location, a release data, a language, a film duration, and a movie classification. In some embodiments, the claimed media further comprises a software module to allow the first user to search for recommendations or non-recommendations regarding an item, wherein the search results are from users that are within a predetermined social distance to the first user. In some embodiments, the claimed media further comprises a software module to allow a user to add or edit a profile, wherein the profile comprises one or more selected from: one or more categories of interests, one or more recommendations or non-recommendations by a non-self user, information of one or more followers; information of one or more following users, a link to each follower's profile, and a link to each following user's profile.

Also described herein, in certain embodiments, are non-transitory computer-readable storage media encoded with a computer program including instructions executable by a processor to create a social recommendation application comprising: a software module configured to calculate an average social distance between each member of the group of users and a non-group user, wherein the average social distance is defined as nth degree contact, the n being a finite number no less than 1 and less than 10, and the non-group user being different from each member of the group of users; a software module configured to allow each member of the group of users and the non-group user to rate, using a gamified rating model, a plurality of items by each member of the group of users and the non-group user; a software module configured to analyze a degree of similarity between each member of the group of users and the non-group user based on two or more rating of the plurality of items, wherein each rating of the plurality of items are by each member of the group of user, and a non-group rating of the plurality of items by the non-group user; and a software module configured to make a recommendation or a non-recommendation to the group of users based on the average social distance between the group of users and the user, the degree of similarity between the group of users and the user, and the two or more ratings of the plurality of items, wherein each rating of the plurality of items are by each member of the group of users, and the non-group rating of the plurality of items by the non-group user, wherein the recommendation or non-recommendation comprises a ranked list of items with each item of the ranked list being selected from the plurality of items. In certain embodiments, the social distance is obtained from an external social network, an external social graph, a mobile phone contact list, an email contact list, a selection by the non-group of user or each member of the group of users, or a rating by the non-group of user or each member of the group of users. In certain embodiments, the social distance is obtained from an internal social network, internal social graph, or internal contact list of a social recommendation application. In certain embodiments, the social distance is a finite number that is monotonically non-decreasing with the increase of the number of degree of contact. In certain embodiments, the first rating or the second rating of the plurality of items further comprises a pre-check of impression regarding an item from the plurality of items, the item being not directly experienced by the non-group user or each member the group of users, wherein the impression comprises one selected from: have not tried but definitely want to, have not tried but want to, have not tried and not sure, have not tried because never heard of it, and have not tried because of a negative predisposition. In certain embodiments, the first rating or the second rating of the plurality of items further comprises one or more selected from: a text review, a review video, and a review audio. In further embodiments, the text review is less than 140 characters. In further embodiments, the review video or review audio is less than 30 seconds, 40 seconds, 50 seconds, or 60 seconds. In certain embodiments, the gamified rating model uses one or more games selected from: an A/B test, wherein two different items from the plurality of items are shown, and the user is asked to select one item over the other item; an up, down, or pass vote, wherein an item from the plurality of item is shown together with a question, and the users is asked to select yes or no to the question regarding the item; an hate, like, or love vote, wherein an item from the plurality of item is shown together with a question, and the users is asked to select hate, don't like, like, love, or haven't watched to the question regarding the item, a sort and edit of a rated list, wherein a subset or a full set of the plurality of items are shown in the rated list, and the user sorts and/or removes one or more items in the rated list, the rated list being generated using one or more selected from: a statistical algorithm, a mathematical algorithm, a numerical algorithm, or an empirical algorithm; and a direct sourcing from one or more non-self users, wherein a direct recommendation regarding an item from the plurality of items is solicited from one or more non-self users. In certain embodiments, the plurality of items is related to the interests of the non-group of user or each member of the group of users. In certain embodiments, each item of the plurality of items is associated with one or more categories, wherein the one or more categories are selected from: movies, TV shows, sport teams, musics, clubs, music bands, restaurants, bars, mobile applications, books, online videos, images, articles, games, sports, electronics, people, and dating. In some embodiments, the claimed media further comprises a software module to allow each member of the group of users to filter out one or more ratings of an item in the plurality of items by one or more non-group users using one or more predetermined criteria. In certain embodiments, the degree of similarity is one selected from: aligned, slightly aligned, neutral, slightly opposed, or opposed. In certain embodiments, the degree of similarity is calculated using one or more selected from: a statistical algorithm, a mathematical algorithm, a numerical algorithm, or an empirical algorithm. In certain embodiments, the degree of similarity is calculated with an independent weighting or a dependent weighting for the rating of each item from the plurality of items. In certain embodiments, the degree of similarity is further analyzed based on a subset of the plurality of items. In certain embodiments, the degree of similarity is further analyzed based on one or more items from the plurality of items within a same category, wherein the same category is selected from: movies, TV shows, sport teams, musics, clubs, music bands, restaurants, bars, mobile applications, books, online videos, images, articles, games, sports, electronics, people, and dating. In certain embodiments, the degree of similarity is indicated by one or more colors, wherein green indicates aligned, grey indicate neutral, and red indicate opposed. In certain embodiments, the social recommendation application further comprises a software module configured to allow each member of the group of users to select and send one or more questions to the non-group user regarding the recommendation or the non-recommendation. In certain embodiments, the social recommendation application further comprises a software module configured to receive one or more predetermined responses from the non-group user to one or more questions regarding the recommendation or the non-recommendation. In certain embodiments, the recommendation or non-recommendation is further based on one or more ratings selected from Rotten Tomatoes, Yelp, Facebook, LinkedIn, Google, Orbitz, and Yahoo. In certain embodiments, the recommendation application further comprises a software module configured to solicit a second recommendation or non-recommendation from one or more non-self users. In some embodiments, the claimed media further comprises a software module to make a second recommendation or non-recommendation to the group of users, wherein the second recommendation or non-recommendation comprises a second ranked list of items based on the rating of the plurality of items of items by one or more users that are friend or friend of friend with each member of the group of users. In some embodiments, the claimed media further comprises a software module to prorogate the recommendation or the non-recommendation to a third user, wherein the degree of similarity of the group of users and another non-group user is above a first predetermined threshold and the social distance between the group of users and another non-group user is above a second predetermined threshold. In some embodiments, the claimed media further comprises a software module to allow the group of users and the non-group user to incorporate user generated content regarding an item from the plurality of items. In further embodiments, the user generated content comprises a URL, an image, a video, a text, an audio regarding an item from the plurality of items. In certain embodiments, the software module configured to make the recommendation or the non-recommendation to the group of users further based on one or more item descriptive tags selected from: genre, price, director, cast, location, release data, language, film duration, and movie classification. In some embodiments, the claimed media further comprises a software module to allow each member the group of users to search for recommendations or non-recommendations regarding an item, wherein the search results are from users that are within a predetermined average social distance to the group of users. In some embodiments, the claimed media further comprises a software module to allow a user to add or edit a profile, wherein the profile comprises one or more selected from: one or more categories of interests, one or more recommendations or non-recommendations by a non-self user, information of one or more followers; information of one or more following users, a link to each follower's profile, and a link to each following user's profile.

Also described herein, in certain embodiments, are computer-implemented methods of making a social recommendation to a user comprising: calculating, by a computer, a social distance between a first user and a second user, wherein the social distance is defined as friend, friend of friend, or nth degree contact, the n being an integer greater than 2 and less than 10; allowing, by the computer, the first user and the second user to rate a plurality of items using a gamified rating model; analyzing, by the computer, a degree of similarity between the first user and the second user based on the first rating of the plurality of items by the first user and the second rating of the plurality of items by the second user; and making a recommendation or a non-recommendation, by the computer, to the first user based on the social distance between the first user and the second user, the degree of similarity between the first user and the second user, the first rating of the plurality of items by the first user, and the second rating of the plurality of items by the second user, wherein the recommendation or non-recommendation comprises a ranked list of items with each item of the ranked list being selected from the plurality of items. In some embodiments, the social distance is obtained from an external social network, an external social graph, a mobile phone contact list, an email contact list, a selection by the first user or the second user, or a rating by the first user or the second user. In some embodiments, the social distance is obtained from an internal social network, internal social graph, or internal contact list of a social recommendation application. In some embodiments, the social distance is a finite number that is monotonically non-decreasing with the increase of the number of degree of contact. In some embodiments, the first rating or the second rating of the plurality of items further comprises a pre-check of impression regarding an item from the plurality of items, the item being not directly experienced by the first user or the second user, wherein the impression comprises one selected from: have not tried but definitely want to, have not tried but want to, have not tried and not sure, have not tried because never heard of it, and have not tried because of a negative predisposition. In some embodiments, the first rating or the second rating of the plurality of items further comprises one or more selected from: a text review, a review video, and a review audio. In further embodiments, the text review is less than 140 characters. In further embodiments, the review video or review audio is less than 30 seconds, 40 seconds, 50 seconds, or 60 seconds. In some embodiments, the gamified rating model uses one or more games selected from: an A/B test, wherein two different items from the plurality of items are shown, and the user is asked to select one item over the other item; an up, down, or pass vote, wherein an item from the plurality of item is shown together with a question, and the users is asked to select yes or no to the question regarding the item; an hate, like, or love vote, wherein an item from the plurality of item is shown together with a question, and the users is asked to select hate, don't like, like, love, or haven't watched to the question regarding the item. a sort and edit of a rated list, wherein a subset or a full set of the plurality of items are shown in the rated list, and the user sorts and/or removes one or more items in the rated list, the rated list being generated using one or more selected from: a statistical algorithm, a mathematical algorithm, a numerical algorithm, or an empirical algorithm; and a direct sourcing from one or more non-self users, wherein a direct recommendation regarding an item from the plurality of items is solicited from one or more non-self users. In some embodiments, the plurality of items IS related to the interests of the first user or the second user. In some embodiments, each item of the plurality of items is associated with one or more categories, wherein the one or more categories are selected from: movies, TV shows, sport teams, musics, clubs, music bands, restaurants, bars, mobile applications, books, online videos, images, articles, games, sports, electronics, people, and dating. In some embodiments, the claimed device further comprises a software module to allow the first user to filter out one or more ratings of an item in the plurality of items by one or more non-self users using one or more predetermined criteria. In some embodiments, the degree of similarity is one selected from: aligned, slightly aligned, neutral, slightly opposed, or opposed. In some embodiments, the degree of similarity is calculated using one or more selected from: a statistical algorithm, a mathematical algorithm, a numerical algorithm, or an empirical algorithm. In some embodiments, the degree of similarity is calculated with an independent weighting or a dependent weighting for the rating of each item from the plurality of items. In some embodiments, the degree of similarity is further analyzed based on a subset of the plurality of items. In some embodiments, the degree of similarity is further analyzed based on one or more items from the plurality of items within a same category, wherein the same category is selected from: movies, TV shows, sport teams, musics, clubs, music bands, restaurants, bars, mobile applications, books, online videos, images, articles, games, sports, electronics, people, and dating. In some embodiments, the degree of similarity is indicated by one or more colors, wherein green indicates aligned, grey indicate neutral, and red indicate opposed. In some embodiments, the social recommendation application further comprises a software module configured to allow the first user to select and send one or more questions to the second user regarding the recommendation or the non-recommendation. In some embodiments, the social recommendation application further comprises a software module configured to receive one or more predetermined responses from the second user to one or more questions regarding the recommendation or the non-recommendation. In some embodiments, the recommendation or non-recommendation is further based on one or more ratings selected from Rotten Tomatos, Yelp, Facebook, LinkedIn, Google, Orbitz, and Yahoo. In some embodiments, the recommendation application further comprises a software module configured to solicit a second recommendation or non-recommendation from one or more non-self users. In some embodiments, the claimed method further comprises making a second recommendation or non-recommendation to the first user, wherein the second recommendation or non-recommendation comprises a second ranked list of items based on the rating of the plurality of items of items by one or more users that are friend or friend of friend with the first user. In some embodiments, the claimed method further comprises prorogating the recommendation or the non-recommendation to a third user, wherein the degree of similarity of the first and the third user is above a first predetermined threshold and the social distance between the first and the third user is above a second predetermined threshold. In some embodiments, the claimed method further comprises allowing the first user or the second user to incorporate user generated content regarding an item from the plurality of items. In further embodiments, the user generated content comprises a URL, an image, a video, a text, an audio regarding an item from the plurality of items. In some embodiments, the software module configured to make the recommendation or the non-recommendation to the first user further based on one or more item descriptive tags selected from: genre, price, director, cast, location, release data, language, film duration, and movie classification. In some embodiments, the claimed method further comprises allowing the first user to search for recommendations or non-recommendations regarding an item, wherein the search results are from users that are within a predetermined social distance to the first user. In some embodiments, the claimed method further comprises allowing a user to add or edit a profile, wherein the profile comprises one or more selected from: one or more categories of interests, one or more recommendations or non-recommendations by a non-self user, information of one or more followers; information of one or more following users, a link to each follower's profile, and a link to each following user's profile.

Also described herein, in certain embodiments, are computer-implemented methods of making a social recommendation to a group of users comprising: calculating, by a computer, an average social distance between each member of the group of users and a non-group user, wherein the average social distance is defined as nth degree contact, the n being a finite number no less than 1 and less than 10, and the non-group user being different from each member of the group of users; allowing, by the computer, each member of the group of users and the non-group user to rate, using a gamified rating model, a plurality of items by each member of the group of users and the non-group user; analyzing, by the computer, a degree of similarity between each member of the group of users and the non-group user based on two or more rating of the plurality of items, wherein each rating of the plurality of items are by each member of the group of user, and a non-group rating of the plurality of items by the non-group user; and making a recommendation or a non-recommendation, by the computer, to the group of users based on the average social distance between the group of users and the user, the degree of similarity between the group of users and the user, and the two or more ratings of the plurality of items, wherein each rating of the plurality of items are by each member of the group of users, and the non-group rating of the plurality of items by the non-group users wherein the recommendation or non-recommendation comprises a ranked list of items with each item of the ranked list being selected from the plurality of items. In certain embodiments, the social distance is obtained from an external social network, an external social graph, a mobile phone contact list, an email contact list, a selection by the non-group of user or each member of the group of users, or a rating by the non-group of user or each member of the group of users. In certain embodiments, the social distance is obtained from an internal social network, internal social graph, or internal contact list of a social recommendation application. In certain embodiments, the social distance is a finite number that is monotonically non-decreasing with the increase of the number of degree of contact. In certain embodiments, the first rating or the second rating of the plurality of items further comprises a pre-check of impression regarding an item from the plurality of items, the item being not directly experienced by the non-group user or each member the group of users, wherein the impression comprises one selected from: have not tried but definitely want to, have not tried but want to, have not tried and not sure, have not tried because never heard of it, and have not tried because of a negative predisposition. In certain embodiments, the first rating or the second rating of the plurality of items further comprises one or more selected from: a text review, a review video, and a review audio. In further embodiments, the text review is less than 140 characters. In further embodiments, the review video or review audio is less than 30 seconds, 40 seconds, 50 seconds, or 60 seconds. In certain embodiments, the gamified rating model uses one or more games selected from: an AB test, wherein two different items from the plurality of items are shown, and the user is asked to select one item over the other item; an up, down, or pass vote, wherein an item from the plurality of item is shown together with a question, and the users is asked to select yes or no to the question regarding the item; an hate, like, or love vote, wherein an item from the plurality of item is shown together with a question, and the users is asked to select hate, don't like, like, love, or haven't watched to the question regarding the item, a sort and edit of a rated list, wherein a subset or a full set of the plurality of items are shown in the rated list, and the user sorts and/or removes one or more items in the rated list, the rated list being generated using one or more selected from: a statistical algorithm, a mathematical algorithm, a numerical algorithm, or an empirical algorithm; and a direct sourcing from one or more non-self users, wherein a direct recommendation regarding an item from the plurality of items is solicited from one or more non-self users. In certain embodiments, the plurality of items is related to the interests of the non-group of user or each member of the group of users. In certain embodiments, each item of the plurality of items is associated with one or more categories, wherein the one or more categories are selected from: movies, TV shows, sport teams, musics, clubs, music bands, restaurants, bars, mobile applications, books, online videos, images, articles, games, sports, electronics, people, and dating. In some embodiments, the claimed method further comprises allowing each member of the group of users to filter out one or more ratings of an item in the plurality of items by one or more non-group users using one or more predetermined criteria. In certain embodiments, the degree of similarity is one selected from: aligned, slightly aligned, neutral, slightly opposed, or opposed. In certain embodiments, the degree of similarity is calculated using one or more selected from: a statistical algorithm, a mathematical algorithm, a numerical algorithm, or an empirical algorithm. In certain embodiments, the degree of similarity is calculated with an independent weighting or a dependent weighting for the rating of each item from the plurality of items. In certain embodiments, the degree of similarity is further analyzed based on a subset of the plurality of items. In certain embodiments, the degree of similarity is further analyzed based on one or more items from the plurality of items within a same category, wherein the same category is selected from: movies, TV shows, sport teams, musics, clubs, music bands, restaurants, bars, mobile applications, books, online videos, images, articles, games, sports, electronics, people, and dating. In certain embodiments, the degree of similarity is indicated by one or more colors, wherein green indicates aligned, grey indicate neutral, and red indicate opposed. In certain embodiments, the social recommendation application further comprises a software module configured to allow each member of the group of users to select and send one or more questions to the non-group user regarding the recommendation or the non-recommendation. In certain embodiments, the social recommendation application further comprises a software module configured to receive one or more predetermined responses from the non-group user to one or more questions regarding the recommendation or the non-recommendation. In certain embodiments, the recommendation or non-recommendation is further based on one or more ratings selected from Rotten Tomatos, Yelp, Facebook, LinkedIn, Google, Orbitz, and Yahoo. In certain embodiments, the recommendation application further comprises a software module configured to solicit a second recommendation or non-recommendation from one or more non-self users. In some embodiments, the claimed method further comprises making a second recommendation or non-recommendation to the group of users, wherein the second recommendation or non-recommendation comprises a second ranked list of items based on the rating of the plurality of items of items by one or more users that are friend or friend of friend with each member of the group of users. In some embodiments, the claimed method further comprises prorogating the recommendation or the non-recommendation to a third user, wherein the degree of similarity of the group of users and another non-group user is above a first predetermined threshold and the social distance between the group of users and another non-group user is above a second predetermined threshold. In some embodiments, the claimed method further comprises allowing the group of users and the non-group user to incorporate user generated content regarding an item from the plurality of items. In further embodiments, the user generated content comprises a URL, an image, a video, a text, an audio regarding an item from the plurality of items. In certain embodiments, the software module configured to make the recommendation or the non-recommendation to the group of users further based on one or more item descriptive tags selected from: genre, price, director, cast, location, release data, language, film duration, and movie classification. In some embodiments, the claimed method further comprises allowing each member the group of users to search for recommendations or non-recommendations regarding an item, wherein the search results are from users that are within a predetermined average social distance to the group of users. In some embodiments, the claimed method further comprises allowing a user to add or edit a profile, wherein the profile comprises one or more selected from: one or more categories of interests, one or more recommendations or non-recommendations by a non-self user, information of one or more followers; information of one or more following users, a link to each follower's profile, and a link to each following user's profile.

CERTAIN TERMINOLOGIES

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

OVERVIEW

Described herein are systems, methods, and media for making social recommendations. The present invention focuses not only on the recommendation but also the recommender and the relationship and similarity between the recommender and the user receiving a recommendation in order to ensure the accuracy and reliability in the recommendation. The present invention takes into account a degree of similarity between the recommender and the user receiving the recommendation. Such degree of similarity is analyzed within a full spectrum or any selected partial range of interests of the recommender and the user. The present invention further allows rating of an item via a gamified rating model. With this gamified model, the rating can be performed conveniently within a social recommendation application using one or more games. Only simple interactions with an input device are needed from a user, e.g. a touch screen, in order to complete a rating. A rating of an item that has not been directly experienced by a user is also collected by pre-checking the impression regarding these items. Such aforementioned ratings are used in generating a recommendation or a non-recommendation by the social recommendation application. Further, the present invention makes recommendation to a group of users based on their mutual similarity in interests and their average social distance to the recommender. The present invention also enables the user or the group of users to solicit advices with simple-to-use and structured message. The user or the group of users can directly select or modify predetermined questions in the structured message to their friends or friends of friends. The replies can also be directly selected or modified from predetermined common answers. The present invention provides systems, methods and media that allow making or receiving a recommendation to be easy, efficient, accurate, and reliable.

Social Distances and Average Social Distances

In certain embodiments, the systems, media, and methods described herein include a social distance, an average social distance, or use of the same. In some embodiments, the social distance is calculated by determining how close the social relationship is between two users, i.e., mutual friend, friend of friend, or nth degree contact. In some embodiments, the two users are $1^{st}$ degree contact, i.e., mutual friends, $2^{nd}$ degree contact, i.e., friend of friend, or $3^{rd}$ degree contact, friend of friend of friend, or $n^{th}$ degree contact. n is an integer greater than 0 but less than 10. In some embodiments, the social distance equals n when the two users are the nth degree of contact to each other. In some embodiments, the social distance equals 1 when the two users are mutual friends and the social distance equals 2 when the two users are friends of friend.

In certain embodiments, the average social distance is calculated by determining how close the social relationship is between a non-group user and a group of users. In certain embodiments, the social distance between each member of the group of user and the non-group user are calculated individually, and the average social distance is calculated as the average of the individual social distances between each member of the group of users and the non-group user. In further embodiments, the average social distance is a finite number or a finite decimal number. For example, a group of users has 3 members, 2 of them are $2^{nd}$ degree contact with a non-group user, and the other one member is a $3^{rd}$ degree contact with the non-group user. The average social distance between this group of users and the non-group user is 2.33. In some embodiments, the closer the social relationship, the smaller the social distance.

In various embodiments, the calculation of social distance has a further thresholding or weighting mechanism determined by a social recommendation application or manually selected by a user. Such thresholding or weighting mechanism emphasizes users that are in close social relationship to each other. In further embodiments, the social distance is equal to n when n is less than or equal to 3, 4, 5, 6, 7, 8, or 9. In some embodiments, the social distance is set to one or more predetermined values, when the social distance is not less than 3, 4, 5, 6, 7, 8, 9, or 10. For example, a social recommendation application sets a social distance to be 10 when the two users are not friends or friend of friend to emphasize a close social relationship between the two users.

In some embodiments, the calculation of social distance is based on social relationships, i.e., friend, friend of friend, nth degree contact, obtained from one or more selected from: an external social network, an external social graph, an email contact list, an online messaging contact list, a mobile phone contact list, an internal social network, social graph, or contact list in a social recommendation application. In further embodiments, the external social network or social graph are obtained from social networking websites, online messaging or chat applications, microblog contact lists, or online calling applications. In further embodiments, non-limiting examples of external websites includes Facebook, Twitter, Google+, Yahoo massager, MSN massager, GTalk, Renren, ICQ, Wechat, Jabber, Neighbors, AIM, Skype, Ebuddy, Kik messenger, or the like.

In some embodiments, even if the social relationship may look the same, different weightings can be given to the identical social relationships obtained from different sources. In further embodiments, higher weighting is given to social relationships defined within a social recommendation application over external sources. In other embodiments, higher weighting is given to social relationships from a source that has a larger number of contacts or a more complete social network or social graph. For example, a user has 80 contacts in Facebook, but only 5 contacts in Twitter. Thus, the weighting of the social relationship in Facebook is higher than that of Twitter. In some embodiments, higher weighting is given to social relationships selected based on a user's preference. In some embodiments, higher weighting is given to the social relationships that overlap among different sources. In some embodiments, when the social relationship is the same, higher weighting in a social relationship indicates a closer social distance. For example, the user has user X as friend in 3 different sources, i.e., Facebook, Gtalk, and phone contact, and the user has user Y as friend only in Skype, then more weighting is given to the friend X than friend Y. User X has a closer social distance to the user than user Y. In some embodiments, more weighting indicates a smaller numerical value of weighting, therefore, a smaller social distance.

In certain embodiments, a social distance or an average social distance is automatically calculated by a social recommendation application. In further embodiments, a social distance or an average social distance is automatically calculated by a social recommendation application when making a recommendation. In other embodiments, a social distance or an average social distance is automatically calculated by a social recommendation application when there is some update in a user or a group of user's social relationship. In further embodiments, the calculation is performed for each user or a group of user with following user or followers. In some embodiments, a social distance or an average social distance is stored in a database within a social recommendation application.

Gamified Rating Models

In some embodiments, the systems, media, and methods described herein include a gamified rating model, or use of the same. In some embodiments, the rating is performed using a gamified rating model combining one or more of an A/B test, an Up/Down/Pass vote, a sorting and editing of items, and a direct source. In some embodiments, a gamified rating model includes one or more rating approaches that have been incorporated into fun and easy-to-respond games. The gamified rating model is used to encourage users to rate and share with friends in way that also drives the friends to participate in rating as well.

In some embodiments, the gamified rating model includes an A/B test or its variations. In further embodiments, the user is given two items that need to be rated, and the user is asked to select zero, one, or two of the two items. In further embodiments, the user select one item based on his or her general preference over the other item. In other embodiments, the user selects zero, one, or two items based on one or more questions that have been given regarding the two items. In further embodiments, each question is related to a general impression of one or more items that are related to a user's interests. In other embodiments, each question is related to one or more specific aspects of one or more items that are of interests to a user. In some embodiments, the A/B test and its variations are repeated for multiple times with the two items being non-repeating or repeating. In further embodiments, the selection of items to present in each A/B test or its variations is automatically determined by a social recommendation application. In further embodiments, the selection of items to present in each A/B test or its variations is to serve the purpose of ranking a plurality of items. In some embodiments, an A/B test is also an A versus. B test or a VS mode test.

In some embodiments, selecting zero, one or two items comprises using an input device to interact with the item or the icon of the item. In further embodiments, the input device comprises a touchscreen, a mouse, a keyboard, a pointing device, a camera, a microphone, a motion sensor, a temperature sensor, or a pressure sensor. In further embodiments, the interaction comprises a touch, a click, a tap, a drag, a press and hold, highlighting, circling, contouring, a gesture, pointing, swiping, pressing, crossing, or the like. In further embodiments, the user selects one item over the other item by swiping on an icon of the preferred item from the left to the right of a touch screen. In further embodiments, the swiping distance, the swiping pressure, or the swiping speed, determines the degree of preference of the selected item. In further embodiments, the icon of an item is an image, a poster, a name, an item card, or related information of the item. In further embodiments, a user uses an input device to interact with the item or the icon of the item to view detailed content of the item.

In some embodiments, the gamified rating model includes an Up/Down/Pass vote or use of the same. In some embodiments, the user is provided with one or more questions, and the user is asked to vote yes, no, or pass to one or more questions. In further embodiments, each question is related to a general impression of one or more items that are related to a user's interests. In other embodiments, each question is related to one or more specific aspects of one or more items. In further embodiments, the user selects an icon or an image representing yes, no, or pass regarding an item. In further embodiments, the user selects an icon or image by tapping on a touch screen.

In some embodiments, selecting Up/Down/Pass includes the use of an input device to interact with the item or the icon of the item. In further embodiments, the input device comprises a touchscreen, a mouse, a keyboard, a pointing device, a camera, a microphone, a motion sensor, a temperature sensor, or a pressure sensor. In further embodiments, the interaction comprises a touch, a click, a tap, a drag, a press and hold, highlighting, circling, contouring, a gesture, pointing, swiping, pressing, crossing, or the like.

In some embodiments, the gamified rating model includes a Hate/Like/Love vote or use of the same. In some embodiments, the user is given the user is provided with one or more questions, and the user is asked to vote hate, dislike, like, love, neutral, or haven't tried to each question. In further embodiments, each vote is given a numerical value. In some embodiments, hate is given the smallest numerical value and love is given the highest numerical value, while the other votes are given values between the highest and the lowest value. In further embodiments, hate is given a value of −2, dislike for −1, like for 1, love for 2, neutral for 0, and haven't tried for a no-value. In further embodiments, each question is related to a general impression of one or more items. In other embodiments, the question is related to one or more specific aspects of one or more items. In some embodiments, the user selects an icon or an image representing hate, dislike, like, love, neutral, or haven't tried regarding an item. In further embodiments, the user selects an icon or image by tapping on a touch screen.

In some embodiments, selecting hate, dislike, like, love, neutral, or haven't tried includes the use of an input device to interact with the item or the icon of the item. In further embodiments, the input device comprises a touchscreen, a mouse, a keyboard, a pointing device, a camera, a microphone, a motion sensor, a temperature sensor, or a pressure sensor. In further embodiments, the interaction comprises a touch, a click, a tap, a drag, a press and hold, highlighting, circling, contouring, a gesture, pointing, swiping, pressing, crossing, or the like.

In some embodiments, the gamified rating model includes a sorting and editing of a list of items related to the user's interests. In further embodiments, the list of items includes items from one or more subcategories or categories. In further embodiments, the list of items includes items from one or more subcategories or categories that are of the user's interests. In some embodiments, the list of items includes items that are recently added into a social recommendation application. In other embodiments, the list of items includes items that has not discovered by the user, and/or by any of the user's followers or following users. In some embodiments, the list of items is a pre-ranked list based on one or more ranking criteria. In further embodiments, the pre-ranking criteria include ratings from external sources, prior ratings from within the social recommendation applications, or prior ratings by other users or other group of users. In other embodiments, the list is pre-organized by using one or more system provided criteria. In further embodiments, these system-provided criteria includes item popularity, item release date, price, a number of ratings, a number of recommendations, a number of reviews or comments. In other embodiments, the list is a randomized list of items.

In some embodiments, the user is asked to sort the pre-ranked list of items based on one or more aspects regarding the items as sorting criteria. In some embodiments, the sort criterion is a general impression. In other embodiments, the one or more sorting criteria are automatically generated by a social recommendation application. In some embodiments, the user is asked to sort the pre-ranked list so that the top of the list satisfy the one or more sorting criteria the most, and the satisfactory level gradually goes down as the user moves down along the sorted list.

In some embodiments, the user is asked to remove items from the pre-ranked list of items. In further embodiments, the user is asked to remove items that the user has no direct experience with. In other embodiments, the user is asked to remove items that do not qualify the one or more sorting criteria. For example, if the sorting criterion is "Top restaurants that you definitely want to visit again". The sorting user deletes the restaurants that he or she doesn't want to visit again. The sorting user also deletes restaurants that he or she has never been to.

In some embodiments, the user moves an item of the list to a rank in the same list. In some embodiments, the user moves an item of the original list to form a new list. In further embodiments, the user can delete one or more items from the original list or the new list.

In some embodiments, moving, sorting, or removing any item includes the use of an input device to interact with the item or the icon of the item. In further embodiments, the input device comprises a touchscreen, a mouse, a keyboard, a pointing device, a camera, a microphone, a motion sensor, a temperature sensor, or a pressure sensor. In further embodiments, the interaction comprises a touch, a click, a tap, a drag, a press and hold, highlighting, circling, contouring, a gesture, pointing, swiping, pressing, crossing, or the like.

In some embodiments, the gamified rating model includes a direct sourcing or use of the same. In further embodiments, the user, i.e., the soliciting user, selects another user, i.e., the solicited user, to solicit information from. In other embodiments, the soliciting user, selects a group of users to solicit information from. In further embodiments, the user solicits information regarding one or more items within a social recommendation application. In further embodiments, the user solicits information regarding one or more items that is of interests to the solicited user. In further embodiments, the user solicits information regarding one or more items that have been rated or recommended. In further embodiments, the user solicits information regarding one or more items that have been rated or recommended by the solicited user, by a social recommendation application, or by an external source. In some embodiments, the solicited user is a friend, friend of friend, or $3^{rd}$ degree contact of the user. In some embodiments, the solicited user is a follower or a following user of the user. In some embodiments, the solicited user is a user that is above a pre-determined threshold in degree of similarity to the soliciting user. In further embodiments, the solicited user is an aligned, slightly aligned user to the soliciting user.

In some embodiments, the user selects another user to solicit information from an automatically generated list of users by a social recommendation application. In other embodiments, the user selects another user by viewing a user's profile, or an item profile.

In some embodiments, the user selects one or more questions to solicit information from a list or a pool of automatically generated questions. In other embodiments, the user edit one or more selected questions and/or manually input one or more questions. In some embodiments, the user selects one or more tests to solicit information from another user, tests selected from: an A/B test, a Hate/Like/Love test, an Up/Down/Pass vote, a sorting and editing of a list.

In some embodiments, non-limiting examples of forms for solicitation includes a text message, a system notification, a voice message, an internal or external email, a url, a link to a webpage, an online chat, a link to a gamified rating test, or the like. In some embodiment, the solicitation is real-time. In some embodiments, a solicitation includes one or more rounds of communication.

In some embodiments, a rating using a gamified model is paused, quitted, resumed, restarted, repeated, saved, edited, deleted by a user. In some embodiments, help or tutorial regarding each gamified rating mode is available before or during a rating process.

Degrees of Similarity

In some embodiments, compatibility, similarity, or degree of similarity is interchangeable. In some embodiments, the compatibility score represents the degree of similarity. In some embodiments, the systems, media, and methods described herein include a degree of similarity, or use of the same. In some embodiments, a degree of similarity between two users or a user and a group of users is analyzed based on the rating of the same plurality of items by the two users. In some embodiments, the degree of similarity is measured among multiple categories or subcategories, with one or more items in each category. In other embodiments, the degree of similarity is measured within a single category or subcategory, with one or more items in the same category or subcategory. In certain embodiments, the degree of similarity is analyzed based on one or more items in the plurality of items. In further embodiments, the degree of similarity is analyzed based on one or more items in the plurality of items that are within a same category or subcategory. In other embodiments, the degree of similarity is across the whole set of items from one or more categories or subcategories. In further embodiments, the degree of similarity is from a subset of items that are related to the interests of the two parties, i.e., the two users or a user and a group of users. In further embodiments, the subset of items are selected based on a date, a month, a year, a certain period of time, a location, a zip code, a city, a state, a country, a name, a price, a valid rating, or any other item related properties. Thus, in some embodiments, the degree of similarity is calculated by the ratings of one or more items by the two parties, and/or items properties of one or more items such as a date, a month, a year, a certain period of time, a location, a zip code, a city, a state, a country, a name, a price, a brand, a producer, an actor/actress, a color, style, a taste, an artist, a player, or the like.

In some embodiments, the degree of similarity between two users or a user and a group of user is determined by the similarity in ratings between the two users or a user and a group of users. In further embodiments, a rating of each item has equal or different weighting on determining the degree of similarity. In further embodiments, the weighting is automatically determined by a social recommendation application. In some embodiments, the weighting is manually determined by the user. In some embodiments, the weighting is determined by properties related to the two parties. In some embodiments, weighting is determined based on items properties such as a date, a month, a year, a certain period of time, a location, a zip code, a city, a state, a country, a name, a price, a brand, a producer, an actor/actress, a color, style, a taste, an artist, a player, or the like. In some embodiments, the weighting is determined using a mathematical, statistical, numerical, empirical, or psychological method.

In some embodiments, the degree of similarity between two parties, i.e., two users or a non-group user and a group of users, is calculated using the rating of one or more items from the two parties as the inputs. In further embodiments, the degree of similarity is calculated using a mathematical, statistical, numerical, empirical, psychological method. In other embodiments, the degree of similarity is calculated using an iteration method, an optimization method, a computer modeling method, an artificial intelligence method. In further embodiments, the degree of similarity is used as prior information in statistical analysis of recommendation or non-recommendation.

In some embodiments, the degree of similarity is selected from a scale such as, from 1 to 3, from 1 to 4, from 0 to 1, from 0% to 100%, from 1 to 5, from 1 to 10, from 1 to 100, from A to C, from A to D, from A to F, and the like. In other embodiments, a degree of similarity is given by assigning one or more stars (e.g., 1 star, 1.3 stars, 2 stars, 2.7 stars, 3 stars, 3.9 stars, 4 stars, 4.5 stars, 5 stars, etc). In some embodiments, the degree of similarity is calculated to be within a range. For example, the degree of similarity to be 75%-90%, or 0%-30%. In other embodiments, the degree of similarity includes a confidence interval, a standard deviation, or a probability density function. In other embodiments, the degree of similarity includes a confidence interval, a standard deviation, or a probability density function with respect to items, subcategories, categories, the number of items, or the number of categories or subcategories. In other embodiments, the degree of similarity is selected from the list of: aligned, slightly aligned, neutral, slightly opposed, opposed, or undiscovered. In other embodiments, the degree of similarity is assigned a color with green being greatest similarity, red being the greatest difference, and grey being neutral. In further embodiments, green color with less saturation indicates a smaller degree of similarity. In further embodiments, red with less saturation indicates a smaller degree of difference. In some embodiments, the degree of similarity with a viewing user is shown on a user profile. In some embodiments, the degree of similarity with a user is calculated with each follower or following user. In some embodiments, the follower or following user are displayed for a user based on their degrees of similarity to the user.

In some embodiments, the average degree of similarity is measured as the average of individual degrees of similarity. In further embodiments, the degree of similarity between a non-group user and a group of users is measured by taking the average of individual degrees of similarity between each member of the group of users and the non-group user.

In some embodiments, the degree of similarity of a user to other users or other groups is automatically updated when there is an update in the user's profile, interests, categories of interests, items, ratings, social relationships, social distances, gamified rating models, or recommendations or non-recommendations. In some embodiments, the degree of similarity related to a user is updated upon a request from the user. In other embodiments, the degree of similarity is calculated when there is a change in the weighting, method, or algorithm in its analysis.

In certain case, the degree of similarity or the compatibility score between two users, a user and a group of users, or two group of users is used to present and/or sort contents, items, item related reviews, item related comments or the like to be presented to a user. In some embodiments, the presentation or sorting of items contents, items, item related reviews, item related comments by compatibility score is automatic or user-selected. In some embodiments, the presentation of items or other contents to a user starts with a user or a group of users that has the highest degree of similarity or compatibility score with the user.

In some cases, the compatibility score is used to rank the activity feed to a user or a group of users. Specifically, activities from the most compatible user or group are shown at the top of the activity feed. In some embodiments, the compatibility score or degree of similarity has more weight in ranking or sorting activity feeds than other ranking or sorting criteria. For example, older activities from more compatible users may appear higher in the list of activity feed than more recent activities from less compatible users. In some embodiments, the different compatibility score is indicated with different colors in activity feed.

In some cases, the compatibility score is used to rank reviews, ratings, comments, or the like of a user or a group of users, therefore, the reviews, ratings, comments, or the like from the most compatible users or groups are shown with priority over those from less compatible users or groups.

In some embodiments, the compatibility score is calculated based on at least one subcategory of items. For example, the compatibility score can be calculated separately for movie items in drama, science fiction, or other different subcategories.

Compatibility Scores

In some embodiments, the systems, media, and methods described herein include a compatibility score or the like. In some embodiments, a compatibility score is determined by an algorithm that takes into account how many items you agree on and the metadata associated with those items. In some embodiments, metadata are parameters of an item. A non-exclusive list of examples of meta data includes at least one of a classification of content, a cast, a film duration, a music duration, a price, a director, an actor, an actress, a location, a company name, a language, a release date, a genre, a date, a month, a year, a certain period of time, a location, a zip code, a city, a state, a country, a name, a brand, a producer, a color, style, a taste, an artist, a player, and a cook. In some embodiments, different aspects or entries of the metadata have different weights or weighting on calculating the compatibility score. In some embodiments, the compatibility score is calculated between two users. In some embodiments, the compatibility score is calculated based on at least one item. In some embodiments, the compatibility score is calculated based on at least two items from different or same category or subcategories.

In some embodiments, compatibility is represented as a colored ring around the user's icon. In some embodiments, this colored ring indicator is presented throughout the service, the application, or the method.

In some embodiments, a user first sees a personalized activity feed with at least one activity from another user when the user opens a social recommendation application. In some embodiments, compatibility score is used to weight how the activities are ranked in an activity feed. In some embodiments, activity from users who are most compatible is shown above activity from less compatible users who have more recent activity. In some embodiments, the compatibility score has the largest weight in determining what activity is shown first in an activity feed. In some embodiments, a color is used to highlight the compatibility of the user with the activity. In some embodiments, green indicate higher compatibility than yellow, and yellow indicate higher compatibility than red.

Figure 33:
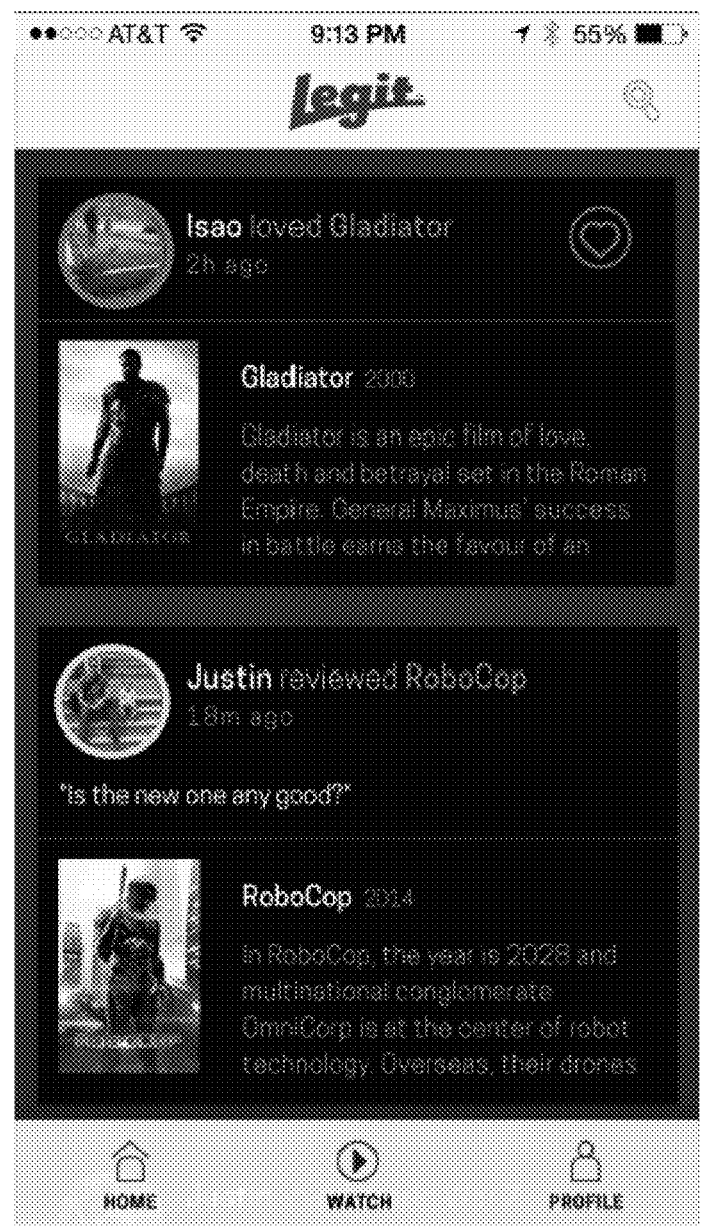
FIG. 33 shows a non-limiting example of a user interface for a social recommendation application; in this case, an interface for presenting a user profile with a compatibility score to the viewing user.

Referring to FIG. 33, in a particular embodiment, an activity feed is presented to a user with activities from other users. In this embodiment, activity from a most compatible user is shown at the top of the feed with a green color indicating the compatibility score with the viewing user. In the same embodiment, activity from a less compatible user is shown at the bottom of the feed with a yellow color indicating the compatibility score with the viewing user. In this embodiment, the activity feed is what a viewing user sees when he or she starts the application. In this embodiment, each entry of the activity feed includes at least one selected from: a user's photo, a user's name, an activity of the user, the time of the activity, the item related to the activity, the brief description of the item, the related information to the activity, a photo of the item, a color indicator of compatibility, or the like.

In some embodiments, compatibility score is used present ratings and reviews. In some embodiments, ratings, reviews, comments, or the like from the most compatible users are presented first. In some embodiments, the compatibility score is used to present the most relevant reviews, rating, comments, or the like first than the less relevant ones.

In some embodiments, compatibility score is customized to the items that the user is interested in. In some embodiments, compatibility score for an item is based on the compatibility of the users in at least a category, a subcategory, or a subset of a subcategory. For example, compatibility score for an item is based on the compatibility of the users in genre of drama and/or romance but not in genre of science-fiction.

Figure 34:
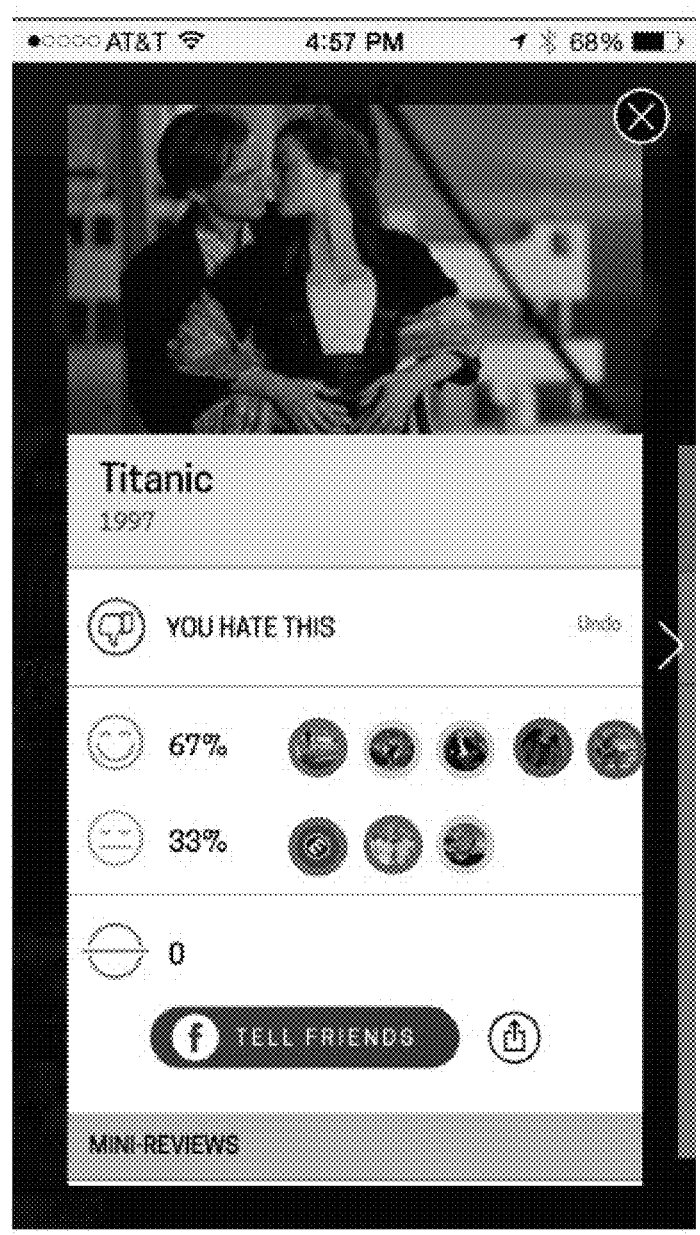
FIG. 34 shows a non-limiting example of a user interface for a social recommendation application; in this case, an interface for presenting activity feeds based on ranking of compatibility scores.

Referring to FIG. 34, in a particular embodiment, compatibility score is customized to an item that a user views. In this embodiment, ratings and reviews from most compatible users to the viewing user. In the same embodiments, 67% of the other users like the item that the user is currently viewing and the list of users who likes this item starts with users who are most compatible with the viewing user. Similarity, in the same embodiment, 33% of the other users dislikes the item that the user is currently viewing, and the list of disliked users starts with users who are most compatible with the viewing user.

Ratings

In some embodiments, the systems, media, and methods described herein include a ratings, or use of the same. In further embodiments, the platforms, systems, media, and methods described herein include a software module configured to allow a user or each member of the group of users to rate a plurality of items. In other embodiments, the platforms, systems, media, and methods described herein include a software module configured to allow a user or each member of the group of users to rate a single item. In further embodiments, the platforms, systems, media, and methods described herein include a software module configured to allow a user or each member of the group of users to rate a recommendation or a non-recommendation that is related the user or the group of users. In further embodiments, the platforms, systems, media, and methods described herein include a software module configured to allow a user or each member of the group of users to one or more lists of items.

In some embodiments, ratings are included in a user profile. In some embodiments, ratings are stored in a database. In further embodiments, ratings are stored under one or more subcategories or categories of interests. In other embodiments, ratings are stored in association with a user name, a user ID, a rating date, or the number of items in the each rating.

In some embodiments, a rating is associated with additional information that provides complementary, supportive, or confirmative information regarding the rating. In further embodiment, the rating associated information includes one or more selected from: reviews, comments, descriptions, or evaluations. In some embodiments, the rating associated information includes a text, a video, an image, an audio, a URL, or a website. In further embodiments, the text is less than about 50, about 100, about 140, or about 150 characters. In further embodiments, the video or audio is less than about 30, about 40, about 50, about 60 seconds. In some embodiments, the rating and/or the rating associated information are used in generating a recommendation or non-recommendation. In other embodiments, the rating and/or the rating associated information are used in filtration and selection of ratings and rating associated information from one or more users.

Referring to FIG. 1, in a particular embodiment, a software module for a new user to login a social recommendation application, and rate and recommend a list of items. In this embodiment, a new user logs in 100 using Facebook login information, optionally goes through rating tutorial 110, and starts rating single items 120 provided by the social recommendation application. In the same embodiment, the new user uses a gamified rating model including a v.s. mode 130, i.e., A/B test to enter further rating of item. In this embodiment, the rating of the new user and the compatibility of the new user with friend is optionally used to generate a list of top 10 items 140 as a recommendation, for the friend. The recommendation is optionally included in the friend's profile 150, and the new user optionally goes back to the home 143 of the social recommendation application or starts rating and generating a new list 142 of recommendation.

In various embodiments, a rating is given to an item regarding the general impression of that item. In various embodiments, a rating is given regarding one or more aspects related to an item. In certain embodiments, a rating includes a review, a feedback, a description, an evaluation, or a comment regarding one or more aspects related to an item. In further embodiments, the one or more aspects related to an item can be selected from a pre-provided list of aspects, or determined by a social recommendation application, or manually input by the user giving the rating.

In various embodiments, a software module configured to allow a user, i.e., a single user, or a user that belongs to a group, to rate one or more items using a wide array of suitable rating methods. In some embodiments, a user rates one or more items by responding to a survey. In various embodiments, a survey suitably includes about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or more questions.

In some embodiments, a user rates by voting to indicate preference or degree of preference. In other embodiments, a user votes to indicate disfavor or degree of disfavor. In further embodiments, a user votes selecting from, by way of non-limiting examples, "Yes" or "No," "Love," "Like," "Hate," or "Dislike," and "Up" or "Down." In other embodiments, a user votes by making a selection from a scale. Many scales are suitable for user voting in response to a prompt for a reaction. In various embodiments, suitable scales include, by way of non-limiting examples, 2-step, 3-step, 4-step, 5-step, 6-step, 7-step, 8-step, 9-step, 10-step, 11-step, 12-step, 13-step, 14-step, 15-step, 16-step, 17-step, 18-step, 19-step, 20-step or more scales. In further embodiments, a user votes by selecting from a scale such as, from 1 to 3, from 1 to 5, from 1 to 10, from 1 to 100, from A to C, from A to D, from A to F, and the like. In a particular embodiment, a user votes by selecting from a Likert Scale, including selections such as "Strongly disagree," "Disagree," "Neither agree nor disagree," "Agree," and "Strongly agree."

In some embodiments, a user rates by ranking elements. In further embodiments, a user ranks to indicate preference or degree of preference. In other embodiments, a user ranks to indicate disfavor or degree of disfavor. In some embodiments, a user ranks by assigning one or more numbers (e.g., 1, 2, 3, etc.). In other embodiments, a user ranks by assigning one or more letters (e.g., A, B, C, etc.). In other embodiments, a user ranks by assigning one or more stars (e.g., 1 star, 1.5 stars, 2 stars, 2.5 stars, 3 stars, 3.5 stars, 4 stars, 4.5 stars, 5 stars, etc).

In various embodiments, a user rates by entering comments. In certain embodiments, the comments are made in forms of answers to one or more questions. In some embodiments, the comments are made in addition to a rating.

In some embodiments, the rating, the rating associated reviews, feedbacks, descriptions, evaluations, or comments, and/or the number of ratings of two parties, i.e., two users, a group of users and a non-group user, are used in determining a degree of similarity between the two parties. In some embodiments, the rating and rating associated information are used to filter and preselect two parties for analysis of their degree of similarities. In further embodiments, the filtering and pre-selection uses one or more criteria including: a social distance, a number of friends that are mutual to the two parties, a number of subcategories, or categories that are mutual to the two parties, one or more ratings, one or more lists of ratings, one or more lists of recommendations or non-recommendations, a number of followers, a number of following users.

In some embodiments, the rating information includes a numerical score for each item. In further embodiments, the rating score is calculated automatically based on the rating and the associated information entered by a user. In further embodiments, the rating score is obtained from a statistical, numerical, mathematical, empirical, or modeling algorithm.

In some embodiments, a rating includes imported ratings and/or rating associated information from external websites or other sources. In further embodiments, the imported rating and/or rating associated information are taking into consideration in order to generate the final rating in a social recommendation application. In some embodiments, the external sources include external social network websites, external E-commerce websites, external retailer websites, external entertainment websites, external news and informational websites, external rating and review websites, or the like. Non-limiting examples of these websites includes Yelp, Rotten Tomatoes, Amazon, Alibaba, Ebay, Fandango, and Restaurant.

In some embodiments, a rating of a plurality of items can be separated into multiple rating events. In further embodiments, the separation of rating events can be triggered by the rating user. In some embodiments, a rating of a plurality of items includes a valid rating or a non-response to each item in the plurality of items. In some embodiments, a user receive a system notification if one or more unrated item needs to be rated. In some embodiments, a user receives a system notification if one or more item has been added to a social recommendation application system. In some embodiments, a user receives a system notification if the rating number has not reached the minimum that is required by the system. In some embodiments, a user receives a message from another user request a rating for one or more items.

In some embodiments, a user starts, quits, pauses, resumes, repeats a rating of a single item or a rating of a plurality of items. In some embodiments, a user can solicit a rating of a sing item or a rating of a plurality of items from another user or a group of non-self users.

In some embodiments, a user saves an item that is currently being rated to a watchlist. In some embodiments, the user saves an item using an input device to interact with the item or the icon of the item. In further embodiments, the input device comprises a touchscreen, a mouse, a keyboard, a pointing device, a camera, a microphone, a motion sensor, a temperature sensor, or a pressure sensor. In further embodiments, the interaction comprises a touch, a click, a tap, a drag, a press and hold, highlighting, circling, contouring, a gesture, pointing, swiping, pressing, crossing, or the like. In some embodiments, the user tap an icon related to the item to save it to a watch list.

In some embodiments, a watchlist is a list of items that are saved by a user. In further embodiments, a watchlist includes a list of items that substantially shares one or more predetermined properties. In further embodiments, these predetermined properties are related to one or more selected from a user, a group of users, a recommendation, a non-recommendation, a rating, or the like. Non-limiting examples of the predetermined properties includes: recommended by a friend or friends, accepted recommendation to be viewed by user, unrated new items that is just included in the system, items that are currently in theater, etc.

In some embodiments, the systems, methods, and media disclosed herein comprise software for a user to select or filter ratings and rating-associated reviews, comments, or evaluations from one or more non-self users. In some embodiments, the systems, methods, and media disclosed herein comprises a software for a user to select or filter ratings and rating-associated reviews, comments, or evaluations based on one or more predetermined criteria. In further embodiments, the selection and filtering of ratings and rating associated reviews, comments, or evaluations is based on the similarity or compatibility between the user and other non-self users. In some embodiments, the criteria are set based on the degree of similarity and/or the social distance. In other embodiments, the criteria are related to the subcategories or categories of interests. In other embodiments, non-limiting examples of filtering criteria are one or more of: a rating of a plurality of items, a date or a time of rating, a list of rating, a recommendation that is made or received, a non-recommendation that is made or received, a friend, a friend of friend, a follower, a following user, a number of ratings, a number of recommendations that is made or received, a user profile, an item, an item descriptive tag, or the like.

Figure 6:
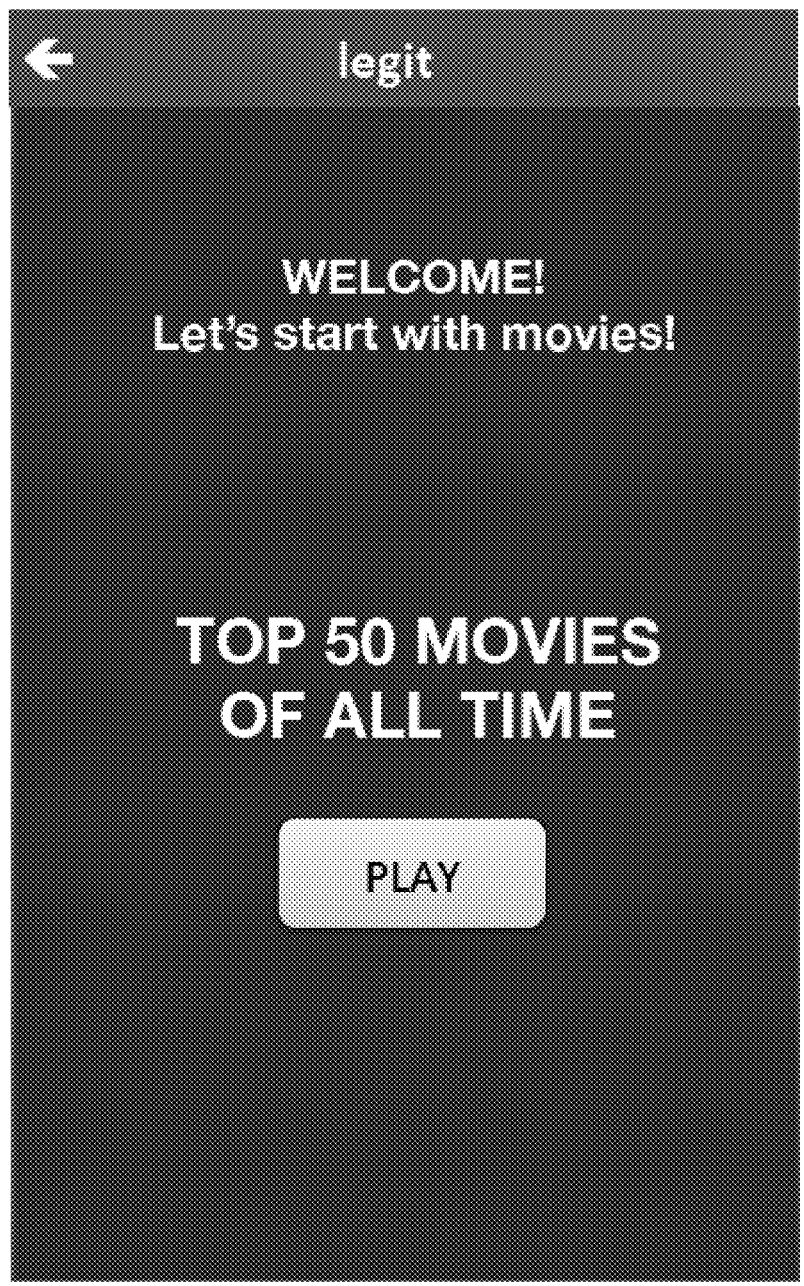
FIG. 6 shows a non-limiting example of a user interface for a social recommendation application; in this case, an interface for a user to login to a social recommendation application to enter a rating process.

Referring to FIG. 6, in a particular embodiment, an interface for welcoming an existing user. In this embodiment, the user optionally enters a rating process of a plurality of movies by interaction with the "play" button.

Figure 7:
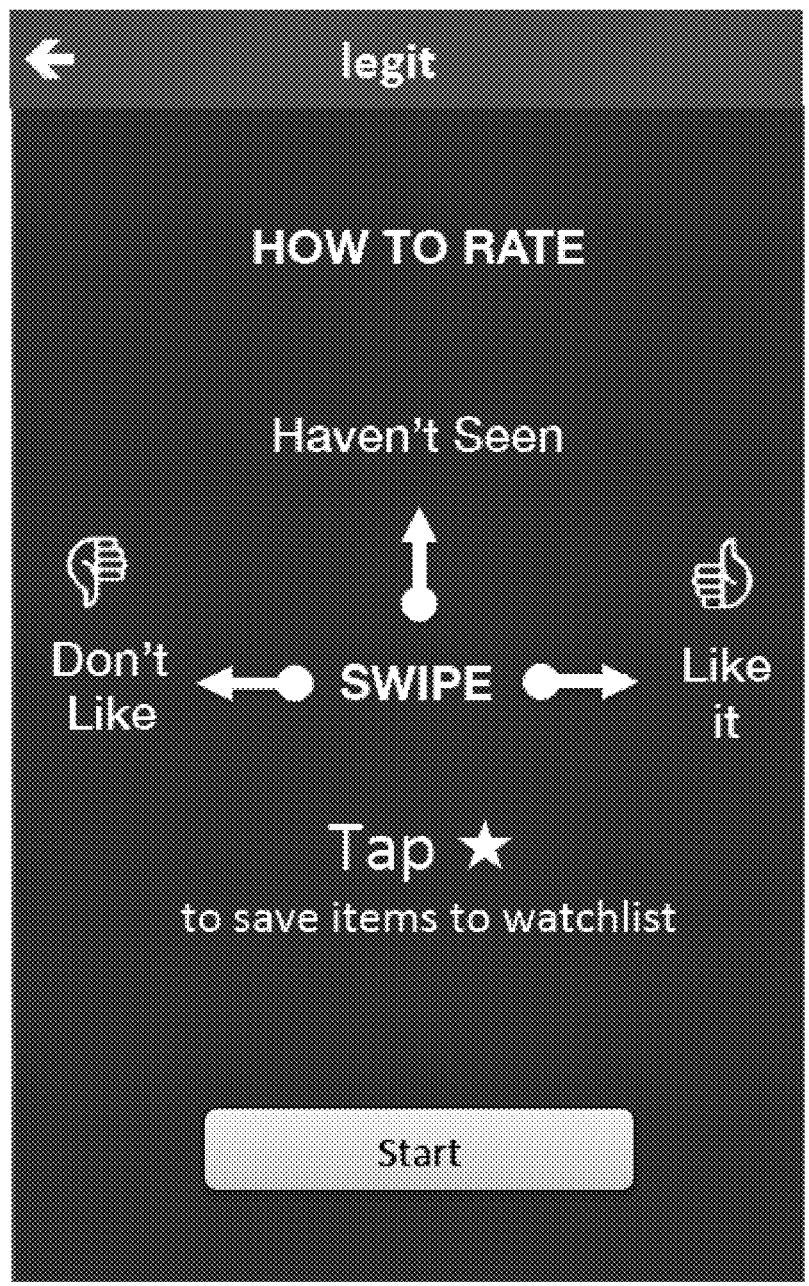
FIG. 7 shows a non-limiting example of a user interface for a social recommendation application; in this case, an interface for a user to view a rating tutorial page and start rating.

Referring to FIG. 7, in a particular embodiment, an interface for a user to view a rating tutorial page and start rating. In this embodiment, the user optionally starts rating by interaction with the "start" button.

Figure 8:
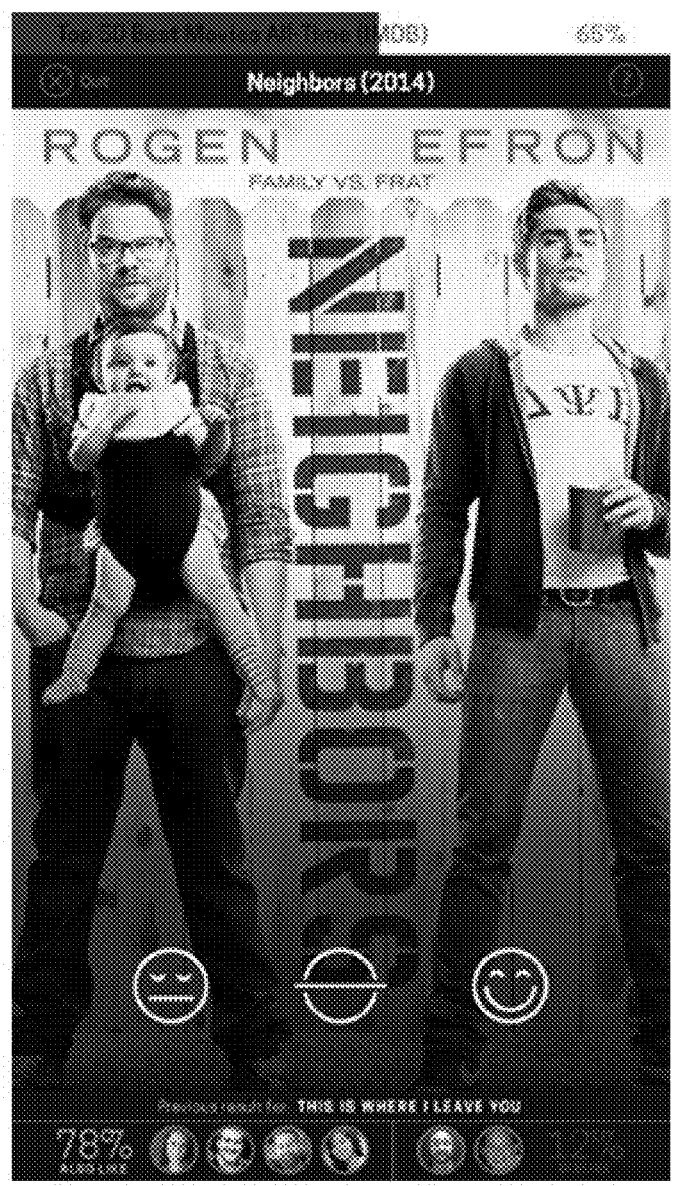
FIG. 8 shows a non-limiting example of a user interface for a social recommendation application; in this case, an interface for a user to view and rate a first item in a rating list.

Referring to FIG. 8, in a particular embodiment, a user views a first item in a rating list of top 50 best movies of all-time from IMDB. The user optionally rates dislike, neutral, or like to the first item. In the same embodiments, the user optionally quits the rating by tapping on a "quit" button. In same embodiments, the progress bar shows the current progress of rating the entire list. In the same embodiments, the user optionally seeks help during the rating by tapping on a "?" button.

Figure 9:
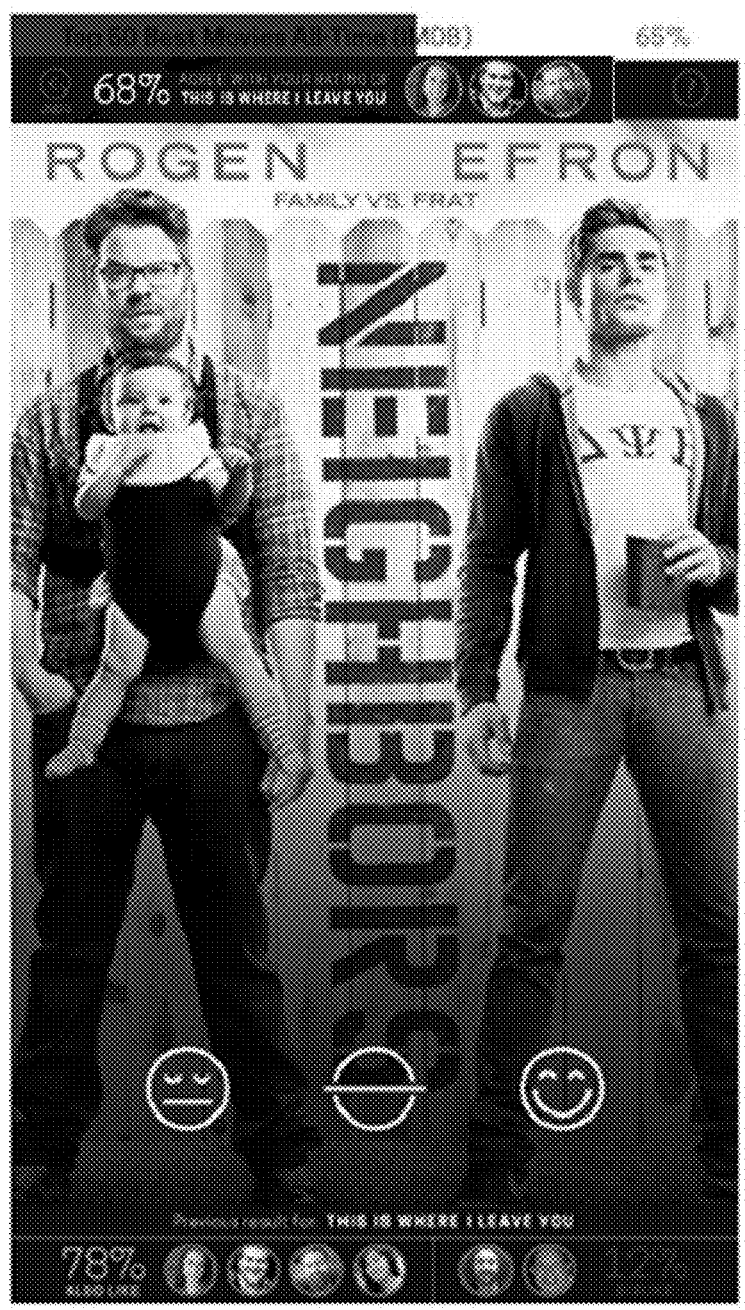
FIG. 9 shows a non-limiting example of a user interface for a social recommendation application; in this case, an interface for a user to view rating information and the rated item.

Referring to FIG. 9 in a particular embodiment, a user views an item in a rating list of top 50 best movies of all-time from IMDB after the user optionally rates the item. The user optionally views the rating of dislike, neutral, or like to the first item. In the same embodiments, the user optionally quits the rating by tapping on a "quit" button. In the same embodiments, a progress bar is optionally shown on the top of the user interface, the progress bar indicates the current progress of rating the entire list. In the same embodiment, the interface optionally presents a percentage of agreements with the user's friend on the rating of the item. In the same embodiment, the user optionally goes back to the previous item by tapping on a "undo" button. In the same embodiments, the user optionally seeks help during the rating by tapping on a "?" button.

Figure 10:
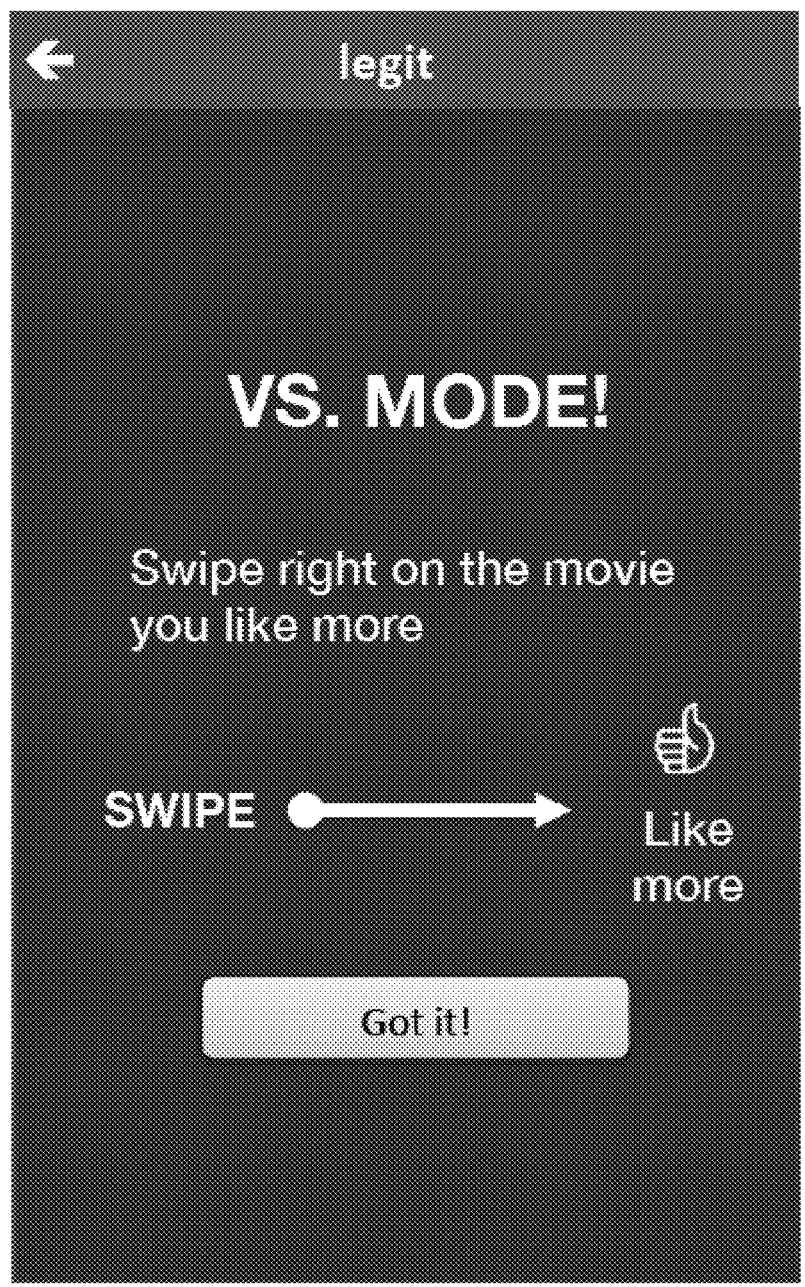
FIG. 10 shows a non-limiting example of a user interface for a social recommendation application; in this case, an interface for a user to view a rating tutorial page of an A/B test.

Referring to FIG. 10, in a particular embodiment, a user is shown a rating tutorial page of an A/B test, i.e. a VS mode. In the same embodiment, the user optionally exist the rating tutorial page by tapping on a "Got it" button.

Figure 11:
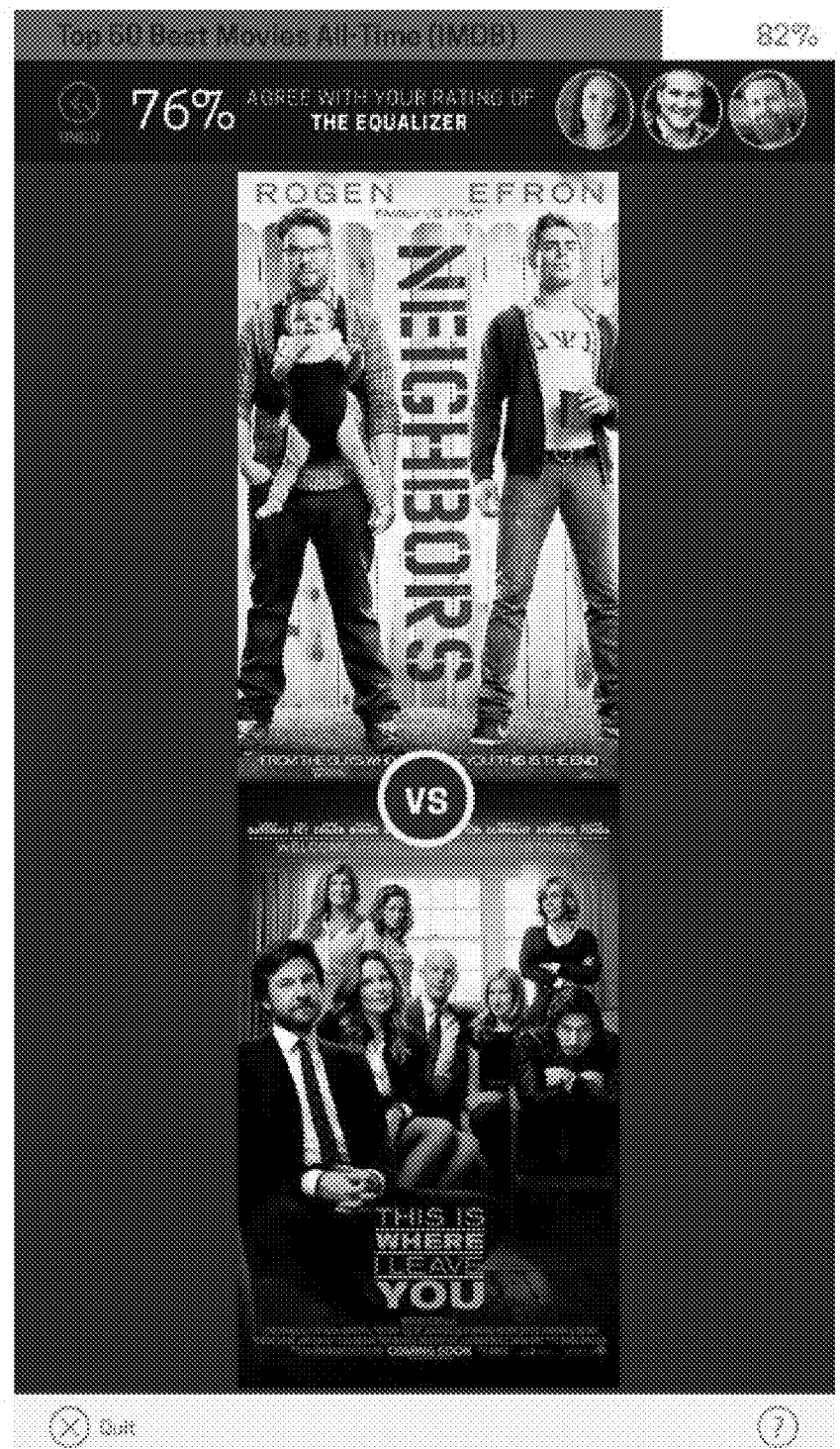
FIG. 11 shows a non-limiting example of a user interface for a social recommendation application; in this case, an interface for a user to view an A/B test and rate.

Referring to FIG. 11, in a particular embodiment, a user is shown two items in an A/B test. The user optionally swipes right on the move that the user likes more. In the same embodiments, a progress bar is optionally shown on the top of the user interface, and the progress bar indicates the current progress of rating the entire list. In the same embodiments, the user optionally quits the rating by tapping on a "quit" button. In the same embodiments, the user optionally seeks help during the rating by tapping on a "?" button.

Figure 12:
FIG. 12 shows a non-limiting example of a user interface for a social recommendation application; in this case, an interface for a user to view detailed information of an item in an A/B test.

Referring to FIG. 12, in a particular embodiment, a user optionally views detailed information of an item in an A/B test. In the same embodiments, the user optionally quits viewing the detailed information by tapping on an "x" button.

Figure 13:
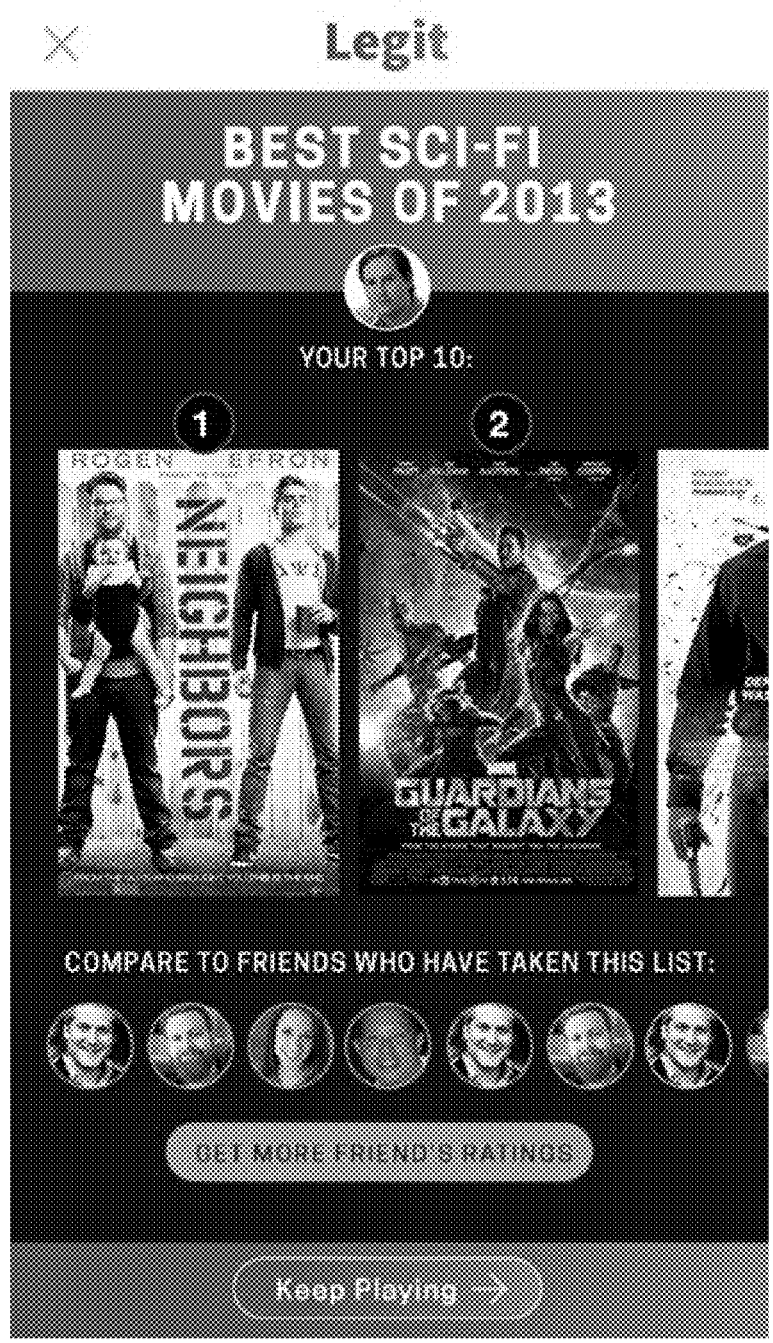
FIG. 13 shows a non-limiting example of a user interface for a social recommendation application; in this case, an interface for a user to view a result page after rating a list of items.

Referring to FIG. 13, in a particular embodiment, a user optionally views a result page after rating a list of items. In this embodiments, the user optionally views top 10 items resulted from rating a list of items. In the same embodiments, the user optionally compares the rating results to those of his or her friends by tapping on an icon for a friend. In this embodiment, the rating results of friends are optionally sorted from the most compatible to least compatible. The most compatible friend is optionally shown centered and the least compatible friends are shown on the sides. In the same embodiments, the user optionally gets more friends' rating results by tapping on the button of "getting more friends' rating." In this embodiment, the user optionally starts rating of a new list by tapping on "keep playing."

Figure 14:
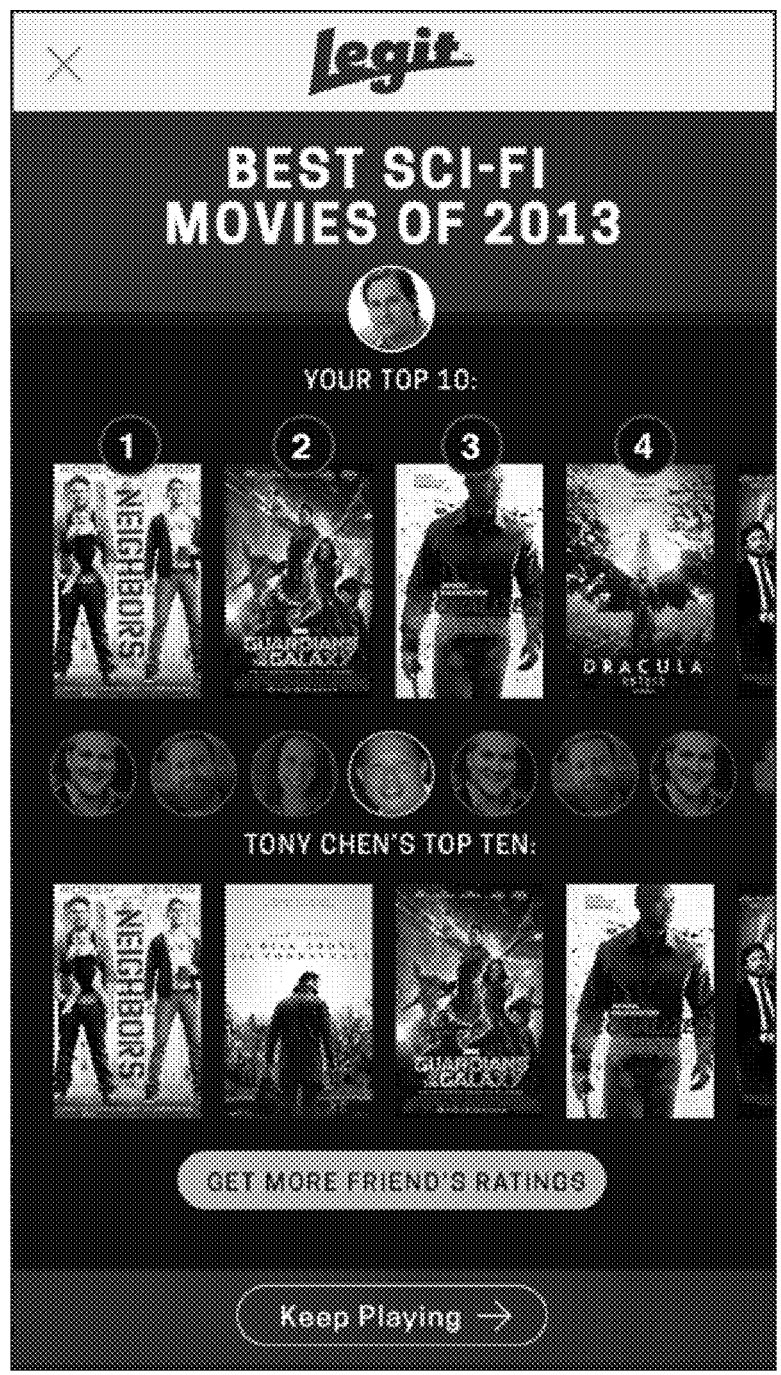
FIG. 14 shows a non-limiting example of a user interface for a social recommendation application; in this case, an interface for a user to view a result page in comparison to another user's rating after rating a list of items.

Referring to FIG. 14, in a particular embodiment, a user optionally views a detailed comparison of rating results between himself or herself and a friend named Tony Chen by tapping on an icon for Tony Chen in a social recommendation application. In this embodiment, the most compatible friend is optionally shown centered and the least compatible friends are shown on the sides. In the same embodiments, the user optionally gets more friends' rating results by tapping on the button of "getting more friends' rating." In this embodiment, the user optionally starts rating of a new list by tapping on "keep playing."

Figure 15:
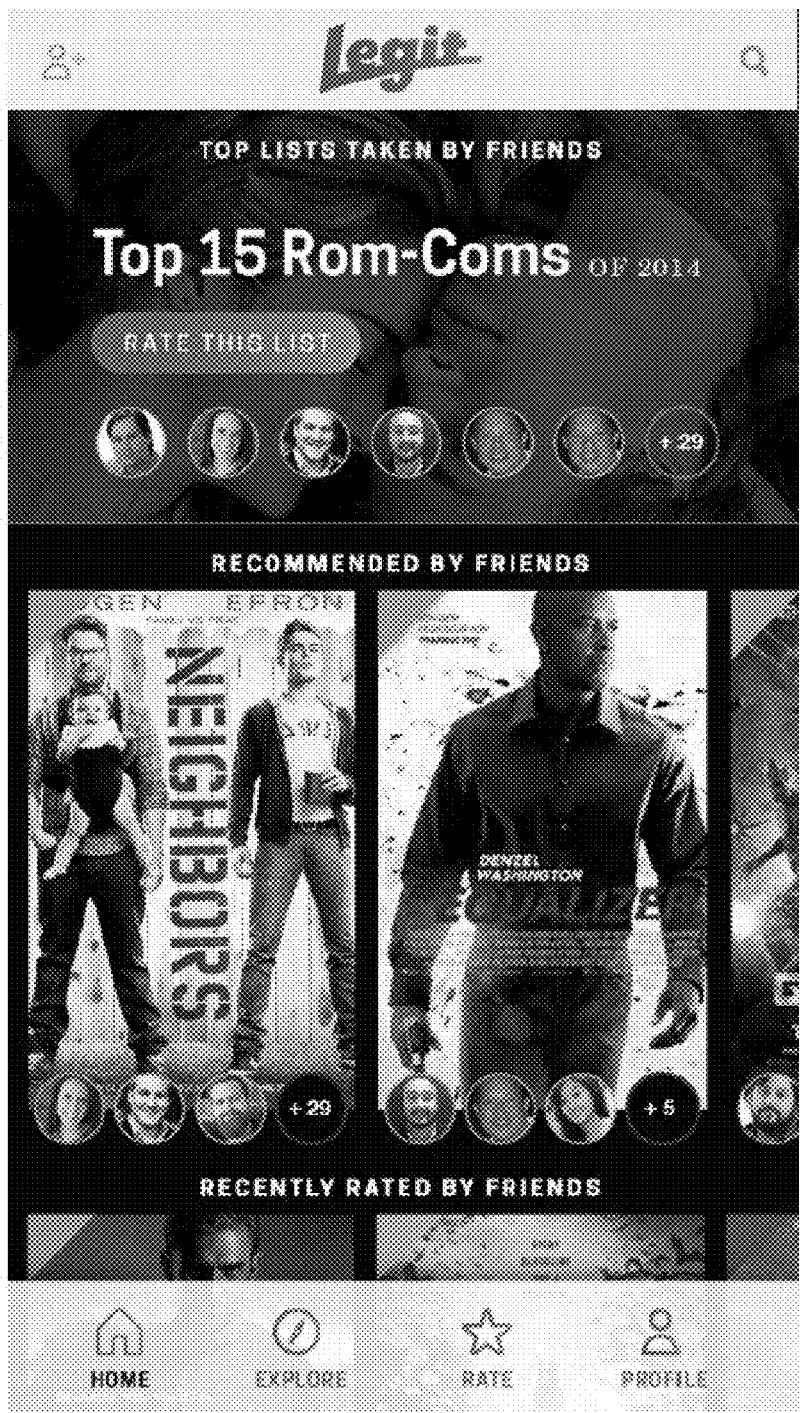
FIG. 15 shows a non-limiting example of a user interface for a social recommendation application; in this case, an interface for a user to view a homepage of a social recommendation application.

Referring to FIG. 15, in a particular embodiment, a user optionally views a home page of a social recommendation application. In this embodiment, a user optionally views a name of a list of top 15 romance-comedies of 2014 rated by a number of friends. In the same embodiment, the user optionally rates the list named top 15 romance-comedies of 2014 by tapping on "rate this list." In the same embodiment, the user optionally view top recommended movies by friends in a list with links to each friend. In the same embodiment, the user optionally views recently rated movies by friends and links to friends. In the same embodiment, the user is optionally shown linkage to explore functions of the social recommendation application, to rate one or more items, and to view or edit a user profile.

Figure 16:
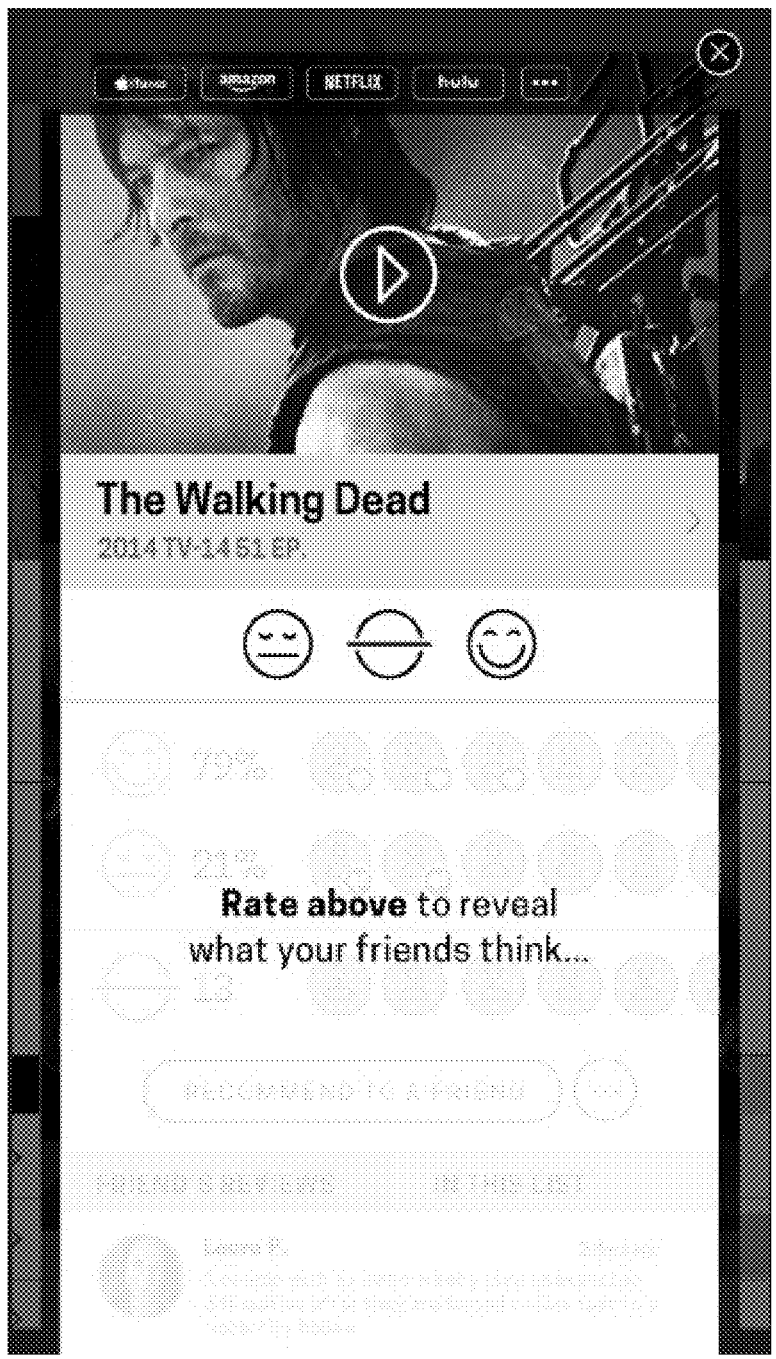
FIG. 16 shows a non-limiting example of a user interface for a social recommendation application; in this case, an interface for a user to view an item recommended by one or more friends of the user.

Referring to FIG. 16, in a particular embodiment, a user optionally views detailed information of an unrated item recommended by one or more friends of the user. In this embodiment, the user optionally rates the time with dislike, neutral, or like options. Also in this embodiment, the user solicits rating or comments from one or more friends by tapping on an icon representing a friend. Also in this embodiment, a user optionally views friend's review ordered by dates regarding this unrated item.

Figure 17:
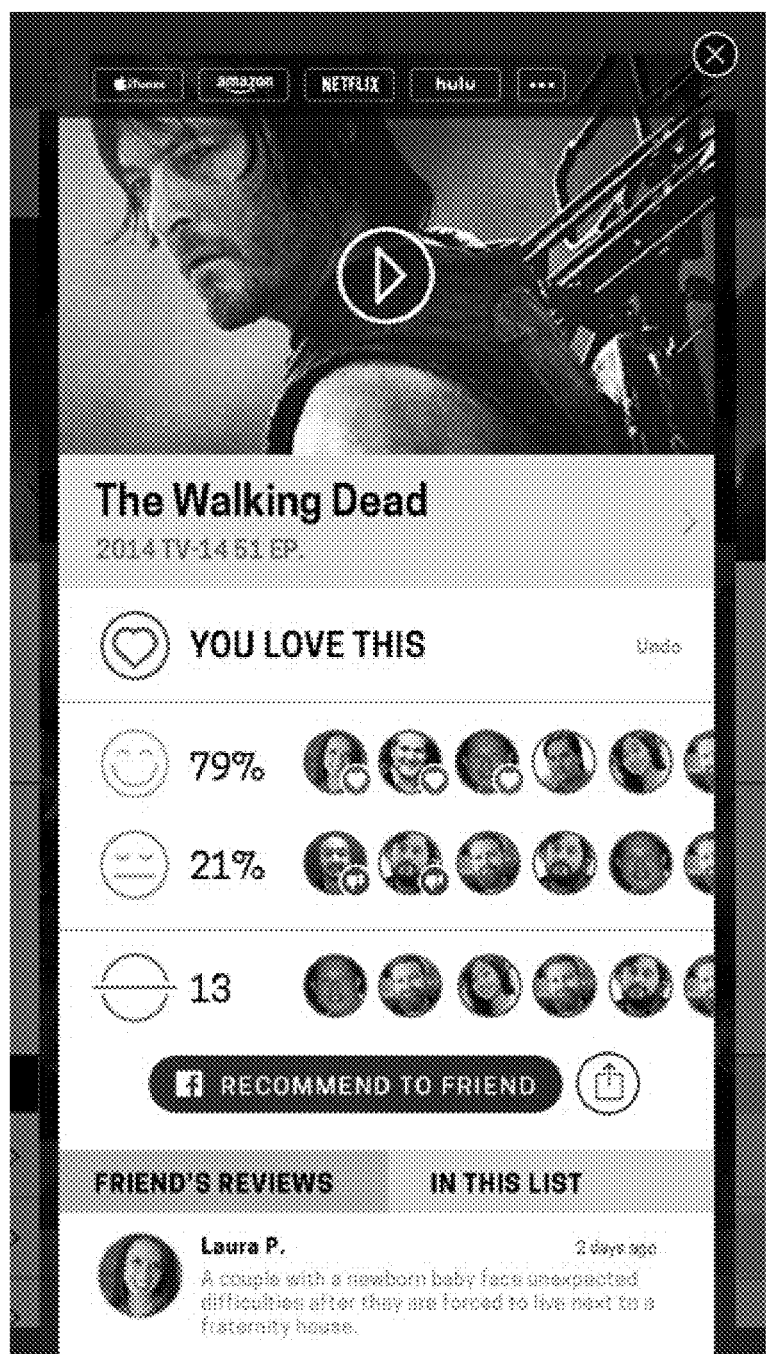
FIG. 17 shows a non-limiting example of a user interface for a social recommendation application; in this case, an interface for a user to view detailed recommendations by friends regarding an item after the user rates the item.

Referring to FIG. 17, in a particular embodiment, a user optionally views detailed information of a rated item recommended. In this embodiment, the user views the rating of this rated item. Also in this embodiment, the user solicits rating or comments from one or more friends by tapping on an icon representing a friend or by tapping on "ask more friends." Also in this embodiment, a user optionally views friend's review ordered by dates regarding this unrated item.

Figure 35:
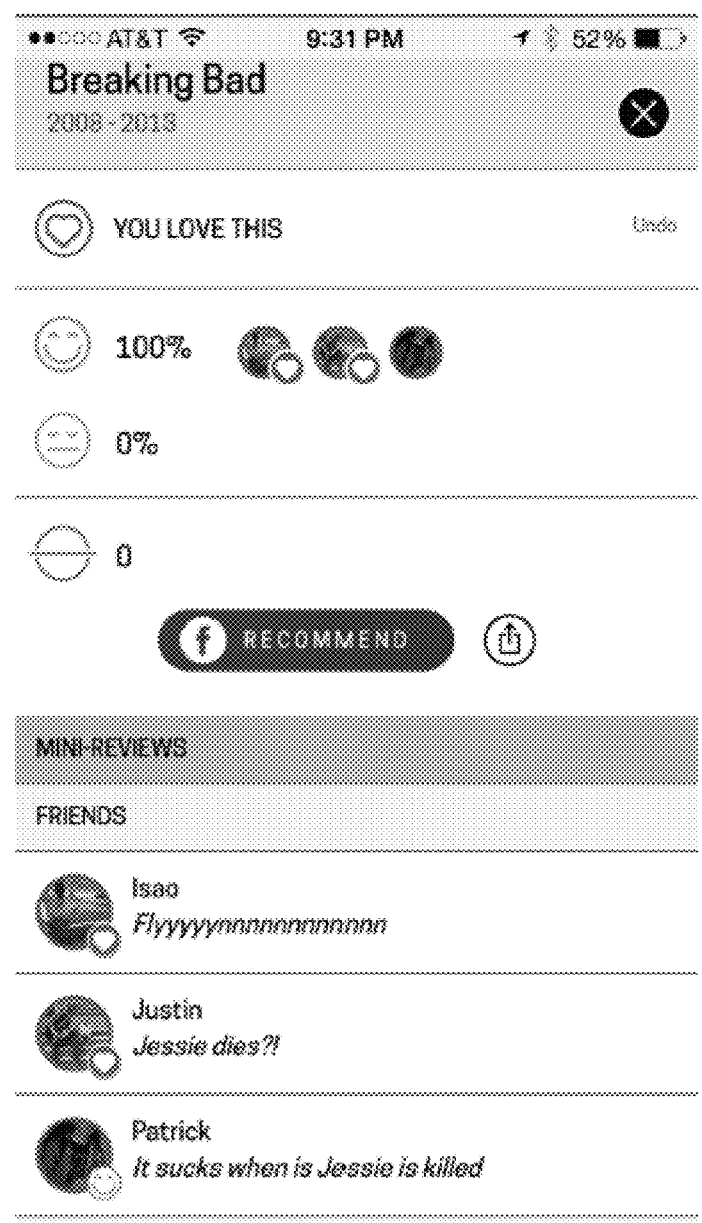
FIG. 35 shows a non-limiting example of a user interface for a social recommendation application; in this case, an interface for presenting ratings and reviews from different users based on compatibility scores to the viewing user.

Referring to FIG. 35, in a particular embodiment, a user optionally enters a mini-review of an item. In some embodiments, mini-reviews are like tweets as reviews, but in the context of an item, e.g., a movie or a TV show. In some embodiments, the mini-review is entered via a smart portable device.

In some embodiments, the rating or the like includes a mini-review. In further embodiments, a mini-review includes a limited number of characters for text, for example, less than 20, 30, or 50 words. In some embodiments, a mini-review includes a photo and/or a time-limited video, for example, a photo size of less than 4 megabytes and a video less than 15 seconds. For example, a user takes a selfie photo and/or a video of reaction to a movie he or she just watched and type in a sentence to provide the context of the photo and video.

Items

In some embodiments, the systems, media, and methods described herein include one or more items, a list of items, or use of the same. In further embodiments, an item belongs to one or more categories or one or more subcategories, and it is the most basic unit that a user or a group of users vote, rate, or recommend. For example, 'Star Wars' is an item belongs to at least one category of movies—science-fiction. Further, 'Star Wars' also belongs to a subcategory that is directed by George Lucas.

In some embodiments, an item is displayed or stored in association with one or more categories or subcategories that it belongs to. In other embodiments, an item is associated with its item properties. A non-limiting list of item properties includes one or more of: a picture, a poster, an icon, a name, a video or audio clip, a release time, a duration, a description, a location, a menu, a price, a url, a website, an online forum, a director, a cast, a writer, a trailer. In some embodiments, some or all of the item properties are displayed when an item is selected for viewing by a user. In some embodiments, one or more item properties are displayed in an item profile.

In some embodiments, the item is associated or linked with social recommendation related information. In some embodiments, the item is associated or linked with rating related information. In further embodiments, the item is associated or linked with information related to one or more of a rating within a social recommendation application by more than one users, a rating by a plurality of users within a certain social distance to each other, a rating by a plurality of users within a certain social distance to the user viewing the item, a rating associated review, evaluation, comment, a recommendation or non-recommendation, a link to rate the item, a link to view a specific rating of the item, a link to view a specific review or comment of the item, an external rating from other websites and sources, one or more rankings in one or more ranked lists, i.e., a recommendation or a non-recommendation, a recommender, a link to a recommender, a link to a recommender-related information. In some embodiments, an item is associated with an item profile. In some embodiments, part or all of the information related to an item is included in an item profile.

In some embodiments, a user views item associated information, one or more item properties, or an item profile by interacting with the item or the icon of the item using an input device to. In further embodiments, the input device comprises a touchscreen, a mouse, a keyboard, a pointing device, a camera, a microphone, a motion sensor, a temperature sensor, or a pressure sensor. In further embodiments, the interaction comprises a touch, a click, a tap, a drag, a press and hold, highlighting, circling, contouring, a gesture, pointing, swiping, pressing, crossing, or the like.

In some embodiments, a plurality of items are rated by two parties involved in a social recommendation event, i.e., a user or a group of user making or receiving a recommendation or non-recommendation within a social recommendation application, using a gamified rating model. In some embodiments, the plurality of items is from one or more categories or subcategories that are of interests to the two parties. In some embodiments, the plurality of items is from one or more categories or subcategories. In some embodiments, the plurality of items includes items that both the two parties have direct experience with. In other embodiments, the plurality of items includes items that one or none of the two parties have direct experience with. In some embodiments, the number or count of the plurality of items meets a minimal requirement for the automatic recommendation methods or algorithms. In some embodiments, the number of the plurality of items can be a dynamically changing number, and its change is triggered by a predetermined event from the two parties. In further embodiments, non-limiting examples of the predetermined event can be a time-out, a pause, a log-off, a quit from rating, a resume of rating. In some embodiments, the number or count of the plurality of items is fixed.

In some embodiments, a plurality of items forms a list. In some embodiments, a list includes a unique name that is descriptive of items included in the list. In soma embodiments, a list includes a unique name that is descriptive of items included in the list and also includes the name of the user that is rating or viewing the list. Non-limiting examples of named lists with a fixed number of items includes: top 10 science fiction movies all-time from Tony Smith, top 50 Mexican restaurants in San Diego.

In some embodiments, a plurality of items is included in a curated list. In some embodiments, a plurality of items is included in a rated list. In further embodiments, the curated or rated list or rated list is generated by a social recommendation application and organized based on pre-determined curation or rating criteria. In some embodiments, the curated or rated list includes items that have not being rated by any users. In further embodiments, the curated or rated list includes items recommended by or rated by one or more users. In other embodiments, the curated or rated list includes items recommended to one or more users.

Ranked Lists

In some embodiments, the systems, media, and methods described herein include a ranked list of items or use of the same. In some embodiments, all the items in the ranked lists are selected from a plurality of items that has been rated by the two parties involved in a social recommendation event, i.e., the user or group of user making and receiving a recommendation. In some embodiments, the ranked list display items in an order that the most highly ranked items appears at the top of the list, and items with lower ranks at the middle or bottom of the list. The ranking of items is monotonically non-increasing as the list goes down from the top to the bottom. In some embodiments, one or more items share the same rank. In further embodiments, the ranked list has a fixed number of items. For example, a ranked list of top 10 restaurants with a great scenic view has a list of 10 restaurants. If more than one item share the rank in a fixed-number ranked list, then one or more ranks in the list is empty. In other embodiments, every rank in a ranked list has one or more items.

In some embodiments, the ranking of a ranked list indicate the relative level of recommendation of items within the ranked list. The top 1 of the ranked list is the most highly recommended item, and the level of recommendation monotonically goes down as the list goes down from the top to the bottom. In certain embodiments, the bottom of the list is the least recommended item.

In some embodiments, the items are ranked merely based on the rating of a plurality of items by a user. In further embodiments, the items in the ranked list are items that the user has experienced. In further embodiments, the items forming the ranked list are from the plurality of items rated by the user.

In some embodiments, the items are ranked based on the rating of a plurality of items by the two parties involved in a social recommendation event, i.e., the user, or group of user making and receiving a recommendation. In further embodiments, the items forming the ranked list are from the plurality of items rated by the two parties. In further embodiments, the items are ranked based on the degree of similarity between the two parties involved in a social recommendation event. In further embodiments, the ranked list is based on the social distance or average social distance between the two parties involved in a social recommendation event. In some embodiments, the items are ranked based on the ratings of a plurality of items by the two parties involved in a social recommendation event, i.e., the user, or group of user making and receiving a recommendation, the degree of similarity between the two parties involved in a social recommendation event, and the social distance or average social distance between the two parties involved in a social recommendation event. In other embodiments, the items are ranked based on the ratings of a plurality of items by the two parties involved in a social recommendation event, i.e., the user, or group of user making and receiving a recommendation, and the social distance or average social distance between the two parties involved in a social recommendation event. In some embodiments, the items are ranked based on information obtained from the user profile of one or two parties involved in a social recommendation event, i.e., the user, or group of user making and receiving a recommendation.

In some embodiments, the items in a ranked list are items that the party receiving the recommendation has not directly experienced. In further embodiments, the items in a ranked list are items that the party receiving the recommendation has not directly experienced but wanted to. In some embodiments, the items in a ranked list are items that the party receiving the recommendation has not rated.

In some embodiments, the ranked list includes items from one or more categories or subcategories of interests to both parties involved in a social recommendation event. In some embodiments, the ranked list is presented to a user for a recommendation or non-recommendation to the user by a social recommendation application. In some embodiments, the ranked list is generated automatically by a social recommendation application based on the rating of the plurality of items of items by one or more users that are friend, friend of friend, or $3^{rd}$ degree contact with the user receiving the ranked list.

In some embodiments, the ranked list is updated real-time when there is any update in the data used in generating the ranked list. In further embodiments, the ranked list is updated real-time when there is any change in the rating from any party involved in a social recommendation event. In further embodiments, the ranked list is updated real-time when there is any change in the degree of similarity or social distance between the two parties involved in a social recommendation event. In other embodiments, the ranked list is generated when a user makes a request for a new or an-updated recommendation or non-recommendation within a social recommendation application. In other embodiments, the ranked list is generated when a user solicit a recommendation or non-recommendation from another user. In other embodiments, the ranked list is generated when a user view another user's rating, recommendation, non-recommendation, or profile.

Pre-Checks of Impression

In some embodiments, the systems, media, and methods described herein include a pre-check of impression or use of the same. In some embodiments, a pre-check of impression is regarding one or more items. In some embodiments, a pre-check of impression is regarding one or more lists of items. In further embodiments, a pre-check of impression is regarding one or more items that belongs to one or more categories or subcategories that is of interests to a user. In some embodiments, a pre-check of impression is collected along with a rating of a plurality of items. In further embodiments, a pre-check of impression an item is performed when a user indicates that he or she has no direct experience with the item. In other embodiments, a pre-check of impression of an item is performed when a user has not rated the item or had a non-valid response in rating the item.

In some embodiments, the user is linked to pre-check of impression within a social recommendation application. In some embodiments, the user is linked to pre-check of impression of an item from rating of the same item or rating of another item.

In some embodiments, pre-check of impression regarding an item comprises selecting an impression from a list of pre-determined impressions. In some embodiments, a list of pre-determined impressions is generated by a social recommendation application. In further embodiments, non-limiting examples of pre-determined impressions includes: have not tried but definitely want to, have tried but want to, have not tried and not sure, have not tried because never heard of it, have no tried because of a negative predisposition, have no tried because of a negative review, have no tried because of a negative rating from a friend, have no tried because of a non-recommendation from a friend, and none of the above. In other embodiments, a user selects, edits, or combines one or more pre-determined impressions as an impression regarding an item. In other embodiments, a user manually enters an impression regarding an item.

In some embodiments, the impression of a user regarding an item is used as a criterion in generating a recommendation or non-recommendation for the user. In some embodiments, the recommendation or non-recommendation is directly from a user or passively from a social recommendation system. In further embodiments, items with an impression of "have not tried but definitely want to," "have tried but want to," or "have not tried and not sure" by a user are added to a recommendation to the user in addition to the existing items. In further embodiments, items with an impression of "have no tried because of a negative predisposition," "have no tried because of a negative review," "have no tried because of a negative rating from a friend," or "have no tried because of a non-recommendation from a friend" by a user are deleted from a recommendation or not to be included in a recommendation to the user. In further embodiments, items with an impression of "have not tried but definitely want to," "have not tried but want to," or "have not tried and not sure" by a user are deleted from or not included in a non-recommendation to the user. In other embodiments, items with an impression of "have no tried because of a negative predisposition," "have no tried because of a negative review," "have no tried because of a negative rating from a friend," or "have no tried because of a non-recommendation from a friend" by a user are added to a non-recommendation to the user in addition to existing items.

In some embodiments, items with an impression of "have not tried but definitely want to," "have tried but want to," "have not tried and not sure," "have no tried because of a negative predisposition," "have no tried because of a negative review," "have no tried because of a negative rating from a friend," or "have no tried because of a non-recommendation from a friend," given by a first user is added to the plurality of items to be rated by a second user. In further embodiments, the second user has direct experience with the added item with an impression from the first user.

Recommendations and Non-Recommendations

In some embodiments, the systems, media, and methods described herein include a recommendation, a non-recommendation, or use of the same. In some embodiments, a recommendation includes a recommendation or a non-recommendation. In some embodiment, a recommendation or non-recommendation is made or received within a social recommendation application. In some embodiment, a recommendation or non-recommendation is generated within a social recommendation application. In some embodiment, a recommendation or non-recommendation is generated using a statistical, a mathematical, a numerical, or an empirical method. In some embodiments, a recommendation or non-recommendation is generated using an iterative, an optimization, a parameter estimation, an information maximization, an entropy minimization, a noise reduction, an error minimization, a predictive, or a model fitting algorithm.

In some embodiments, a recommendation is a hard or a soft recommendation. In further embodiments, a recommendation including strong recommending or non-recommending words, phrases, or sentences is considered to be a hard recommendation by the social recommendation system. In further embodiments, a soft recommendation including less weight in recommendation language than a hard recommendation. As non-limiting examples, hard recommendation includes: absolutely recommended, amazing, best ever, definably not, worst ever, etc. As non-limiting examples, a soft recommendation includes: recommended, pretty good, interesting, etc. In some embodiments, a hard recommendation is given higher priority over a soft recommendation by a social recommendation system. In some embodiments, a hard recommendation is given a different system remark than a soft recommendation. In some embodiments, a hard recommendation is given an additional system remark than a soft recommendation. In some embodiments, a hard and a soft recommendation or non-recommendation is associated with a different label or name. In some embodiments, a hard and a soft recommendation or non-recommendation is associated with a different scale or numerical value representing a recommendation level. In further embodiments, a hard recommendation has a higher recommendation level, scale, or value. In some embodiments, a hard recommendation is presented to a user with higher priority over a soft recommendation. In some embodiments, a hard or a soft recommendation is made directly to a user by the user's friend, a group of friends of the user, or one or more of the user's nth degree contacts with n being a finite number of greater than 0 and smaller than 10.

In some embodiments, a recommendation is a direct recommendation from a user to another user or a group of users. In some embodiments, the direct recommendation is a hard or a soft recommendation. In some embodiments, the direct recommendation is made with or without taking into consideration the degree of similarity between the two parties involved in a recommendation event. In some embodiments a direct recommendation is from the user's nth degree contacts with n being a finite number of greater than 0 and smaller than 2, 3, 4, 5, 6, 7, 8, or 9.

In some embodiments, a passive recommendation is made by a social recommendation system to a user or a group of user. In further embodiments, a passive recommendation is not directly made by a user or a group of users. In further embodiments, a passive recommendation is generated by a social recommendation system automatically using the user and item data available to the social recommendation system or application. In some embodiments, the passive recommendation is made with taking into consideration the degree of similarity between the two parties involved in a recommendation event.

In some embodiments, a recommendation or non-recommendation has a feedback option. In further embodiments, a user receiving the recommendation is asked to input a feedback to the received recommendation. In further embodiments, the feedback includes a rating, a review, an evaluation, or a comment. In further embodiments, the feedback is used to optimize future recommendation or non-recommendation generation. In further embodiments, the feedback is rewarded with an incentive from a social recommendation application. In further embodiments, the feedback is shown on the user's profile. In some embodiments, the feedback is shown with the corresponding recommendation or non-recommendation. In some embodiments, the feedback is a rating, a rating associated review, evaluation, feedback, comment regarding the recommendation or non-recommendation.

In some embodiments, the recommendation or non-recommendation includes a ranked list of items. In some embodiments, the recommendation or non-recommendation includes a ranked list of items that are of interests to the user or the group of users receiving the recommendation or non-recommendation. In some embodiments, the number of items in the ranked list can be edited either by the system automatically or manually by the user or the group of users receiving the recommendation. In some embodiments, when an automatic recommendation fails to generate a ranked list of items, the user is linked to change some recommendation criteria within a social recommendation application. The non-limiting examples of recommendation criteria includes the number of the ranked list, the date, price, location, category, or subcategory of each item, the degree of similarity, the rating of a plurality of times, the threshold of degree of similarity between the two parties, the threshold of social distance between the two parties, a number of users involved in the recommendation event, or the like.

In some embodiments, all the items in a recommendation are selected from a plurality of items that has been rated by the two parties involved in a social recommendation event, i.e., the user or group of user making and receiving a recommendation. In further embodiments, a rating includes a pre-check of impression. In some embodiments, a recommendation displays a ranked list of items from the most highly ranked item at the top of the list to items with the lowest rank at the bottom. The ranking of items is monotonically no increasing as the list goes down from the top to the bottom. In some embodiments, one or more items share the same rank. In further embodiments, the ranked list has a fixed number of items. For example, a ranked list of top 10 restaurants with a great scenic view has a list of 10 restaurants. If more than one item share the rank in a fixed-number ranked list, then one or more ranks in the list is empty. In other embodiments, every rank in a ranked list has one or more items.

In some embodiments, the ranking of a ranked list in a recommendation indicates the relative level of recommendation of items within the ranked list. The top 1 of the ranked list is the most highly recommended item, and the level of recommendation monotonically goes down as the list goes down from the top to the bottom. In certain embodiments, the bottom of the list is the least recommended item. In some embodiments, the items are ranked based on the rating, review, comments, or evaluation of a plurality of items by a user.

In some embodiments, a recommendation is based on the rating of a plurality of items by the two parties involved in a social recommendation event, i.e., the user, or group of user making and receiving a recommendation. In further embodiments, the items in a recommendation are from the plurality of items rated by the two parties. In further embodiments, a recommendation is based on the degree of similarity between the two parties involved in a social recommendation event. In further embodiments, a recommendation is based on the social distance or average social distance between the two parties involved in a social recommendation event. In some embodiments, a recommendation is based on the ratings of a plurality of items by the two parties involved in a social recommendation event, i.e., the user, or group of user making and receiving a recommendation, the degree of similarity between the two parties involved in a social recommendation event, and the social distance or average social distance between the two parties involved in a social recommendation event. In other embodiments, a recommendation is based on the ratings of a plurality of items by the two parties involved in a social recommendation event, i.e., the user, or group of user making and receiving a recommendation, and the social distance or average social distance between the two parties involved in a social recommendation event. In some embodiments, a recommendation is based on information obtained from the user profile of one or two parties involved in a social recommendation event, i.e., the user, or group of user making and receiving a recommendation.

In some embodiments, the items in a recommendation are items that the party receiving the recommendation has not directly experienced. In further embodiments, the items in a recommendation are items that the party receiving the recommendation has not directly experienced but wanted to. In some embodiments, the items in a recommendation are items that the party receiving the recommendation has not rated. In some embodiments, the items in a recommendation include items that both parties have positive or neutral impressions but has no directly experienced. In further embodiments, the positive impressions includes: "definitely want to try," "want to try," "not sure." In some embodiments, the items in a non-recommendation include items that both parties have negative or neutral impressions but has no directly experienced. In further embodiments, the positive impressions includes: "negative predisposition," "negative review," "negative rating," or "not sure."

In some embodiments, a recommendation includes items from one or more categories or subcategories of interests to both parties involved in a social recommendation event. In some embodiments, a recommendation is presented to a user within a social recommendation application. In further embodiments, a recommendation is presented to a user as one or more of: a ranked list of images, a ranked list of names, a ranked list of icons, a ranked list of videos, a ranked list of trailers, a ranked list of item profiles, or a ranked list of item descriptive tags. In some embodiments, a recommendation is generated automatically by a social recommendation application based on the rating of the plurality of items of items by one or more users that are friend, friend of friend, or $3^{rd}$ degree contact with the user receiving the ranked list.

In some embodiments, a recommendation is updated real-time when there is any update in the data used in generating the ranked list. In further embodiments, a recommendation is updated real-time when there is any change in the rating from any party involved in a social recommendation event. In further embodiments, a recommendation is updated real-time when there is any change in the degree of similarity or social distance between the two parties involved in a social recommendation event. In other embodiments, a recommendation is generated when a user makes a request for a new or an-updated recommendation or non-recommendation within a social recommendation application. In other embodiments, a recommendation is generated when a user solicit a recommendation or non-recommendation from another user. In other embodiments, a recommendation is generated when a user view another user's rating, another recommendation, another non-recommendation, or another user's profile.

In some embodiments, a recommendation is based on the ratings of a plurality of items by two parties involved in a social recommendation event, i.e., the user, or group of user making and receiving a recommendation. In further embodiments, each party has a valid rating or a no-response rating to each item in the plurality of items. In some embodiments, the number of the plurality of items used in generating a social recommendation to a user or a group of users is not fixed. The number of the plurality of items used in generating a social recommendation to a user or a group of users changes with the number of ratings completed by one or both parties involved, the number of items in the database of a recommendation application/system, the category or subcategory changes in one or two parties interests, the change in degree of similarity or the change in social distance between the two parties.

In some embodiments, a recommendation or non-recommendation is based on item descriptive tags. In further embodiments, the item descriptive tags are generated by a social recommendation application, an external source, or manually by one or more users within the social recommendation application. In further embodiments, the item descriptive tags are stored associated with an item. In some embodiments, one or more item descriptive tags are presented on an item profile. In other embodiments, one or more item descriptive tags are presented with an item in detailed information of an item. In some embodiments, the item descriptive tags are used as a basis for making a recommendation. For example, an item with an item descriptive tag of "good movie for kids" is recommended to a user who is interested in "entertainment/education for children". In further embodiments, non-limiting examples of item descriptive tags includes: a classification of content, a cast, a film duration, a music duration, a price, a director, an actor, an actress, a location, a company name, a language, a release date, a genre, a date, a month, a year, a certain period of time, a location, a zip code, a city, a state, a country, a name, a brand, a producer, a color, style, a taste, an artist, a player, a cook, or the like.

In some embodiments, a "watch it now" option is provided for each item in a recommendation or a non-recommendation. If a user selects the "watch it now" option of the currently reviewed item, the user is directed to current streaming providers and/or offline sources for the item. In further embodiments, the user is provided with one or more selected form cost, duration, playing theatre, rating, and location information.

Figure 2:
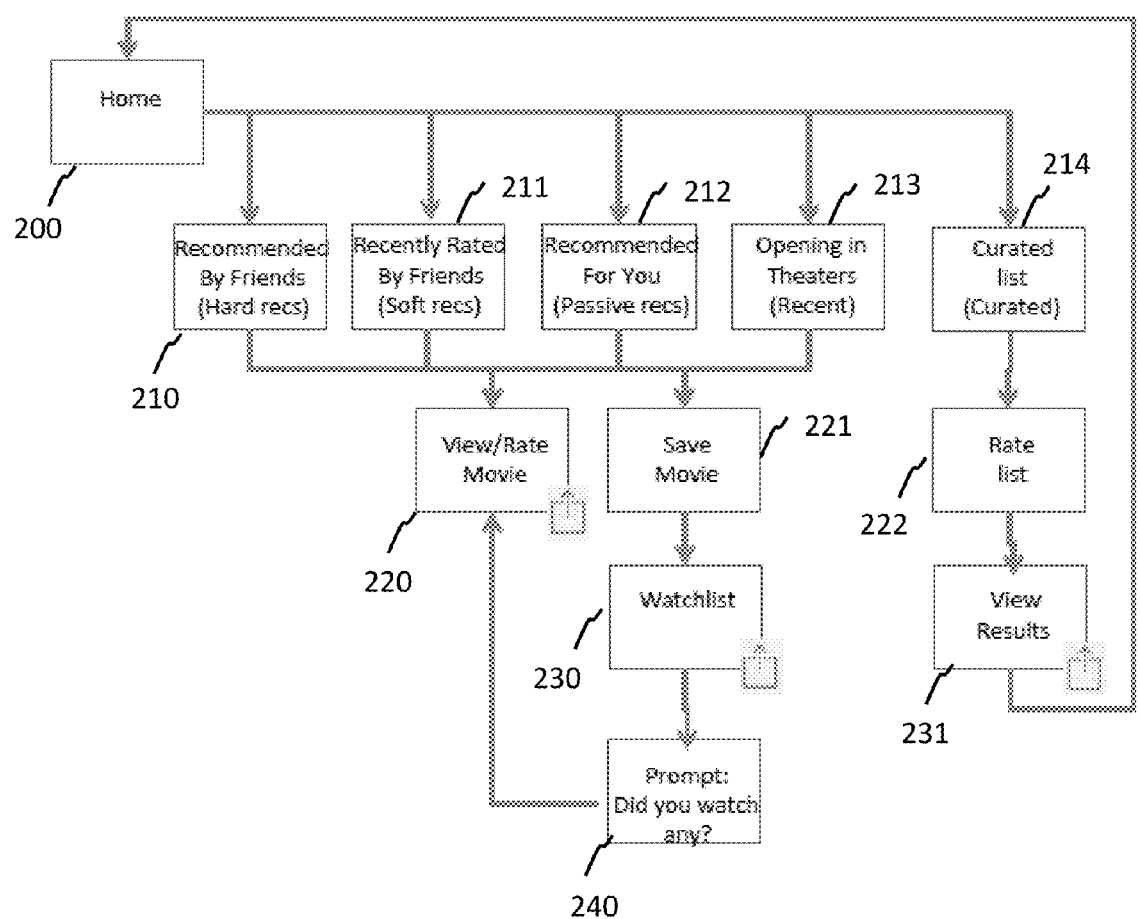
FIG. 2 shows a non-limiting exemplary diagram of a process flow; in this case, a diagram depicting a process for an existing user of a social recommendation application to participate in the social recommendation described herein.

Referring to FIG. 2, in a particular embodiment, a software module for an existing user to login and use a social recommendation application. In this embodiment, the existing user starts at a home page 200 of a social recommendation application, optionally views items recommended directly by friends with hard recommendations 210, items recommended directly by friends with soft recommendations 211, or items passively recommended by the social recommendation application 213, or items that are recently opened or currently in theaters 214. In the same embodiments, the existing user view movies selected from different type of recommendations, and rates them after viewing 220. The user optionally saves move 221 into a watchlist 230 from various recommendations provided by the social recommendation application. The social recommendation prompts system message or reminder 240 to the user regarding the saved items to the user after a pre-determined period of time passes. In the same embodiment, the social recommendation application automatically generates a curated list 214, the curated list is generated optionally based on the items that are included in recommendation by friends, by system, and/or the rating by the user and the user' friends. In this particular embodiment, the user rates the list 222, and optionally views rating results 231.

Figure 3:
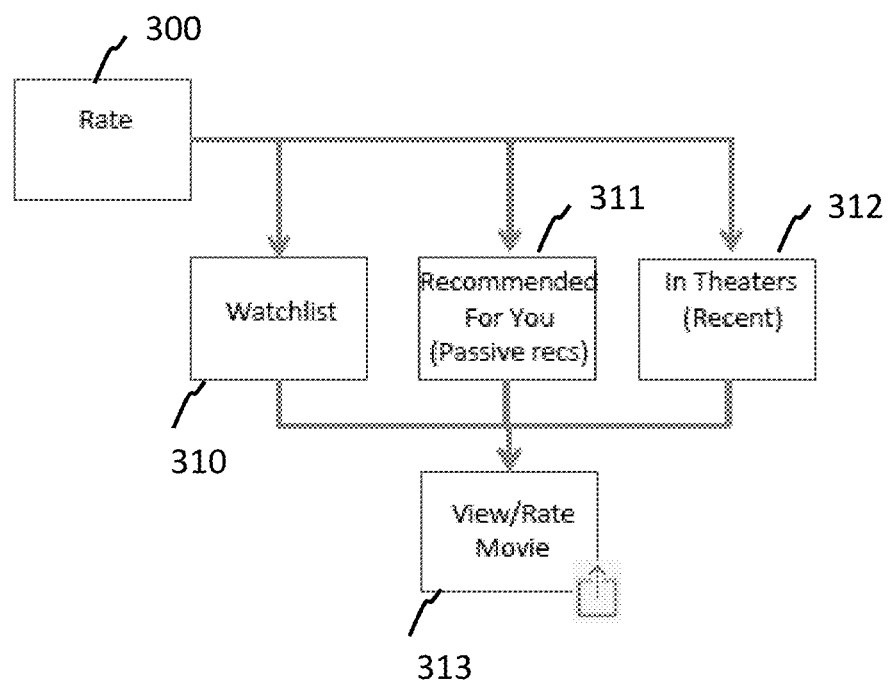
FIG. 3 shows a non-limiting exemplary diagram of a process flow; in this case, a diagram depicting a process for an existing user of a social recommendation application to participate in ratings described herein.

Referring to FIG. 3, in a particular embodiment, a software module for an existing user to login and rate 300 using a social recommendation application. The user optionally selects a watchlist of items 310, recommendations passively recommended by the system 311, and/or items that are currently or recently in theater 312, and view one or more selected items and rate 313 them after viewing.

Figure 20:
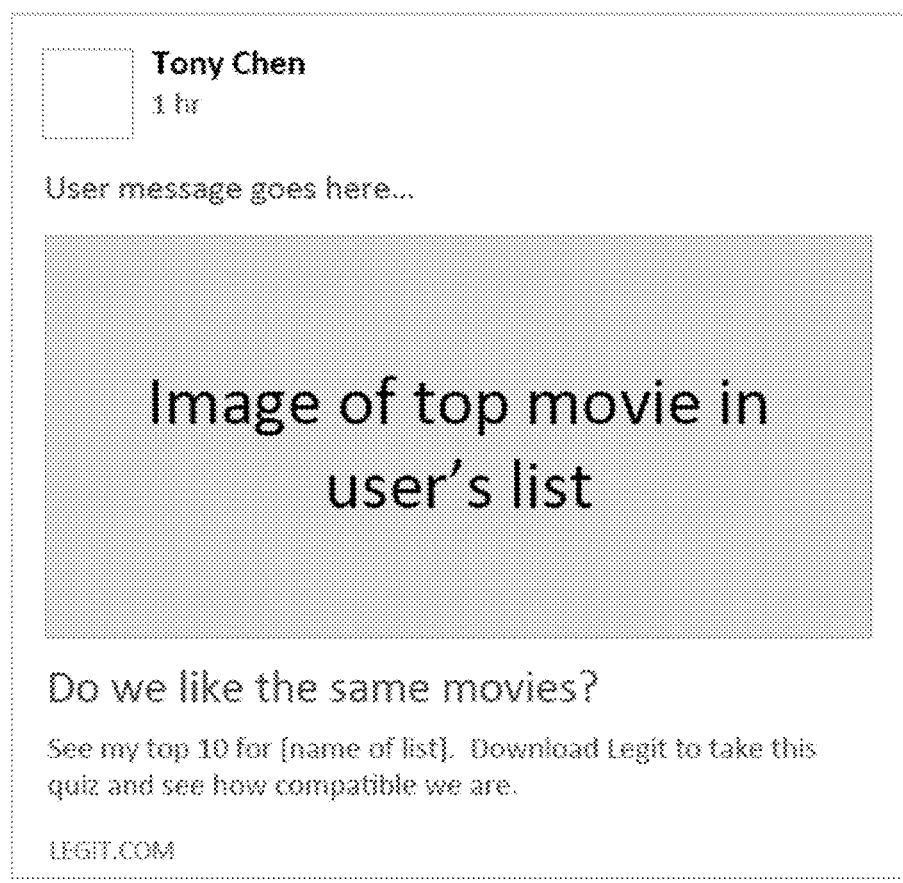
FIG. 20 shows a non-limiting example of a user interface for a social recommendation application; in this case, an interface for a user to view top rated items shared by another user.

Referring to FIG. 20, in a particular embodiment, a user optionally views top rated items shared by another user named Tony Chen. In the same embodiment, the user optionally downloads Legit, a social recommendation application, after visiting Tony Chen's top's rated items.

Figure 21:
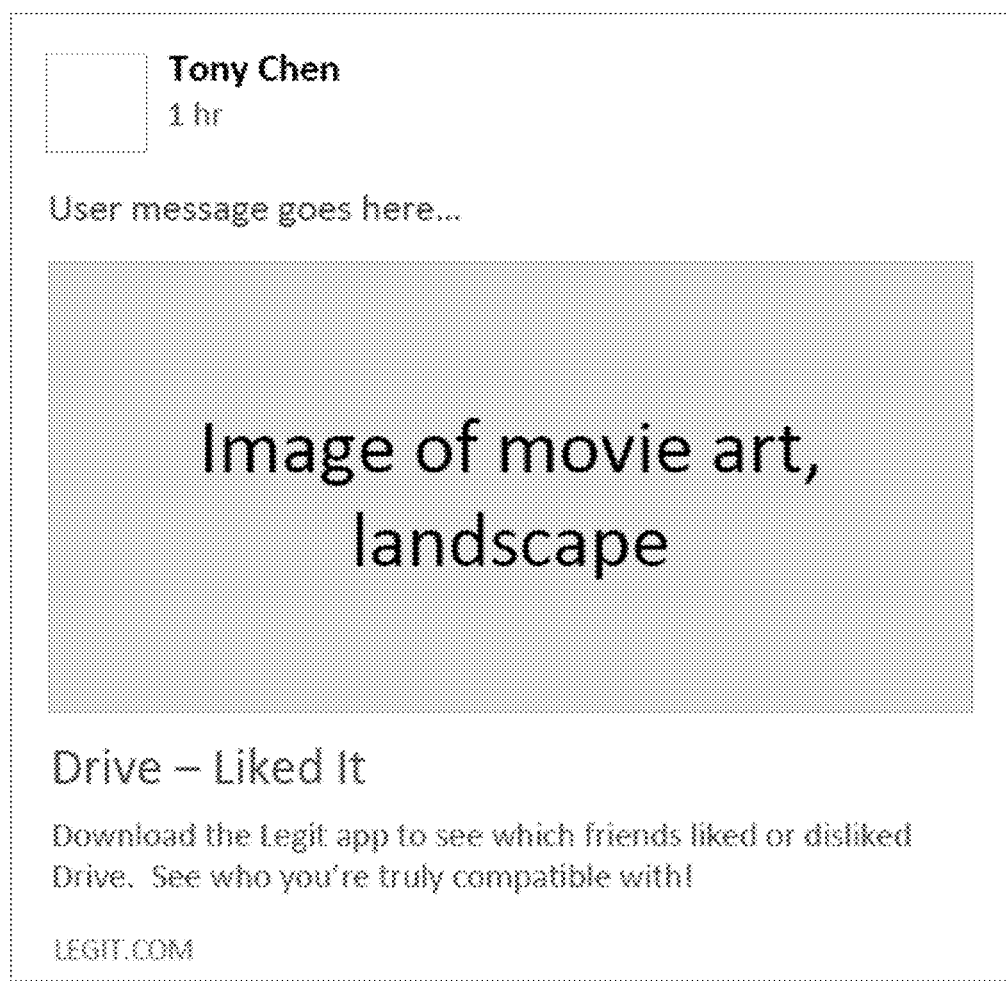
FIG. 21 shows a non-limiting example of a user interface for a social recommendation application; in this case, an interface for a user to view information of an item liked and shared by another user.

Referring to FIG. 21, in a particular embodiment, a user optionally views a rated item named Drive shared by another user named Tony Chen. In the same embodiment, the user optionally downloads Legit, a social recommendation application after visiting Tony Chen's rated item, Drive.

Figure 22:
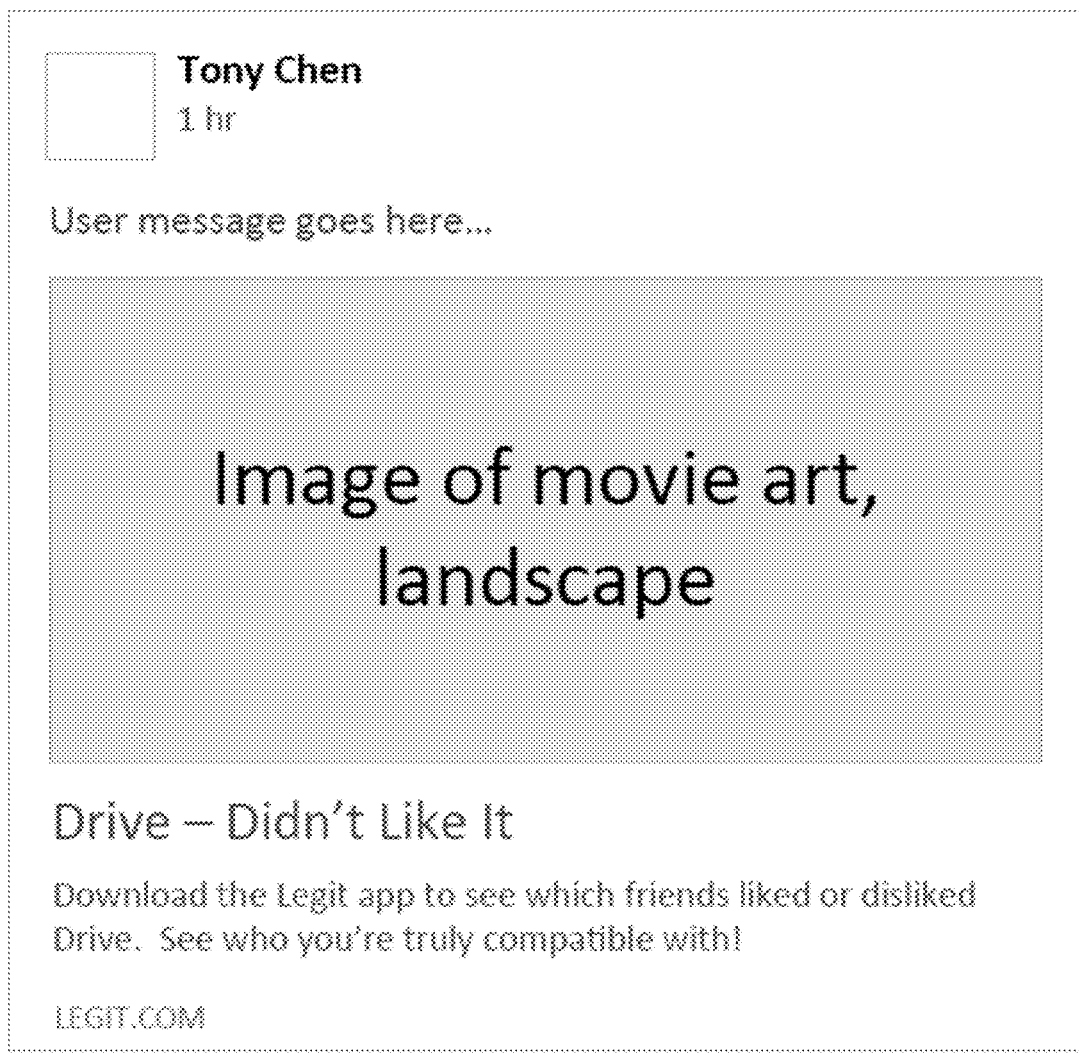
FIG. 22 shows a non-limiting example of a user interface for a social recommendation application; in this case, an interface for a new user to view information of an item disliked and shared by another user.

Referring to FIG. 22, in a particular embodiment, a user optionally views a rated item named Drive shared by another user named Tony Chen. In the same embodiment, the user optionally downloads Legit, a social recommendation application.

Figure 23:
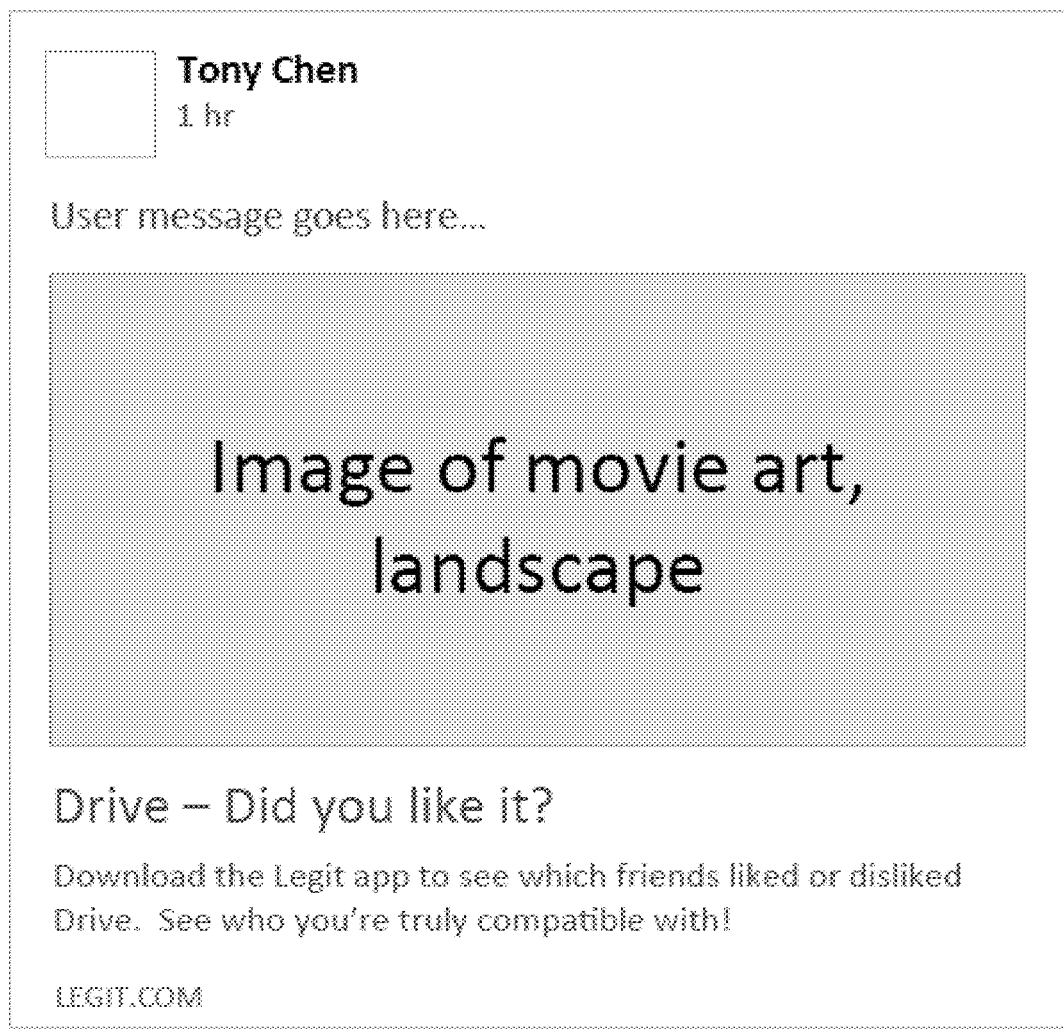
FIG. 23 shows a non-limiting example of a user interface for a social recommendation application; in this case, an interface for a user to view information of an item shared by another user.

Referring to FIG. 23, in a particular embodiment, a user optionally views an item named Drive shared by another user named Tony Chen. In the same embodiment, the user optionally downloads Legit, a social recommendation application.

Figure 24:
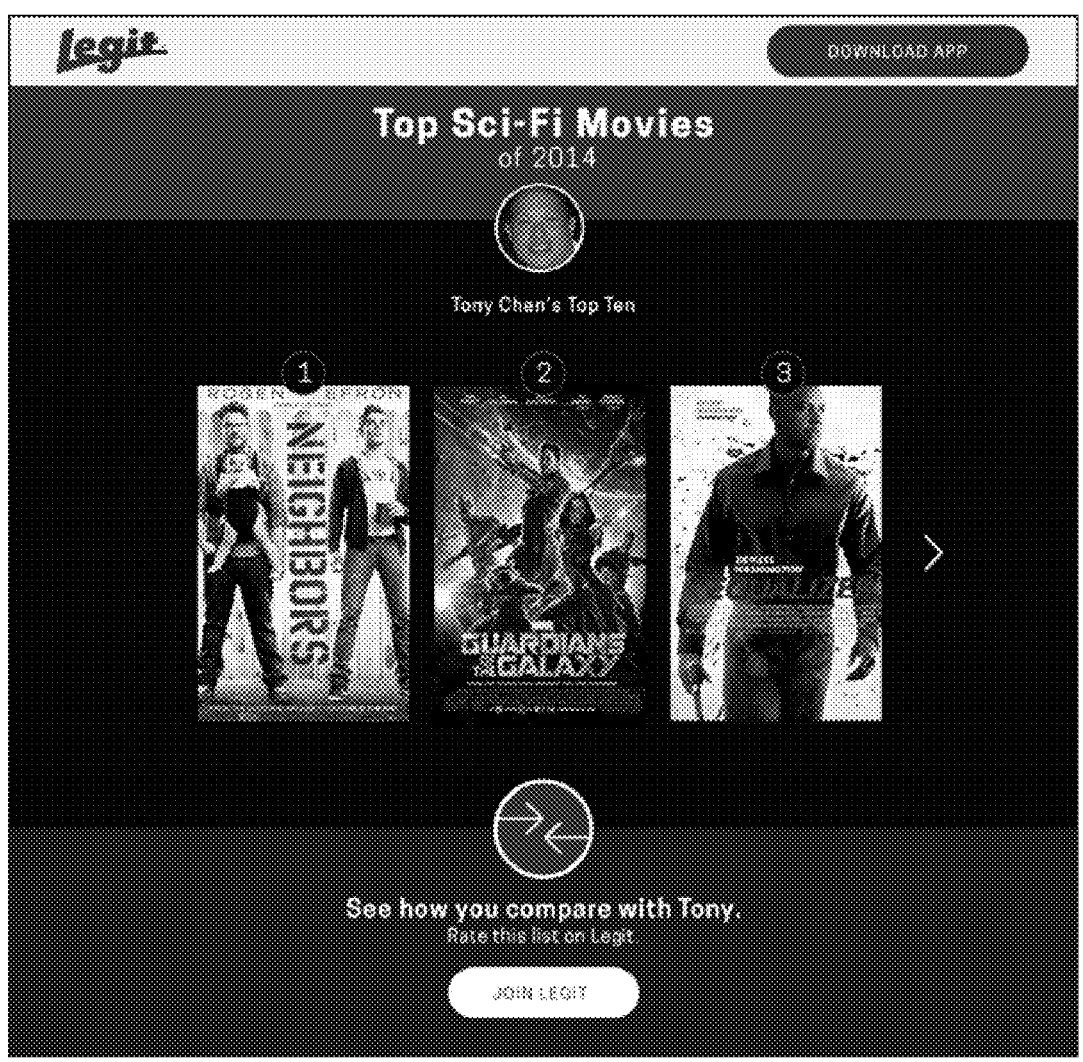
FIG. 24 shows a non-limiting example of a user interface for a social recommendation application; in this case, an interface for a user to view a rate list of items shared by another user and to download a social recommendation application.

Referring to FIG. 24, in a particular embodiment, a user optionally views top 10 movies all-time shared by another user named Tony Chen. In this embodiment, the user optionally views movie posters for these top 1-movies rated by Tony Chen. In the same embodiment, the user optionally downloads Legit, a social recommendation application, by tapping on "download Legit."

Figure 25:
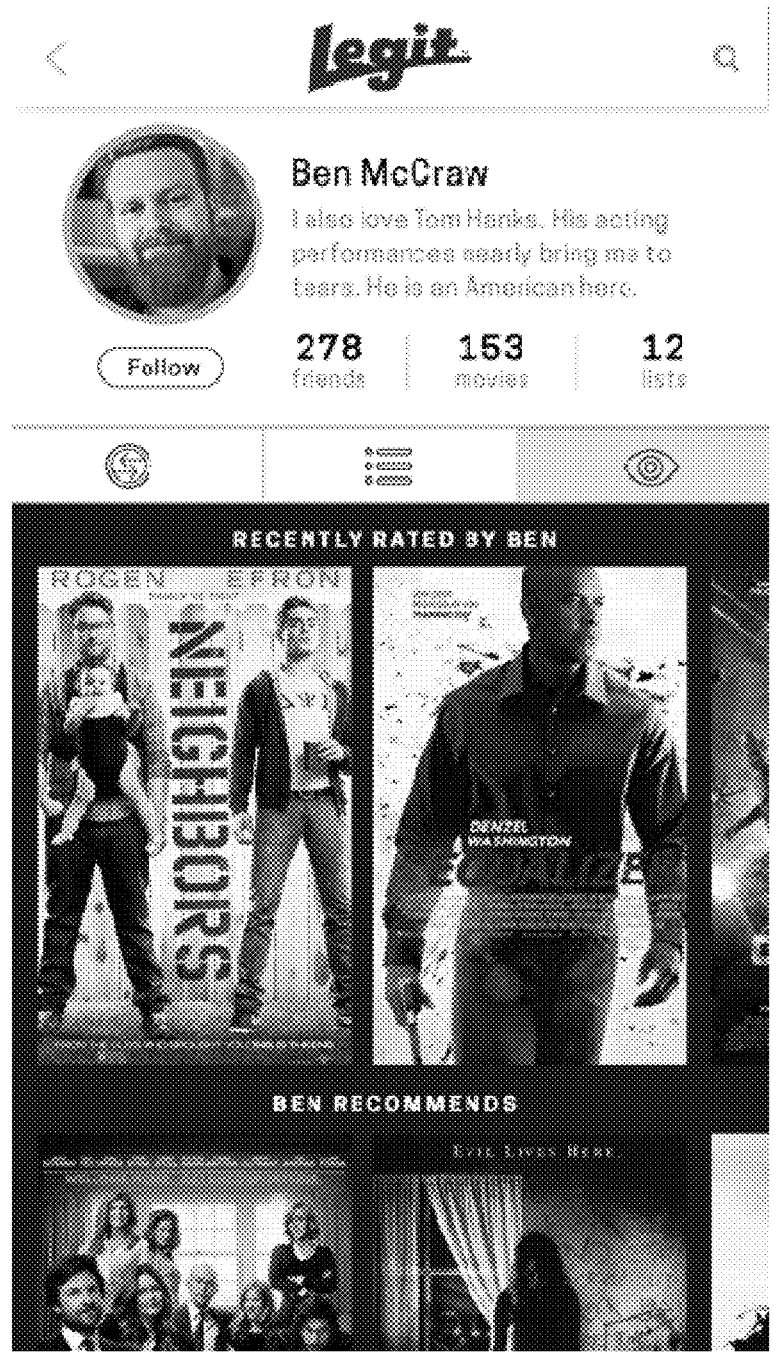
FIG. 25 shows a non-limiting example of a user interface for a social recommendation application; in this case, an interface for a user to view a rate list of items shared by another user and to download a social recommendation application.

Referring to FIG. 25, in a particular embodiment, a user optionally views top 10 movies all-time shared by another user named Tony Chen. In this embodiment, the user optionally views movie posters for these top 1-movies rated by Tony Chen. In the same embodiment, the user optionally downloads Legit, a social recommendation application after visiting Tony Chen's top's rated items, by tapping on "download Legit."

Figure 26:
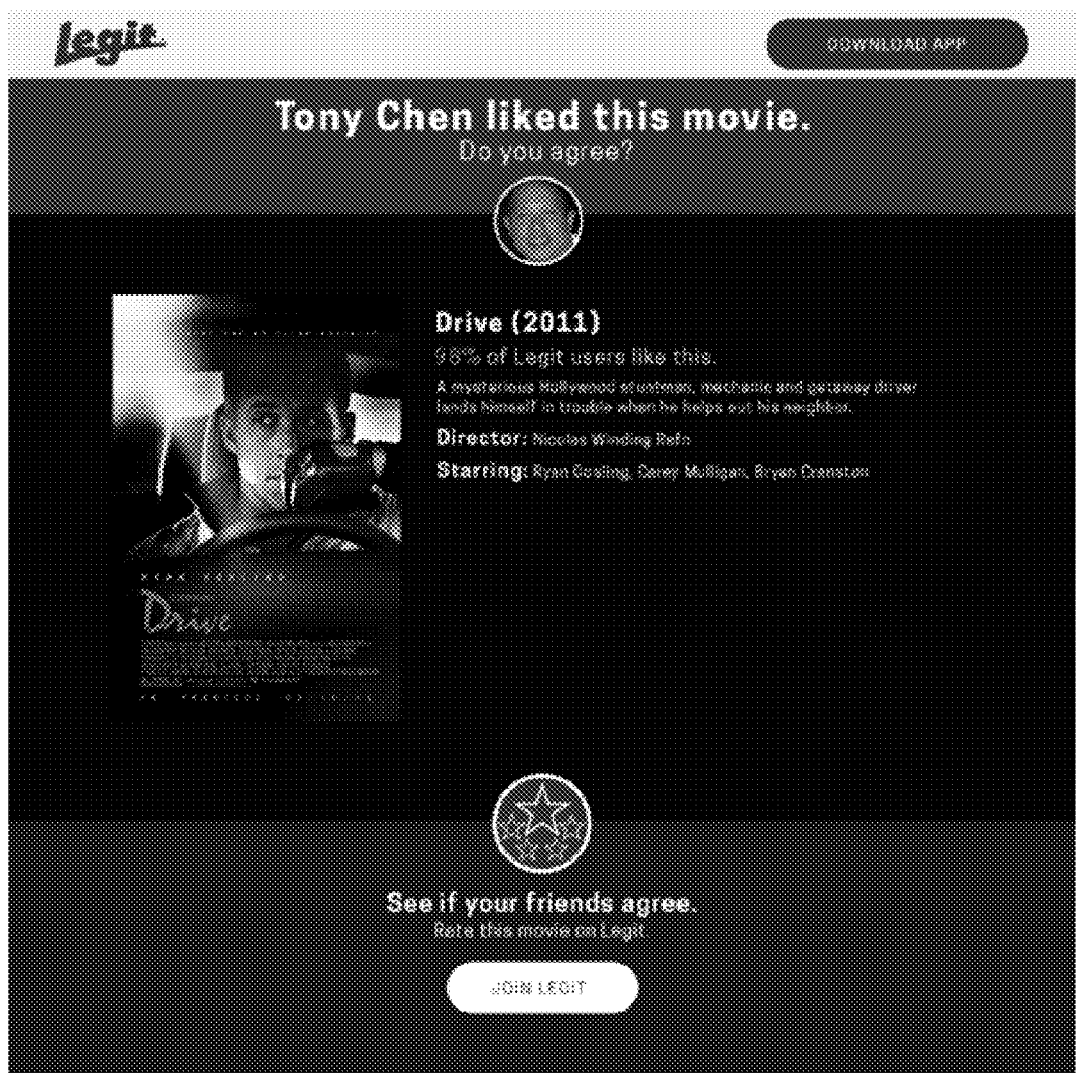
FIG. 26 shows a non-limiting example of a user interface for a social recommendation application; in this case, an interface for a user to view an item liked and shared by another user and to download a social recommendation application.

Referring to FIG. 26, in a particular embodiment, a user optionally views a rated item named Drive shared by another user named Tony Chen. In the same embodiment, the user optionally downloads Legit, a social recommendation application, after visiting Tony Chen's rating, by tapping on "download Legit."

Figure 27:
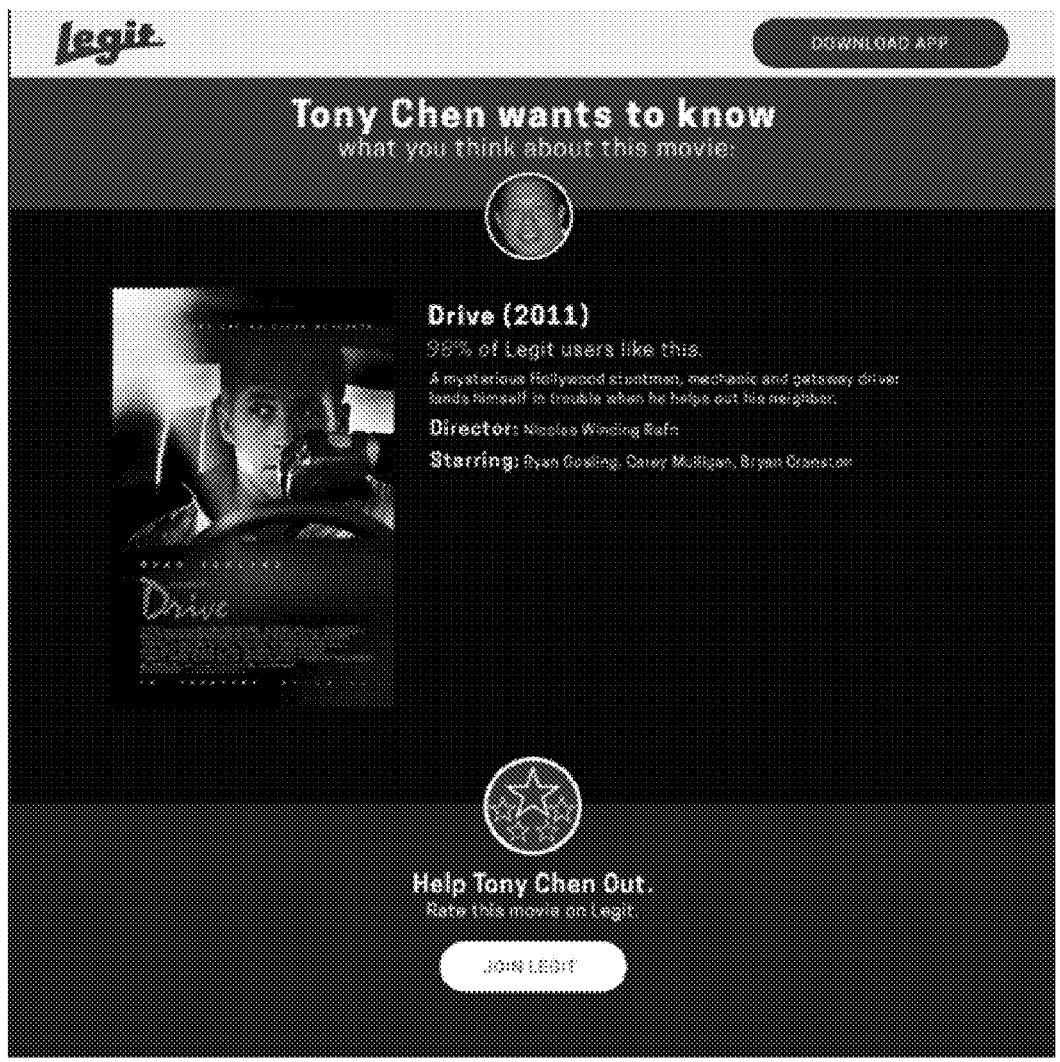
FIG. 27 shows a non-limiting example of a user interface for a social recommendation application; in this case, an interface for a user to view a request of review regarding an item by another user and to download a social recommendation application.

Referring to FIG. 27, in a particular embodiment, a user optionally views an item named Drive shared by another user named Tony Chen. In the same embodiment, the user optionally downloads Legit, a social recommendation application, after visiting Tony Chen's request for opinion, by tapping on "download Legit."

Figure 32:
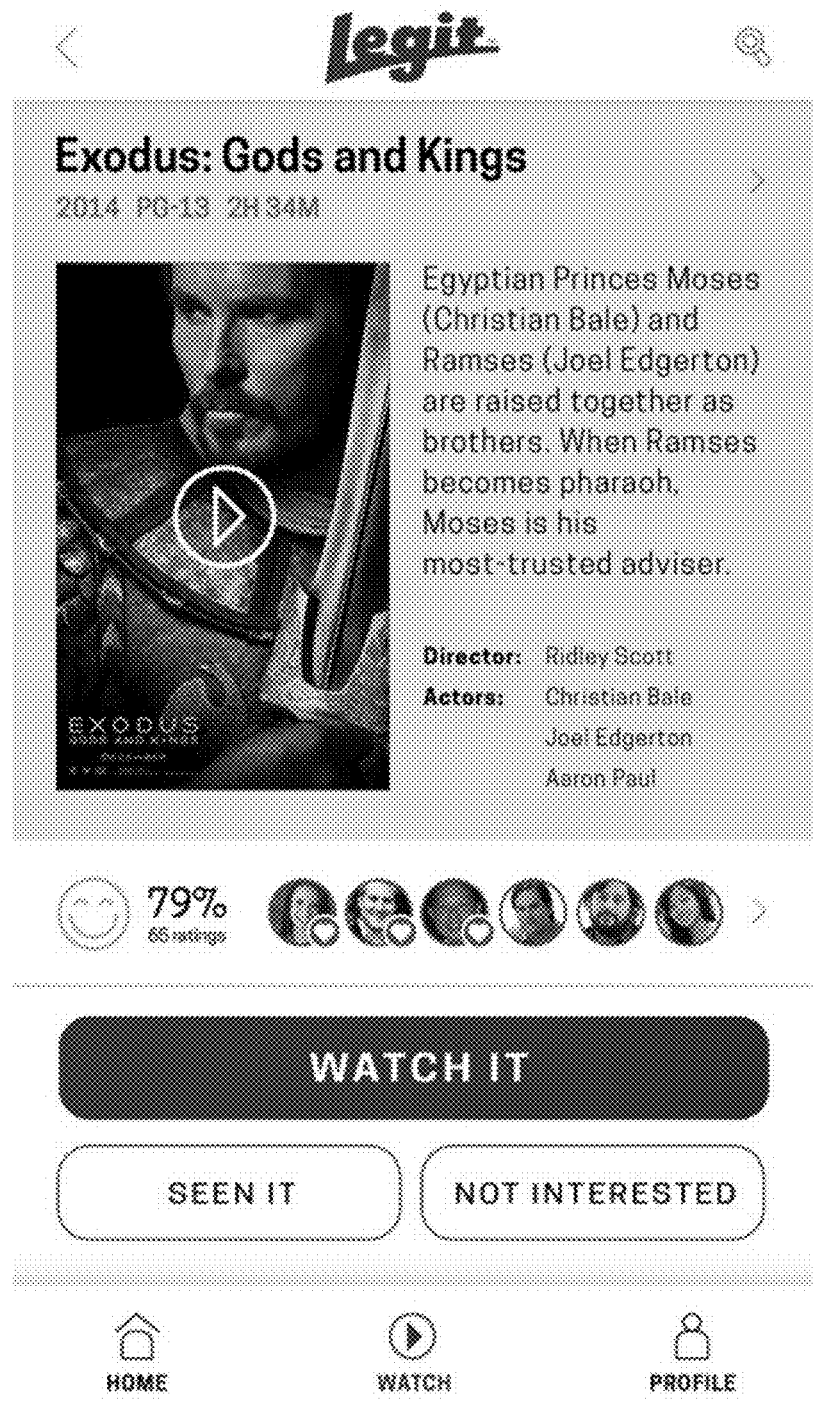
FIG. 32 shows a non-limiting example of a user interface for a social recommendation application; in this case, an interface for a user to select an item to "watch now."

Referring to FIG. 32, in a particular embodiment, a user optionally views a list of recommended items shared by several other users including three compatible users. In this particular embodiment, the user select to watch one item right away in the recommended list by clicking "watch it now," on the information page of the same time. The user is then directed to current streaming providers or offline options and possible costs associated with online streaming providers and offline sources.

In some embodiments, the watch-now mode allows a user to browse through recommended items, e.g.: movies or TV shows, and indicate preference. If a user chooses to watch an item, a list of current streaming providers and cost is provided to the user. The items are shown one at a time and are ordered based on the compatibility score. In some embodiments, the compatibility score is interchangeable with the degree of similarity. In some embodiments, the compatibility score is calculated in the same way as the degree of similarity. In some embodiments, the compatibility score is calculated between two users. In some embodiments, the compatibility score is calculated based on at least one item. In some embodiments, the compatibility score is calculated among more than two users.

Questions and Responses

In some embodiments, the systems, media, and methods described herein include questions and responses or use of the same. In some embodiments, questions and responses are included in a structured message. In further embodiments, the structured message has one or more structural identifiers to facilitate organization and processing of information therein. In some embodiment, a social recommendation application comprises a software module configured to allow a user to select or enter one or more questions to send to one or more non-self users or a group of users. In some embodiments, the questions and responses are regarding a user's profile, a user's rating, a user's recommendation or non-recommendation, an item, a category, a subcategory, or any other information that is related to a social recommendation application or system.

In some embodiment, a social recommendation application further comprises a software module configured to allow a user receiving a recommendation to select and send one or more questions to a user making a recommendation regarding the recommendation or non-recommendation. In some embodiments, a user receiving a recommendation sends a structured message including one or more questions regarding a recommendation. In further embodiments, the one or more questions are selected from a list of pre-determined questions generated by a social recommendation application. In some embodiments, the one or more questions are structured to obtain factual or evaluative information regarding one or more items from the user receiving the questions. In some embodiments, non-limiting examples of one or more questions are True or False, multiple choices, open questions, close questions, recall or process questions, factual questions, evaluative questions, single choice, AB tests, or the like. In some embodiments, the one or more questions are selected and modified from a list of pre-determined questions generated by a social recommendation application. In other embodiments, the one or more questions are manually entered by a user sending the questions.

In some embodiment, a social recommendation application further comprises a software module configured to allow a user make a recommendation to select and send one or more responses to a user receiving a recommendation regarding the one or more questions that has been received. In some embodiments, the one or more responses are selected from a list of pre-determined answered generated by a social recommendation application. In some embodiments, the one or more responses are selected from a list of pre-determined answered generated by a social recommendation application and modified by the user. In other embodiments, the one or more responses are manually entered by a user sending the questions.

Interests and Categories

In some embodiments, the systems, media, and methods described herein include an interest, a subcategory of interests, a category of interests, or use of the same. In some embodiments, non-limiting examples of one or more categories are selected from high level categories: movies, TV shows, sport teams, activities, musics, clubs, music bands, restaurants, bars, mobile applications, books, magazines, journals, online videos, images, articles, games, sports, electronics, caters, breweries, wineries, dating websites, and products.

In some embodiments, the one or more categories of interests are sub-categories under one or more high level categories. For example, one or more categories are selected from sub-categories of TV shows and movies: dramas, cartoons, news, reality shows, documentaries, music videos, thrillers, comedies. As another example, subcategories of movies can be selected from: science-fiction, action, horror, historical, comedy, musical, gangster, or the like. In further embodiments, a high level category includes one or more types of subcategories. As another example, subcategories of restaurants can be based on price range, cuisine styles, or restaurant size. In some embodiments, the one or more categories of interests are selected from one or more high level categories or sub-categories of same or different types.

In some embodiments, the one or more categories of interests are from the level of categories, the level of subcategories, the level of subcategories of subcategories, or the nth level of subcategories, where n is an integer greater than 1 and less than 9. In some embodiments, the one or more categories of interests are from one or more levels in the hierarchy of categories and subcategories.

User Profiles

In some embodiments, a user of a social recommendation system, or application, i.e., a group user or a non-group user, creates and/or edits a user profile. In some embodiments, a user profile includes user related information with non-limiting examples including a photo, a self-description, demographical information, an address, contact information, experiences, the last log-in date, time, and/or duration. In some embodiments, the user profile shows whether the user is currently offline or logged in. In some embodiments, the user profile includes a number of following user, a number of followers, a degree of similarity with each following user, and a degree of similarity with each follower.

In some embodiment, a user profile includes recommendation related information. Non limiting examples of recommendation related information includes: one or more ratings of one or more items or lists, one or more rating associated reviews, feedbacks, descriptions, evaluations, or comments, a number of ratings, a number of items in each rating, one or more items that are currently in need of recommendations or advices, one or more categories or subcategories of interests, items of interests in each category, a list of friends and/or a list of friends of friends, a number of friends, a number of friends of friends, a number of nth degree of contact with n being less than 10 and greater than or equal to 1, a list of recently rated items, recommendations or non-recommendations made to other users, recommendations or non-recommendations received from other users, a degree of similarity to each friend, or each friend of friend. In some embodiments, the user profile includes recommendation or non-recommendation in a form of a ranked list. In some embodiments, the user profile includes one or more rated lists or items. In some embodiments, the user profile includes one or more names of rated lists or items.

In some embodiments, the user profile shows the number of total or average recommendations or non-recommendations that the user has been involved in. In some embodiments, the user profiles show the number of total or average number of ratings that the user has participated in. In some embodiments, the user profile shows the success rate of recommendations or non-recommendations of the user. In further embodiments, the success rate is calculated as the number of positive ratings among the total number of recommendations divided by the total number of recommendations made. In some embodiments, the user profile shows the total or average number of structured messages that the user has received. In some embodiments, the user profile also indicates the overall or average response ratio calculated by the total or average number of responses to structured messages divided by the total or average number of structured messages.

In some embodiments, the user profile includes data analytics of ratings, recommendations, non-recommendations made or received, structured messages made, received, or replied in a period of time. In some embodiments, the user profile includes public and private information. In further embodiments, the user adds and edits information that can be public or private in the profile.

In some embodiments, a user profile includes links to create, edit, or remove the user profile. In some embodiments, a user profile includes a link to follow another user, follow an item, follow a list, friend another user or a group of users, accept a friend request, a following request. In some embodiments, the user profile includes a link to the user-specific home page of a social recommendation application.

In some embodiments, the user profile includes links connecting to functions within a social recommendation application. In further embodiments, these functions includes: searching for an item or a list, searching for a user or a group of user, rating a list of a plurality of items, soliciting a rating, a comment, a review, a recommendation from another user, sending a message to another user, viewing sent and received messages, receiving and viewing system notifications.

Figure 4:
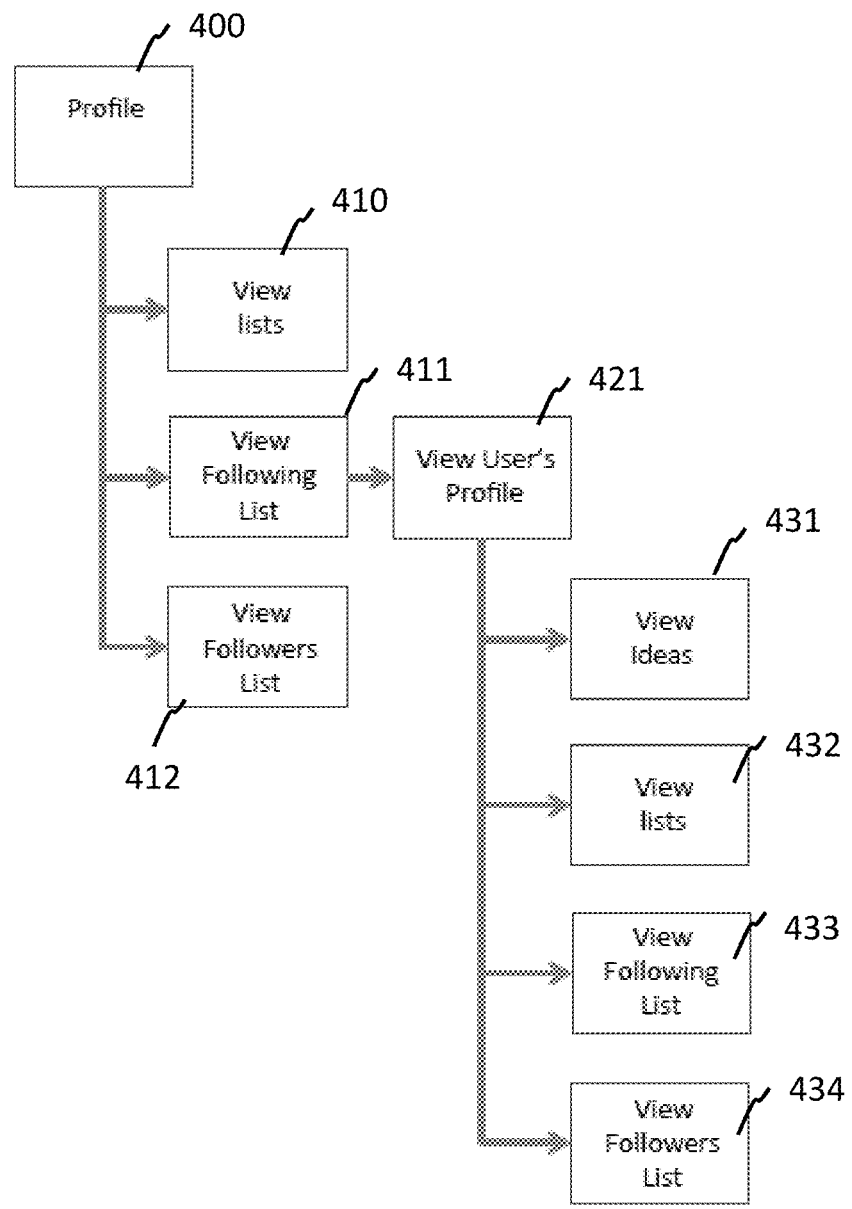
FIG. 4 shows a non-limiting exemplary diagram of a process flow; in this case, a diagram depicting a process for an existing user of a social recommendation application to participate in viewing and editing a user profile described herein.

Referring to FIG. 4, in a particular embodiment, a software module for an existing user to login, view and edit a user profile. In this embodiment, the existing user starts at a user profile page 400 of a social recommendation application, optionally views different lists of items 410 of himself or herself, i.e. a saved list, a watchlist, a rating list, a list of recommendation or non-recommendation to or from another user or a group of user. In the same embodiments, the existing user optionally view following lists 411 of a following user, i.e. a saved list, a watchlist, a rating list, a list of recommendation or non-recommendation to or from another user or a group of user. In this embodiments, the user optionally view the following user's profile 421 so that the user optionally view ideas 431 of the following user regarding one or more items, lists, subcategories, categories, or interests. In this embodiment, the user optionally view the following user's list 432, i.e. a saved list, a watchlist, a rating list, a list of recommendation or non-recommendation to or from another user or a group of user, or a following user of the following user's lists 433, or a follower of the following user's lists 434. In the same embodiments, the existing user optionally view a follower's lists 412, i.e. a saved list, a watchlist, a rating list, a list of recommendation or non-recommendation to or from another user or a group of user.

Figure 5:
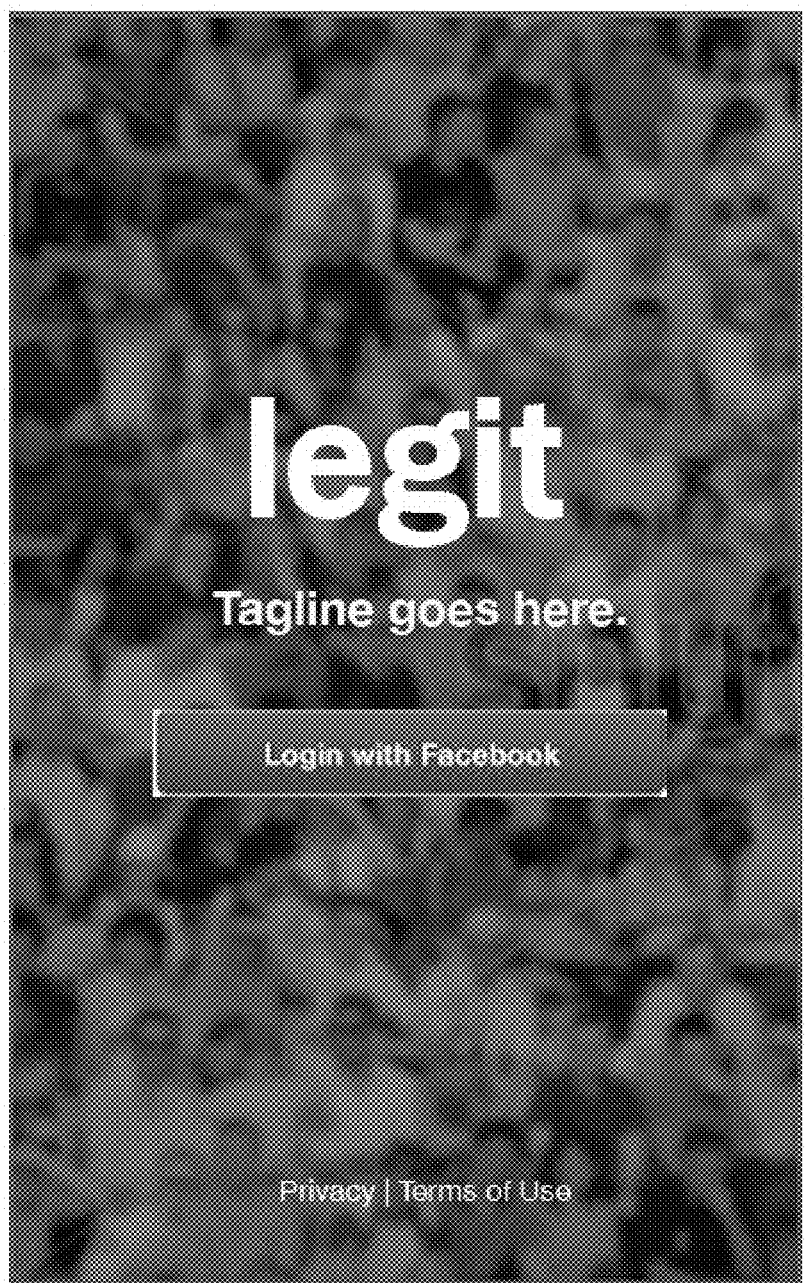
FIG. 5 shows a non-limiting example of a user interface for a social recommendation application; in this case, an interface for an existing user to login to a social recommendation application named 'Legit'.

Referring to FIG. 5, in a particular embodiment, an interface for an existing user to login to a social recommendation application named 'legit' using Facebook login information.

Figure 28A:
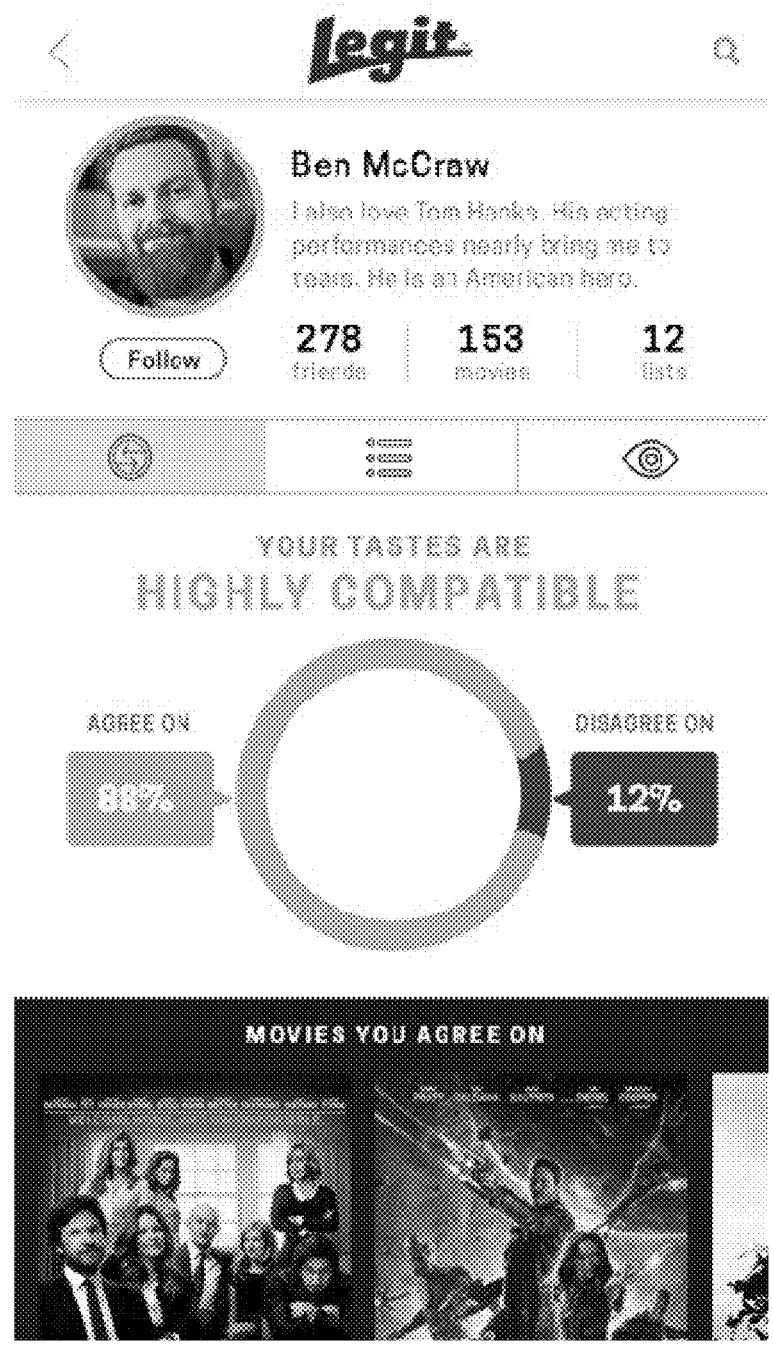
FIG. 28A shows a non-limiting example of a user interface for a social recommendation application; in this case, an interface for a user to view another user's profile.
Figure 28B:
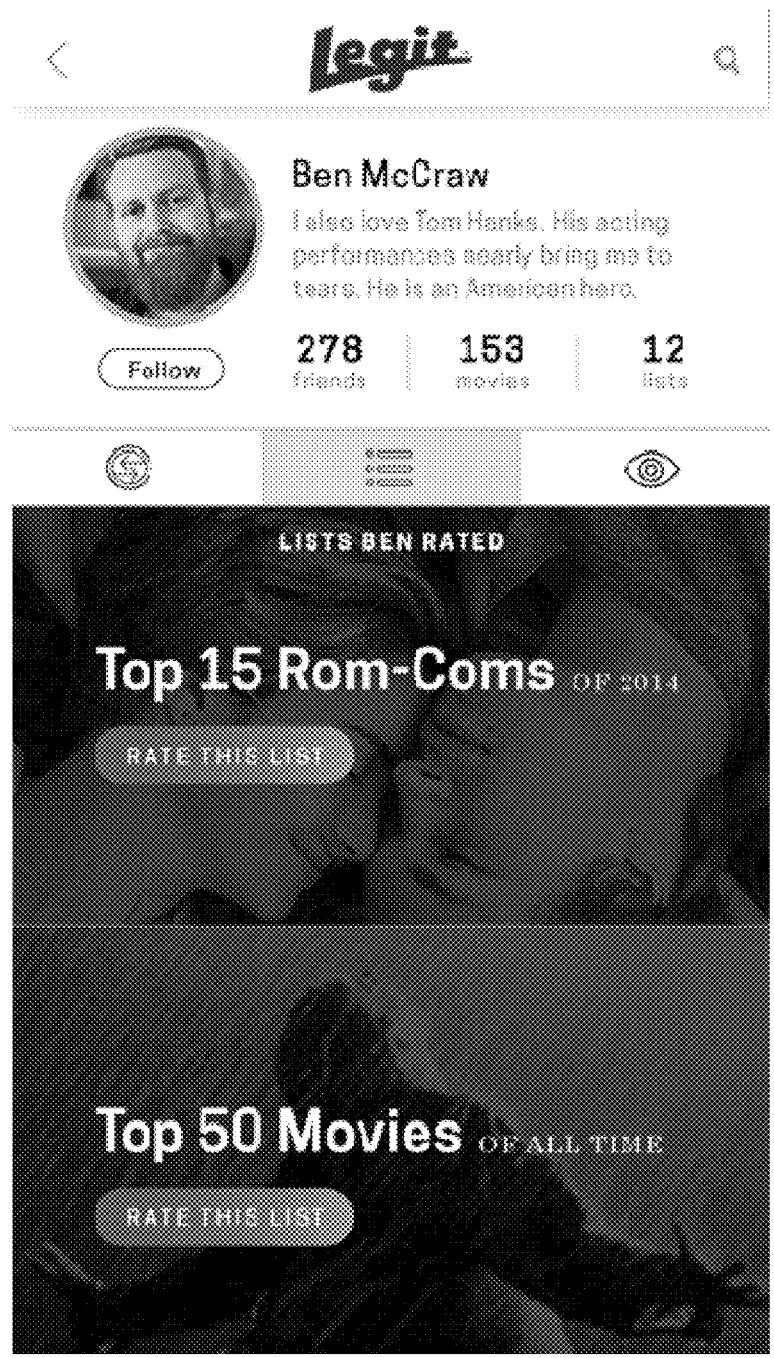
FIG. 28B shows a non-limiting example of a user interface for a social recommendation application; in this case, an interface for a user to view information included in another user's profile.
Figure 28C:
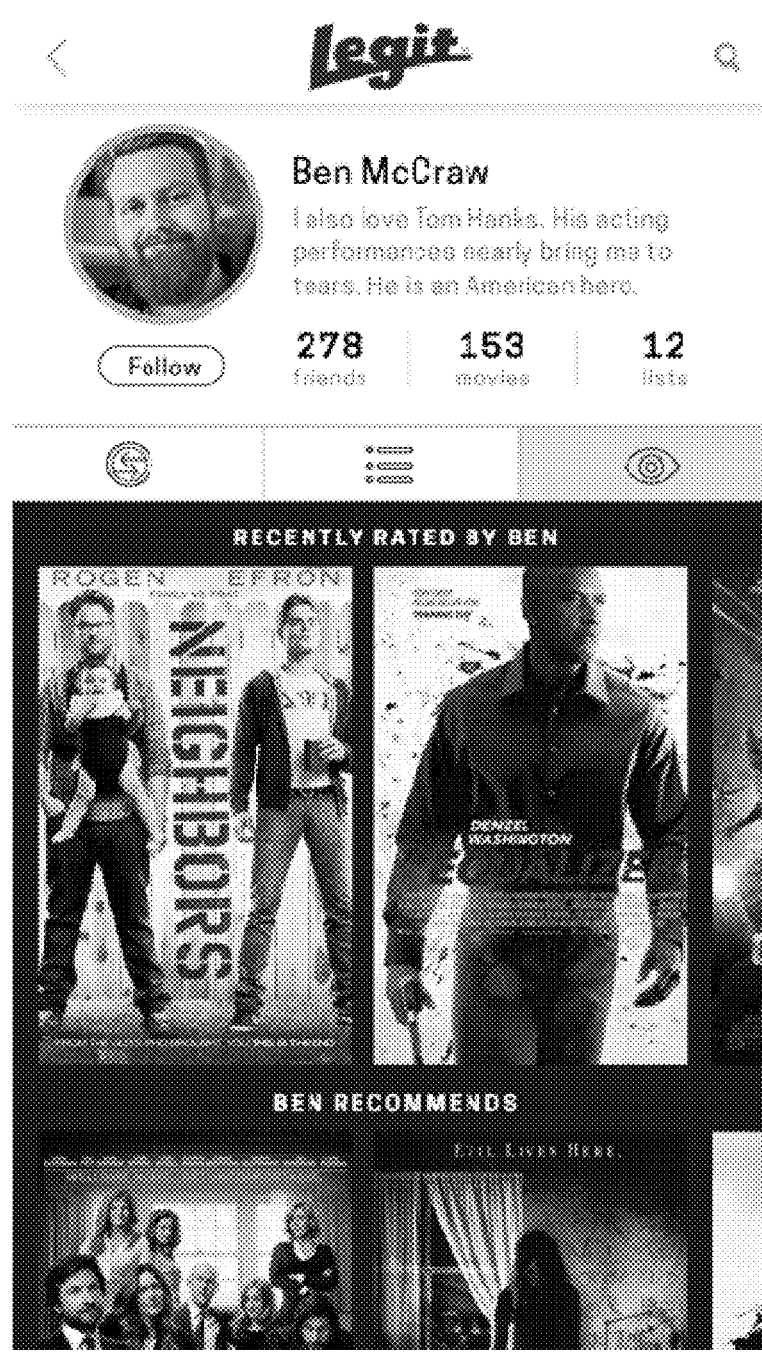
FIG. 28C shows a non-limiting example of a user interface for a social recommendation application; in this case, an interface for a user to view information included in another user's profile.

Referring to FIG. 28A-C, in a particular embodiment, a user views a different user's profile using a social recommendation application. In this embodiment, the compatibility of the user and the different user is shown as at least one color in the compatibility indicator. In the same embodiment, a number of the different user's friends, items (rated, reviewed, or saved), and lists (rated, reviewed, or saved) are optionally shown. Also in this embodiment, the different user's recently rated items and/or recently rate lists are optionally shown in his or her profile.

Figure 28D:
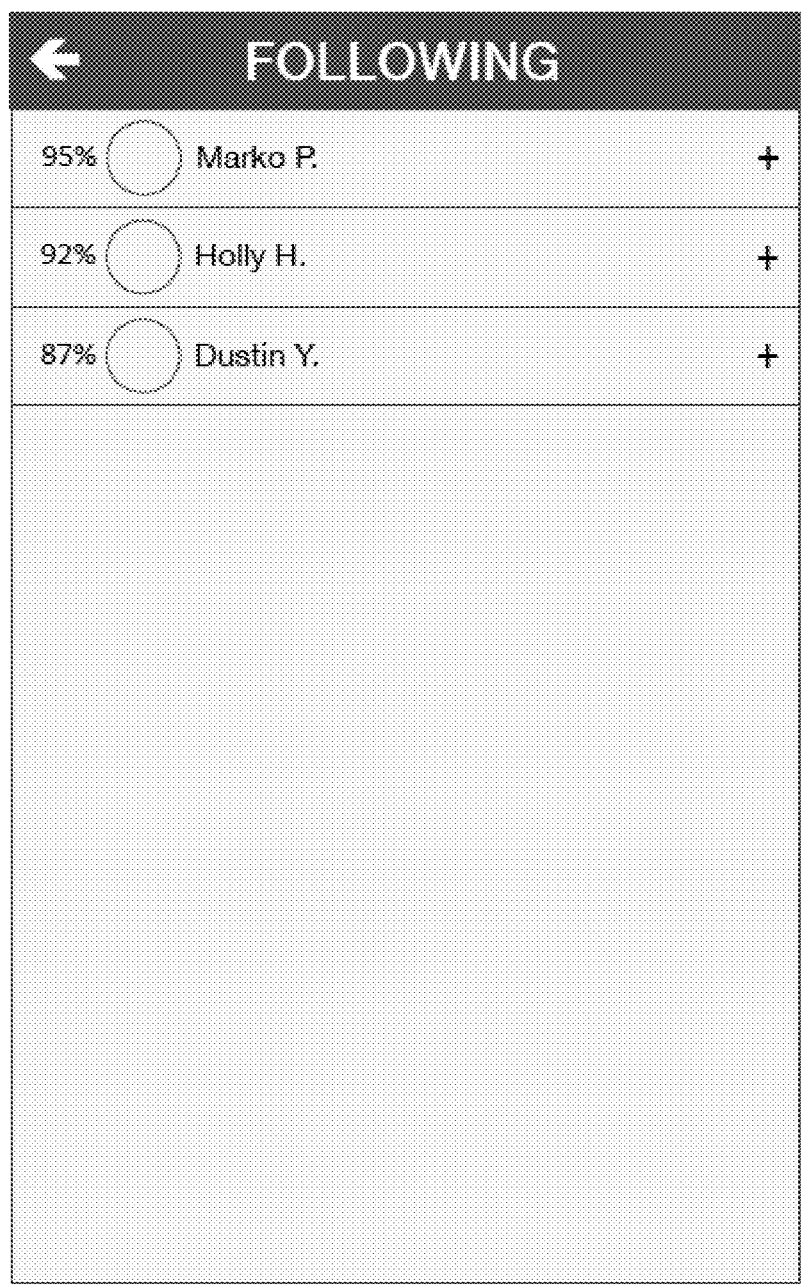
FIG. 28D shows a non-limiting example of a user interface for a social recommendation application; in this case, an interface for a user to view another user's following information.

Referring to FIG. 28D, in a particular embodiment, a list of users that the different user is following is shown. Optionally, the user who views the different user's profile adds any following users as his or her followed user or friend(s).

Figure 29:
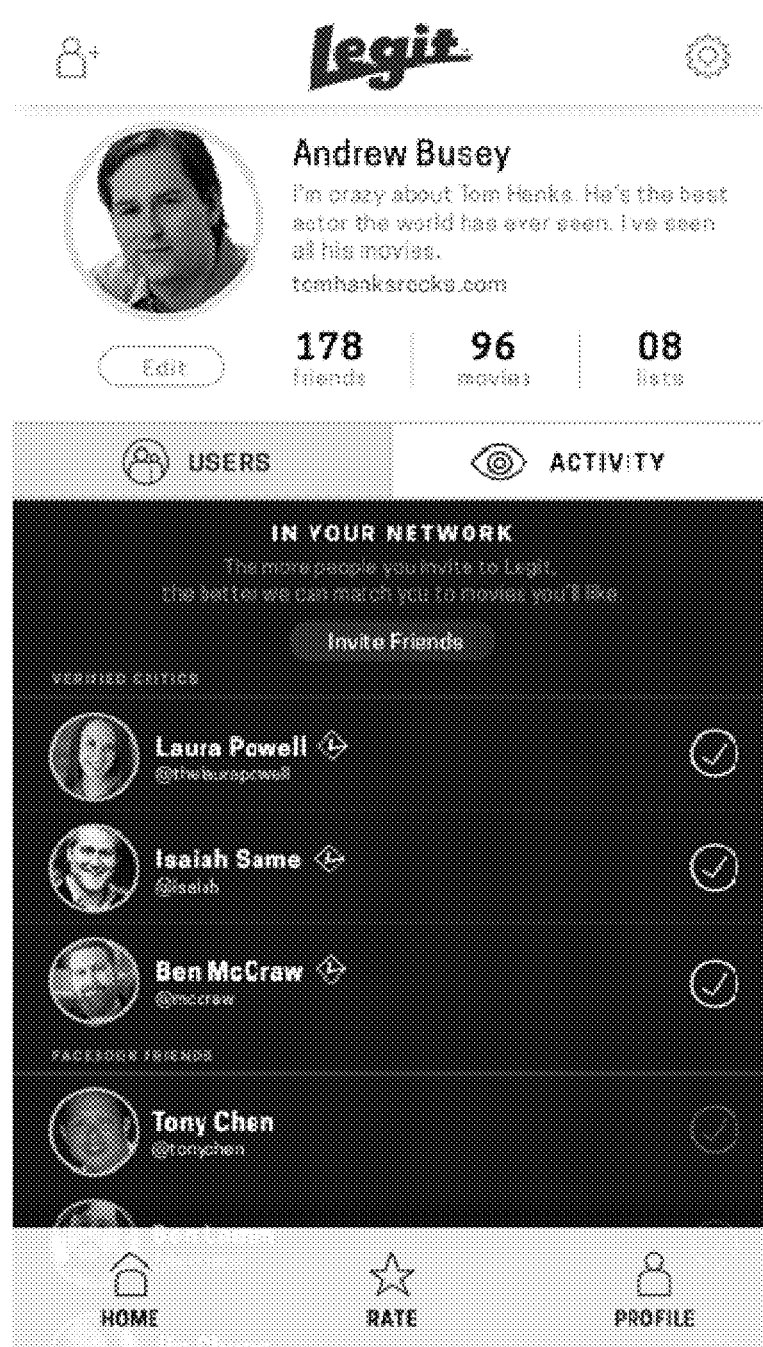
FIG. 29 shows a non-limiting example of a user interface for a social recommendation application; in this case, an interface for a user to view the user's own following information.

Referring to FIG. 29, in a particular embodiment, a user views the user's profile using a social recommendation application. In the same embodiment, the numbers of the user's friends, ratings, following users, and followers are optionally shown. In some embodiments, a number of the user's friends, items (rated, reviewed, or saved), and lists (rated, reviewed, or saved) are optionally shown. Also in this embodiment, the user's recently rated items and/or recently rate lists are optionally shown. In some embodiments, the critics of friends of the user are optionally shown. In some embodiments, the user profile provides an interface such that the user invites one or more friends or other users from a social network.

Figure 30:
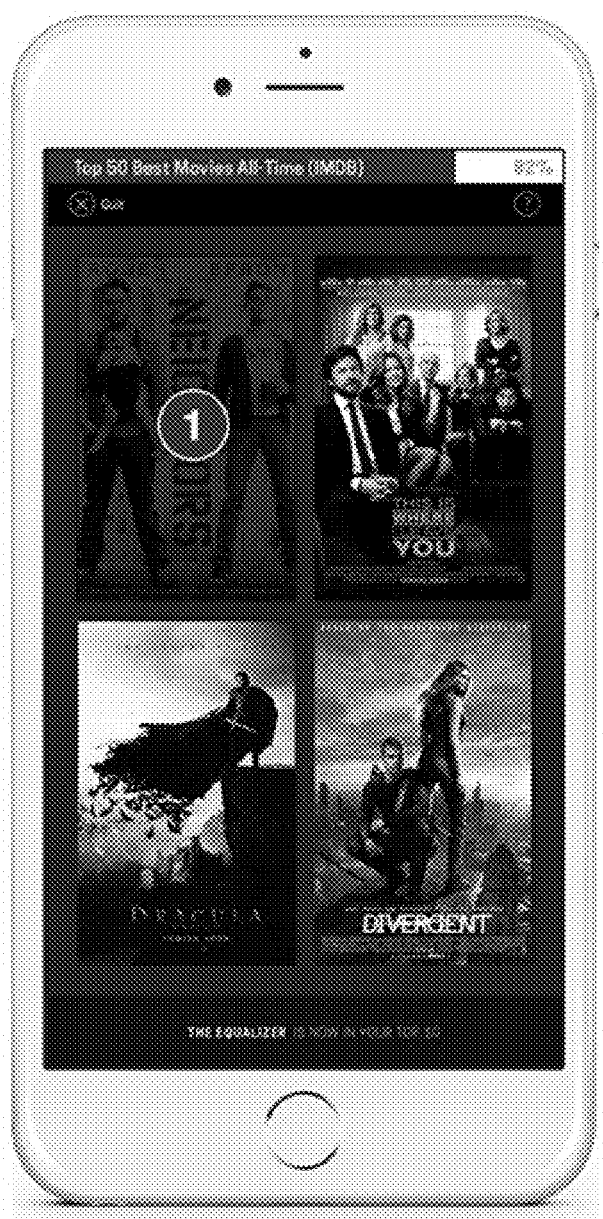
FIG. 30 shows a non-limiting example of a user interface for a social recommendation application; in this case, an interface for a user to view a tutorial regarding ranking or rating a list of items.

Referring to FIG. 30, in a particular embodiment, an interface for a user to view a tutorial page regarding rating or ranking a list of items. In this embodiments, the user clicks the items to be rated starting with the most liked item and ends with the least liked item.

Figure 31A:
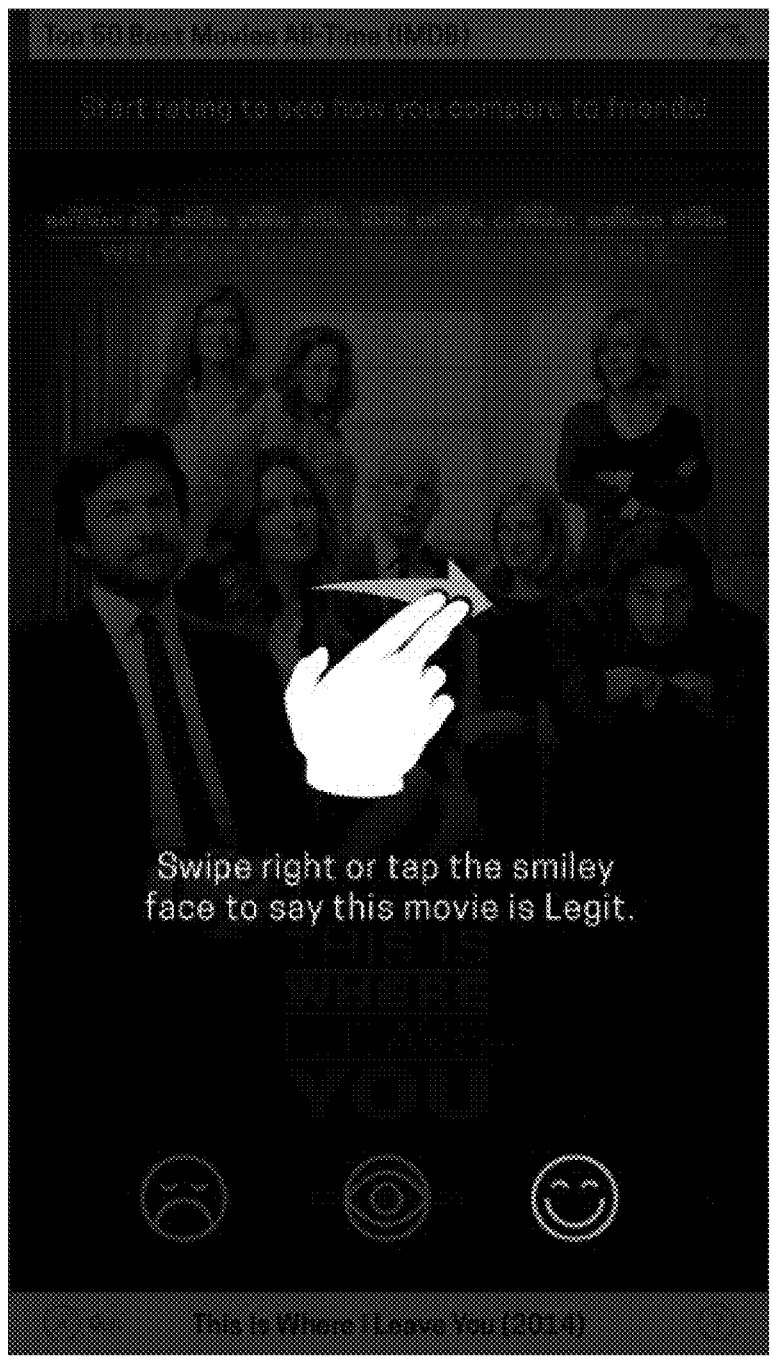
FIG. 31A shows a non-limiting example of a user interface for a social recommendation application; in this case, an interface for a user to view a tutorial regarding rating an item.
Figure 31B:
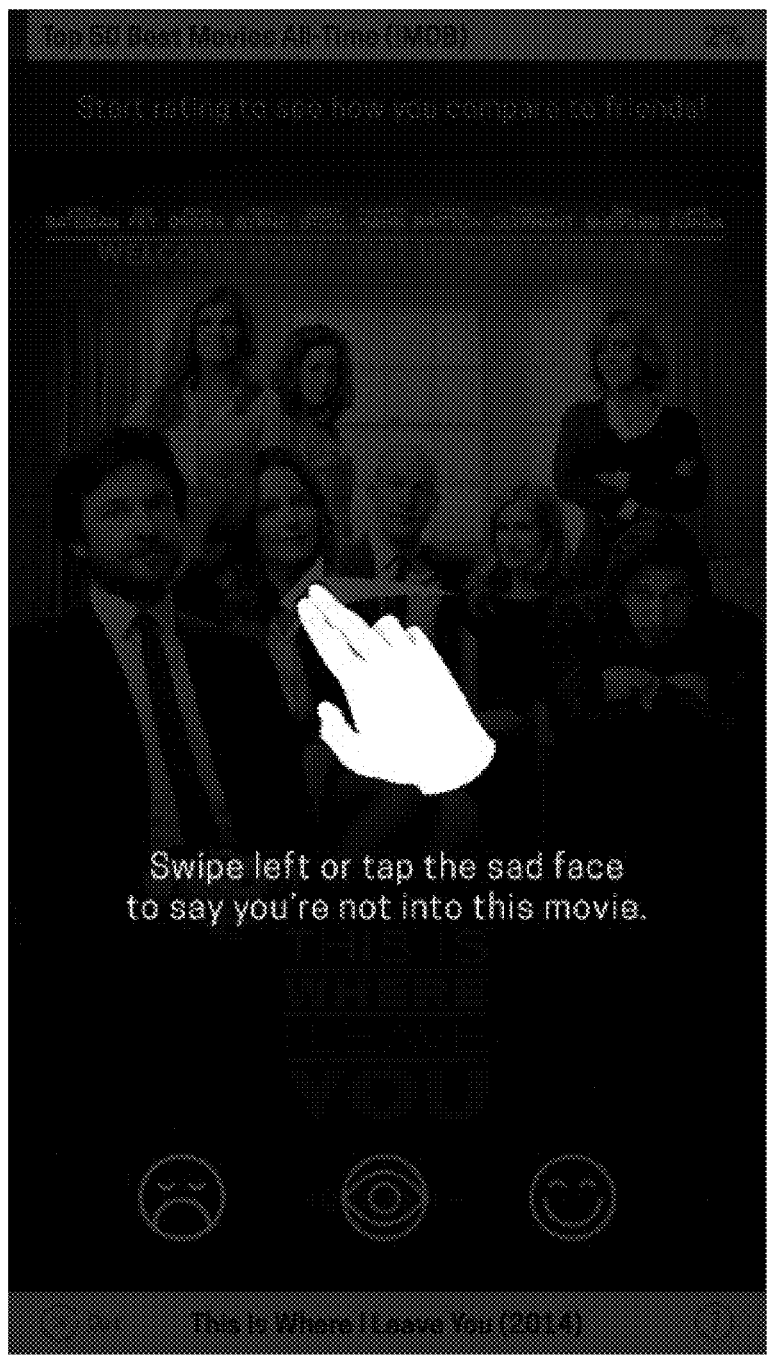
FIG. 31B shows a non-limiting example of a user interface for a social recommendation application; in this case, an interface for a user to view a tutorial regarding rating an item.
Figure 31C:
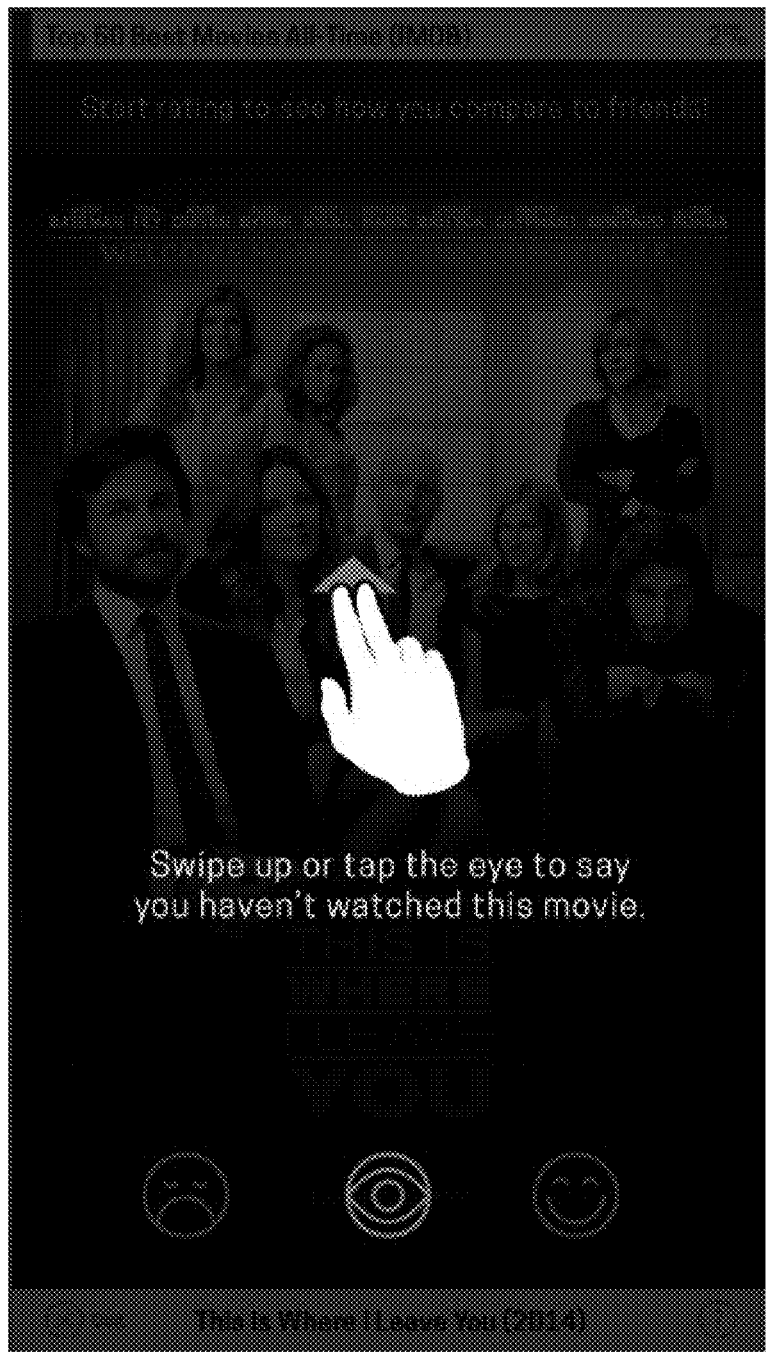
FIG. 31C shows a non-limiting example of a user interface for a social recommendation application; in this case, an interface for a user to view a tutorial regarding rating an item.

Referring to FIG. 31A, in a particular embodiment, an interface for a user to view a tutorial page regarding rating an item. In this embodiment, the user swipes the touch screen towards the left or press the sad face to indicate a "dislike". Referring to FIG. 31B, in a particular embodiment, an interface for a user to view a tutorial page regarding rating an item. In this embodiment, the user swipes the touch screen towards the right or press the happy face to indicate a "like." Referring to FIG. 31C, in a particular embodiment, an interface for a user to view a tutorial page regarding rating an item. In this embodiment, the user swipes upwards or presses the eye to indicate a "haven't directly experienced it".

Figure 31D:
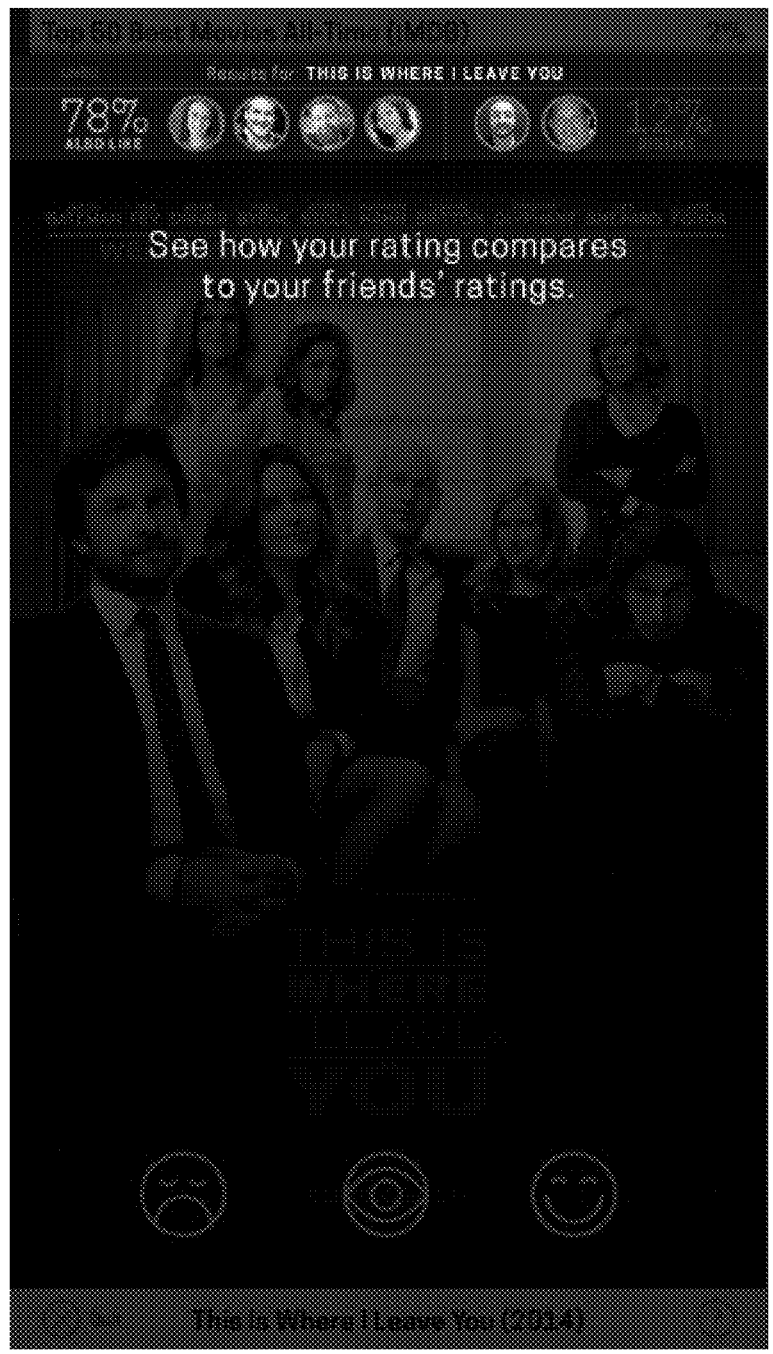
FIG. 31D shows a non-limiting example of a user interface for a social recommendation application; in this case, an interface for a user to view a tutorial regarding viewing rating information.

Referring to FIG. 31D, in a particular embodiment, an interface for a user to view a tutorial page regarding viewing the rating results. In this embodiment, the tutorial shows the compatibility of rating of the rating user and the rating user's friend.

Searches

In some embodiments, the systems, media, and methods described herein include a search of item, a search of recommendation, a search of a user, or use of the same. In some embodiments, the search is enabled within a social recommendation application. In other embodiments, the search is performed by external search engines. In some embodiments, non-limiting examples of the external search engines include google, baidu, Bing, yahoo, msn, or the like.

Figure 18:
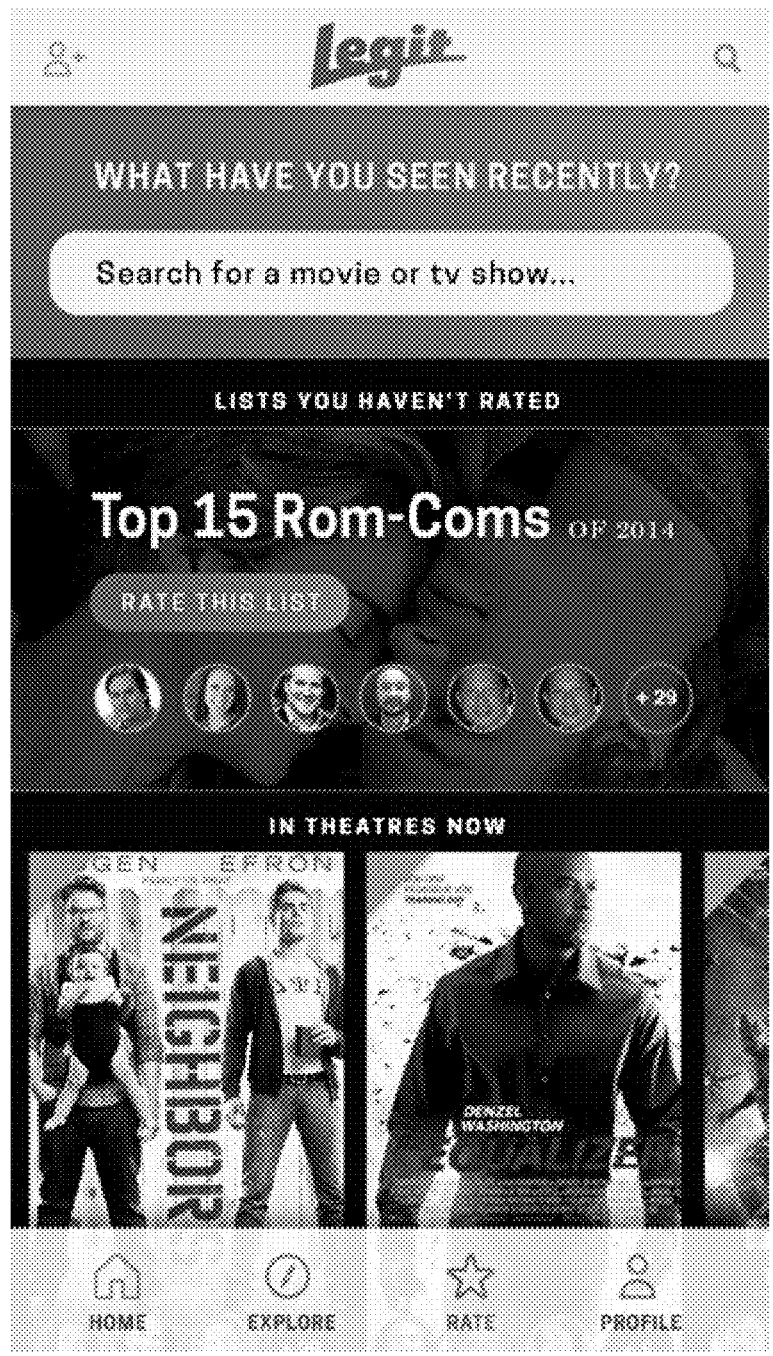
FIG. 18 shows a non-limiting example of a user interface for a social recommendation application; in this case, an interface for a user to search for an item and rate the item.

Referring to FIG. 18, in a particular embodiment, a user optionally searches for an item by tapping a search box and enters related key words. In the same embodiments, the user is optionally presented with lists that haven't rated by the user. Also in the same embodiments, the user optionally starts to rate the list by tapping on "rate this list". Also in the same embodiments, the user optionally starts to view a friend's rating of the list by tapping on an icon of the friend. In this embodiment, the user is also optionally shown items that are current in theaters now. In the same embodiment, the user is optionally shown linkage to explore functions of the social recommendation application, to rate one or more items, and to view or edit a user profile.

Figure 19:
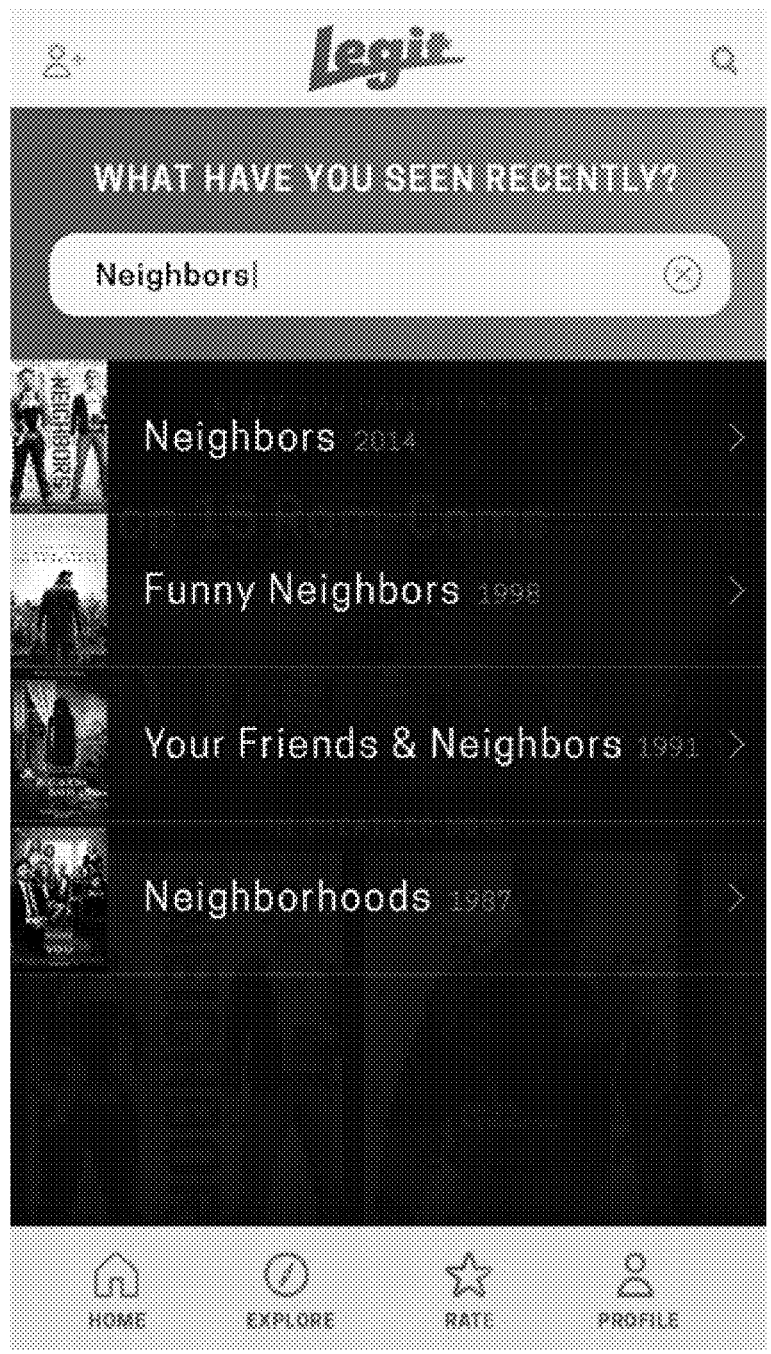
FIG. 19 shows a non-limiting example of a user interface for a social recommendation application; in this case, an interface for a user to view search results.

Referring to FIG. 19, in a particular embodiment, a user optionally searches for an item by tapping a search box and enters "neighbors". In the same embodiments, the user is optionally presented with search results related to the search term. Also in this embodiment, search results are in alphabetical order. In this embodiments, the user taps on a search result to view detailed content page of the item. In the same embodiment, the user is optionally shown linkage to explore functions of the social recommendation application, to rate one or more items, and to view or edit a user profile.

Digital Processing Device

In some embodiments, the social recommendation systems, methods, media, and applications described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple iOS®, Research In Motion® BlackBerry OS®, Google® Android®, Microsoft® Windows Phone® OS, Microsoft® Windows Mobile OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the systems, methods, and media disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the systems, methods, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the systems, methods, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the systems, methods, and media disclosed herein include one or more databases, or use of the same. In view of the disclosure provided herein, those of skill in the art will recognize that many databases are suitable for storage and retrieval of social recommendation related information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

What is claimed is:

1. A computer-implemented system for making a recommendation for a user based on the user's social relationship and interests comprising:
   a. a digital processing device comprising an operating system configured to perform executable instructions and a memory;
   b. a computer program including instructions executable by the digital processing device to create a social recommendation application comprising:
      i. a software module configured to calculate a social distance between a first user and a second user, wherein the social distance is defined as friend, friend of friend, or nth degree contact, the n being an integer greater than 2 and less than 10;
      ii. a software module configured to allow the first user and the second user to rate a plurality of items using a gamified rating model;
      iii. a software module configured to analyze a degree of similarity between the first user and the second user based on the first rating of the plurality of items by the first user and the second rating of the plurality of items by the second user;
      iv. a software module configured to make a recommendation or a non-recommendation to the first user based on:
         1) the social distance between the first user and the second user,
         2) the degree of similarity between the first user and the second user,
         3) the first rating of the plurality of items by the first user, and
         4) the second rating of the plurality of items by the second user; and
      v. a software module configured to present the recommendation or non-recommendation to the first user in a manner that comprises a ranked list of items with each item of the ranked list being selected from the plurality of items.

2. The system of claim 1, wherein the social distance is obtained from an external social network, an external social graph, a mobile phone contact list, an email contact list, a selection by the first user or the second user, or a rating by the first user or the second user.

3. The system of claim 1, wherein the social distance is obtained from an internal social network, internal social graph, or internal contact list of a social recommendation application.

4. The system of claim 1, wherein the social distance is a finite number that is monotonically non-decreasing with the increase of the number of degree of contact.

5. The system of claim 1, wherein the first rating or the second rating of the plurality of items further comprises a pre-check of impression regarding an item from the plurality of items, the item being not directly experienced by the first user or the second user, wherein the impression comprises one selected from: have not tried but definitely want to, have not tried but want to, have not tried and not sure, have not tried because never heard of it, and have not tried because of a negative predisposition.

6. The system of claim 1, wherein the first rating or the second rating of the plurality of items further comprises one or more selected from: a text review, a review video, and a review audio.

7. The system of claim 1, wherein the gamified rating model uses one or more games selected from:
   a) an A/B test, wherein two different items from the plurality of items are shown, and the first user or the second user is asked to select one item over the other item;
   b) an up, down, or pass vote, wherein an item from the plurality of item is shown together with a question, and the first user or the second user is asked to select yes or no to the question regarding the item;
   c) an hate, like, or love vote, wherein an item from the plurality of item is shown together with a question, and the first user or the second user is asked to select hate, don't like, like, love, or haven't watched to the question regarding the item;
   d) a sort and edit of a rated list, wherein a subset or a full set of the plurality of items are shown in the rated list, and the first user or the second user sorts and/or removes one or more items in the rated list, the rated list being generated using one or more selected from: a statistical algorithm, a mathematical algorithm, a numerical algorithm, or an empirical algorithm; and
   e) a direct sourcing by the first user or the second user from one or more non-self users, wherein a direct recommendation regarding an item from the plurality of items is solicited from one or more non-self users.

8. The system of claim 1, wherein the plurality of items are related to the interests of the first user or the second user.

9. The system of claim 1, wherein each item of the plurality of items is associated with one or more categories, wherein the one or more categories are selected from: movies, TV shows, sport teams, musics, clubs, music bands, restaurants, bars, mobile applications, books, online videos, images, articles, games, sports, electronics, people, and dating.

10. The system of claim 1 comprising a software module to allow the first user to filter out one or more ratings of an item in the plurality of items by another user using one or more predetermined criteria.

11. The system of claim 1, wherein the degree of similarity is one selected from: aligned, slightly aligned, neutral, slightly opposed, or opposed.

12. The system of claim 1, wherein the degree of similarity is calculated using one or more selected from: a statistical algorithm, a mathematical algorithm, a numerical algorithm, or an empirical algorithm.

13. The system of claim 1, wherein the degree of similarity is calculated with an independent weighting or a dependent weighting for the rating of each item from the plurality of items.

14. The system of claim 1, wherein the degree of similarity is further analyzed based on a subset of the plurality of items, the further analysis based on a first rating of the subset of the plurality of items by the first user and the second rating of the subset of plurality of items by the second user using the gamified rating model.

15. The system of claim 1, wherein the degree of similarity is further analyzed based on one or more items from the plurality of items within a same category, wherein the same category is selected from: movies, TV shows, sport teams, musics, clubs, music bands, restaurants, bars, mobile applications, books, online videos, images, articles, games, sports, electronics, people, and dating.

16. The system of claim 1, wherein the degree of similarity is indicated by one or more colors, wherein green indicates aligned, grey indicate neutral, and red indicate opposed.

17. The system of claim 1, wherein the social recommendation application further comprises a software module configured to allow the first user to select and send one or more questions to the second user regarding the recommendation or the non-recommendation.

18. The system of claim 1, wherein the social recommendation application further comprises a software module configured to receive one or more predetermined responses from the second user to one or more questions regarding the recommendation or the non-recommendation.

19. The system of claim 1, wherein the recommendation or non-recommendation is further based on one or more ratings selected from Rotten Tomatos, Yelp, Facebook, LinkedIn, Google, Orbitz, and Yahoo.

20. The system of claim 1, wherein the recommendation application further comprises a software module configured to solicit a second recommendation or non-recommendation from one or more non-self users.

21. The system of claim 1 comprising a software module to make a second recommendation or non-recommendation to the first user, wherein the second recommendation or non-recommendation comprises a second ranked list of items based on the rating of the plurality of items of items by one or more users that are friend or friend of friend with the first user.

22. The system of claim 1 comprising a software module to propagate the recommendation or the non-recommendation to a third user, wherein the degree of similarity of the first and the third user is above a first predetermined threshold and the social distance between the first and the third user is above a second predetermined threshold.

23. The system of claim 1 comprising a software module to allow the first user or the second user to incorporate user generated content regarding an item from the plurality of items.

24. The system of claim 23, wherein the user generated content comprises a url, an image, a video, a text, an audio regarding an item from the plurality of items.

25. The system of claim 1, wherein the software module configured to make the recommendation or the non-recommendation to the first user further based on one or more item descriptive tags selected from: a genre, a price, a director, a cast, a location, a release date, a language, a film duration, and a movie classification.

26. The system of claim 1 comprising a software module to allow the first user to search for recommendations or non-recommendations regarding an item, wherein the search results are from users that are within a predetermined social distance to the first user.

27. The system of claim 1 comprising a software module to allow a user to add or edit a profile, wherein the profile comprises one or more selected from: one or more categories of interests, one or more recommendations or non-recommendations by a non-self user, information of one or more followers; information of one or more following users, a link to each follower's profile, and a link to each following user's profile.

28. A computer-implemented system for making a recommendation for a group of users based on the group of users' social relationship and interests comprising:
- a) a digital processing device comprising an operating system configured to perform executable instructions and a memory;
- b) a computer program including instructions executable by the digital processing device to create a social recommendation application comprising:
  - i) a software module configured to calculate an average social distance between each member of the group of users and a non-group user, wherein the average social distance is defined as nth degree contact, the n being a finite number no less than 1 and less than 10, and the non-group user being different from each member of the group of users;
  - ii) a software module configured to allow each member of the group of users and the non-group user to rate, using a gamified rating model, a plurality of items by each member of the group of users and the non-group user;
  - iii) a software module configured to analyze a degree of similarity between each member of the group of users and the non-group user based on two or more rating of the plurality of items, wherein each rating of the plurality of items are by each member of the group of user, and a non-group rating of the plurality of items by the non-group user; and
  - iv) a software module configured to make a recommendation or a non-recommendation to the group of users based on
    - 1) the average social distance between the group of users and the user,
    - 2) the degree of similarity between the group of users and the user, and
    - 3) the two or more ratings of the plurality of items, wherein each rating of the plurality of items are by each member of the group of users, and
    - 4) the non-group rating of the plurality of items by the non-group users; and
  - v) a software module configured to present the recommendation or non-recommendation to the group of users in a manner that comprises a ranked list of items with each item of the ranked list being selected from the plurality of items.

29. Non-transitory computer-readable storage media encoded with a computer program including instructions executable by a processor to create a social recommendation application comprising:
- a) a software module configured to calculate a social distance between a first user and a second user, wherein the social distance is defined as friend, friend of friend, or nth degree contact, the n being an integer greater than 2 and less than 10;
- b) a software module configured to allow the first user and the second user to rate a plurality of items using a gamified rating model;
- c) a software module configured to analyze a degree of similarity between the first user and the second user based on the first rating of the plurality of items by the first user and the second rating of the plurality of items by the second user; and
- d) a software module configured to make a recommendation or a non-recommendation to the first user based on
  - i) the social distance between the first user and the second user,
  - ii) the degree of similarity between the first user and the second user,
  - iii) the first rating of the plurality of items by the first user, and
  - iv) the second rating of the plurality of items by the second user; and
- e) a software module configured to present the recommendation or non-recommendation to the first user in a manner that comprises a ranked list of items with each item of the ranked list being selected from the plurality of items.

30. Non-transitory computer-readable storage media encoded with a computer program including instructions executable by a processor to create a social recommendation application comprising:
- a) a software module configured to calculate an average social distance between each member of the group of users and a non-group user, wherein the average social distance is defined as nth degree contact, the n being a finite number no less than 1 and less than 10, and the non-group user being different from each member of the group of users;
- b) a software module configured to allow each member of the group of users and the non-group user to rate, using a gamified rating model, a plurality of items by each member of the group of users and the non-group user;
- c) a software module configured to analyze a degree of similarity between each member of the group of users and the non-group user based on two or more rating of the plurality of items, wherein each rating of the plurality of items are by each member of the group of user, and a non-group rating of the plurality of items by the non-group user; and
- d) a software module configured to make a recommendation or a non-recommendation to the group of users based on
  - i) the average social distance between the group of users and the user,
  - ii) the degree of similarity between the group of users and the user, and
  - iii) the two or more ratings of the plurality of items, wherein each rating of the plurality of items are by each member of the group of users, and
  - iv) the non-group rating of the plurality of items by the non-group user,
- e) a software module configured to present the recommendation or non-recommendation to the group of users in a manner that comprises a ranked list of items with each item of the ranked list being selected from the plurality of items.

* * * * *

UNITED STATES PATENT AND TRADEMARK OFFICE
CERTIFICATE OF CORRECTION

PATENT NO. : 9,558,244 B2  
APPLICATION NO. : 14/919336  
DATED : January 31, 2017  
INVENTOR(S) : Busey et al.

It is certified that error appears in the above-identified patent and that said Letters Patent is hereby corrected as shown below:

In Claim 7, Column 55, Line 17, "plurality of item" should read --plurality of items--.

In Claim 7, Column 55, Line 20, "an hate, like, or love vote" should read --a hate, like, or love vote--.

In Claim 7, Column 55, Line 21, "plurality of item" should read --plurality of items--.

In Claim 16, Column 56, Lines 8-9, "grey indicate neutral, and red indicate opposed" should read --grey indicates neutral, and red indicates opposed--.

In Claim 19, Column 56, Line 23, "Tomatos" should read --Tomatoes--.

In Claim 21, Column 56, Line 33, "plurality of items of items" should read --plurality of items--.

In Claim 28, Column 57, Line 33, "users and the user," should read --users and the non-group user,--.

In Claim 28, Column 57, Line 35, "and the user," should read --and the non-group user,--.

In Claim 30, Column 58, Line 46, "users and the user," should read --users and the non-group user,--.

In Claim 30, Column 58, Line 48, "and the user," should read --and the non-group user,--.

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*